US 6,621,533 B2

(12) United States Patent
Slack et al.

(10) Patent No.: US 6,621,533 B2
(45) Date of Patent: Sep. 16, 2003

(54) POLARIZATION SEPARATION ELEMENT, A POLARIZATION CONVERSION SYSTEM, AN OPTICAL ELEMENT, AND A PROJECTION DISPLAY SYSTEM

(75) Inventors: Jason Kempton Slack, Cambridge (GB); Marina Vladimirovna Khazova, Oxfordshire (GB); Tamotsu Takatsuka, Tochigi (JP); Keisuke Mitani, Kawachi-gun (JP); Kazuhiro Inoko, Chiba (JP); Graham John Woodgate, Oxfordshire (GB); Masaharu Hara, Tochigi (JP); Grant Bourhill, Gloucestershire (GB); Emma Walton, Oxford (GB)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/975,731

(22) Filed: Oct. 11, 2001

(65) Prior Publication Data

US 2002/0093718 A1 Jul. 18, 2002

(30) Foreign Application Priority Data

Oct. 13, 2000 (GB) .............................................. 0025252

(51) Int. Cl.$^7$ ............................................. G02F 1/1335
(52) U.S. Cl. ........................................... 349/5; 359/831
(58) Field of Search ....................... 349/5, 57; 359/831

(56) References Cited

U.S. PATENT DOCUMENTS

| | | | |
|---|---|---|---|
| 5,900,977 A | | 5/1999 | Hikmet |
| 5,978,136 A | | 11/1999 | Ogawa et al. |
| 6,278,552 B1 | * | 8/2001 | Ishihara et al. .............. 359/619 |

FOREIGN PATENT DOCUMENTS

| | | |
|---|---|---|
| EP | 0 753 780 | 7/1995 |
| EP | 0 887 667 | 6/1998 |
| GB | 2 326 729 | 3/1998 |
| WO | 97/01779 | 1/1997 |
| WO | 99/01184 | 1/1999 |

OTHER PUBLICATIONS

Ogiwara et al. "Late–News Paper: PS Polarization Converting Device for LC Projector Using Holographic Polymer–Dispersed LC Films" SID 99 on lines 14–16 in right column of p. 1125.

* cited by examiner

Primary Examiner—John F. Niebling
Assistant Examiner—Christopher Lattin
(74) Attorney, Agent, or Firm—Renner, Otto, Boisselle & Sklar

(57) ABSTRACT

The present invention provides a polarization separation element comprising a first array of prisms having a wedge-shaped cross-section, and a second array of prisms also having a wedge-shaped cross section. One of the prism arrays is an array of birefringent prisms.

The present invention also provides a polarization conversion system having a polarization separation element of the above type for directing light having a first polarization in a first direction and for directing light having a second polarization different from the first polarization in a second direction different from the first direction; and one or more polarization conversion elements for converting light having the first and second polarizations to light having a substantially common output polarization. The polarization conversion system of the invention is suitable for use in a projection display system.

35 Claims, 35 Drawing Sheets

Single and double birefringent micro prism arrays

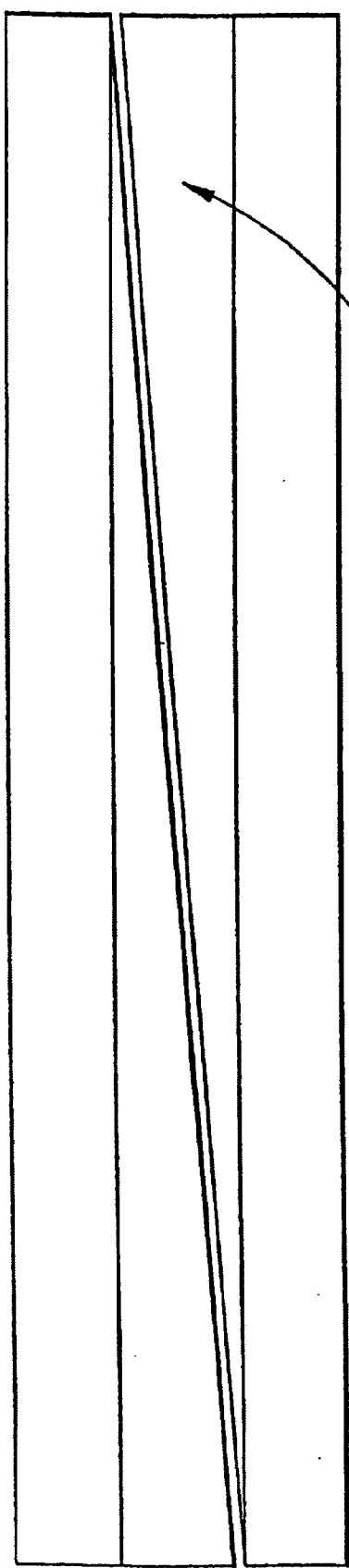
FIG. 3(a) Non-truncated wedge
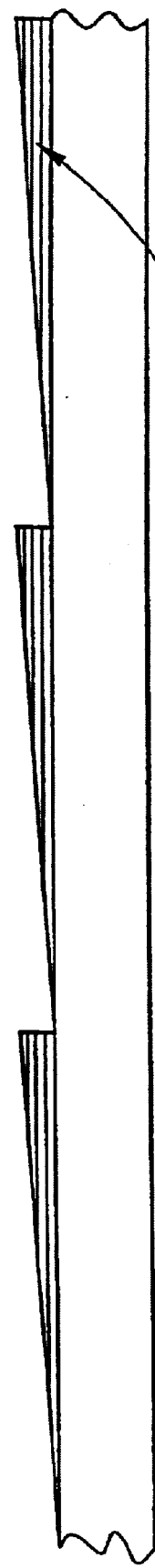
FIG. 3(b) Truncated wedge

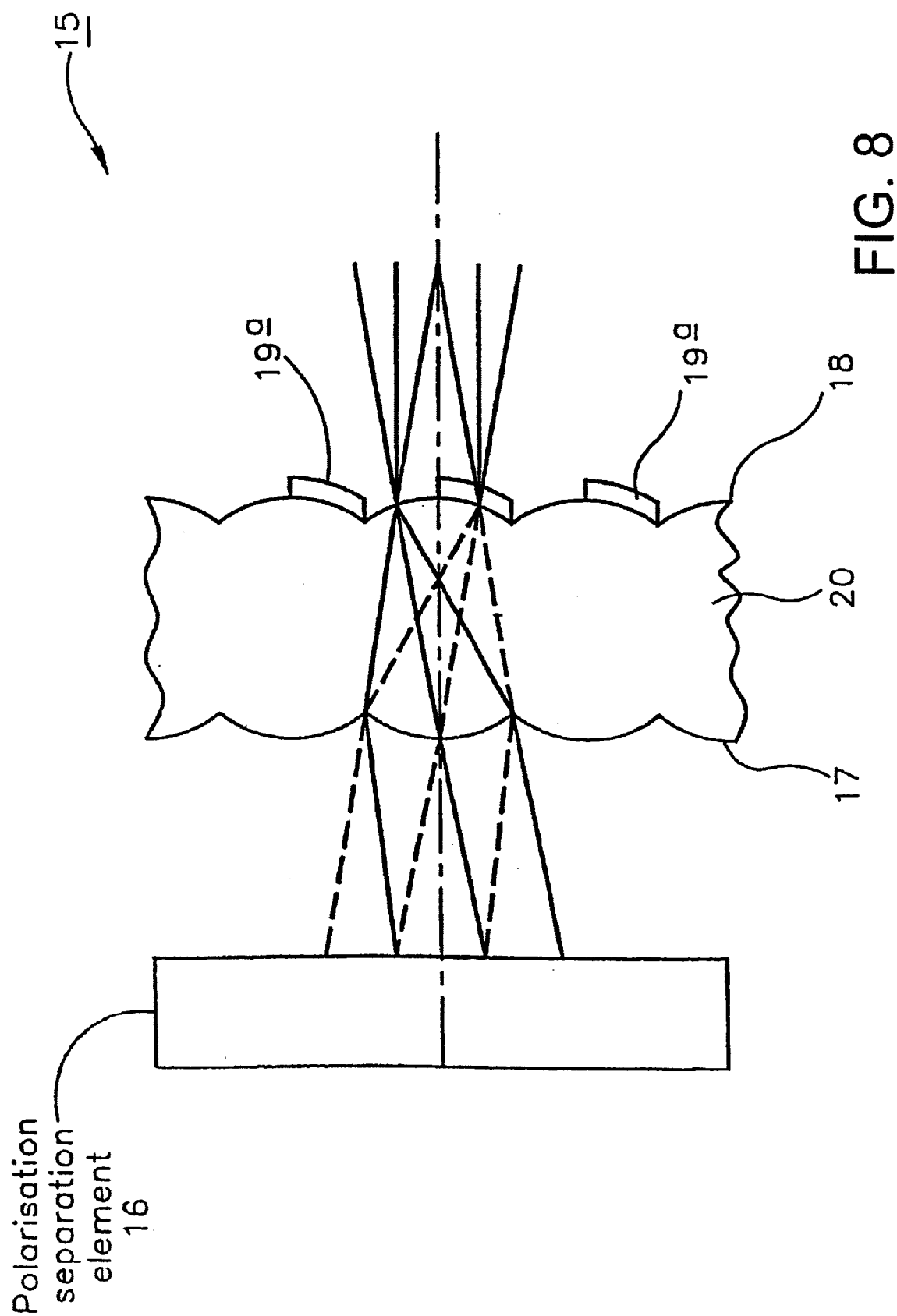

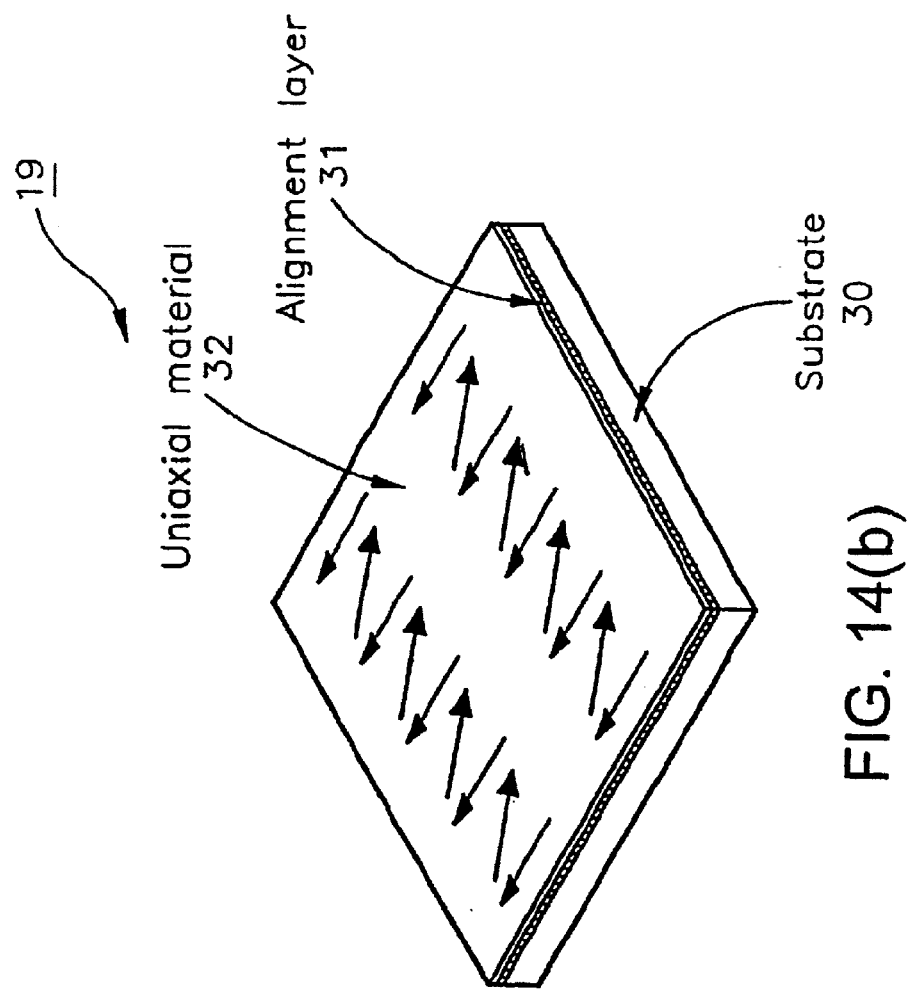
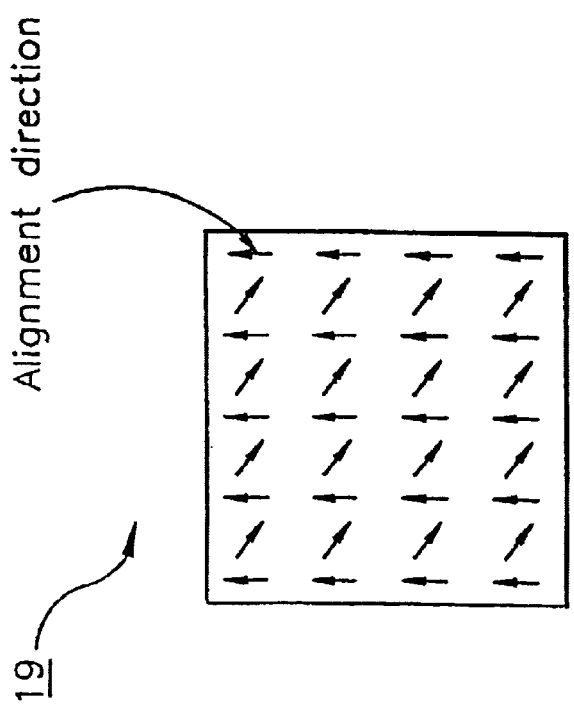
FIG. 14(b)
FIG. 14(a)

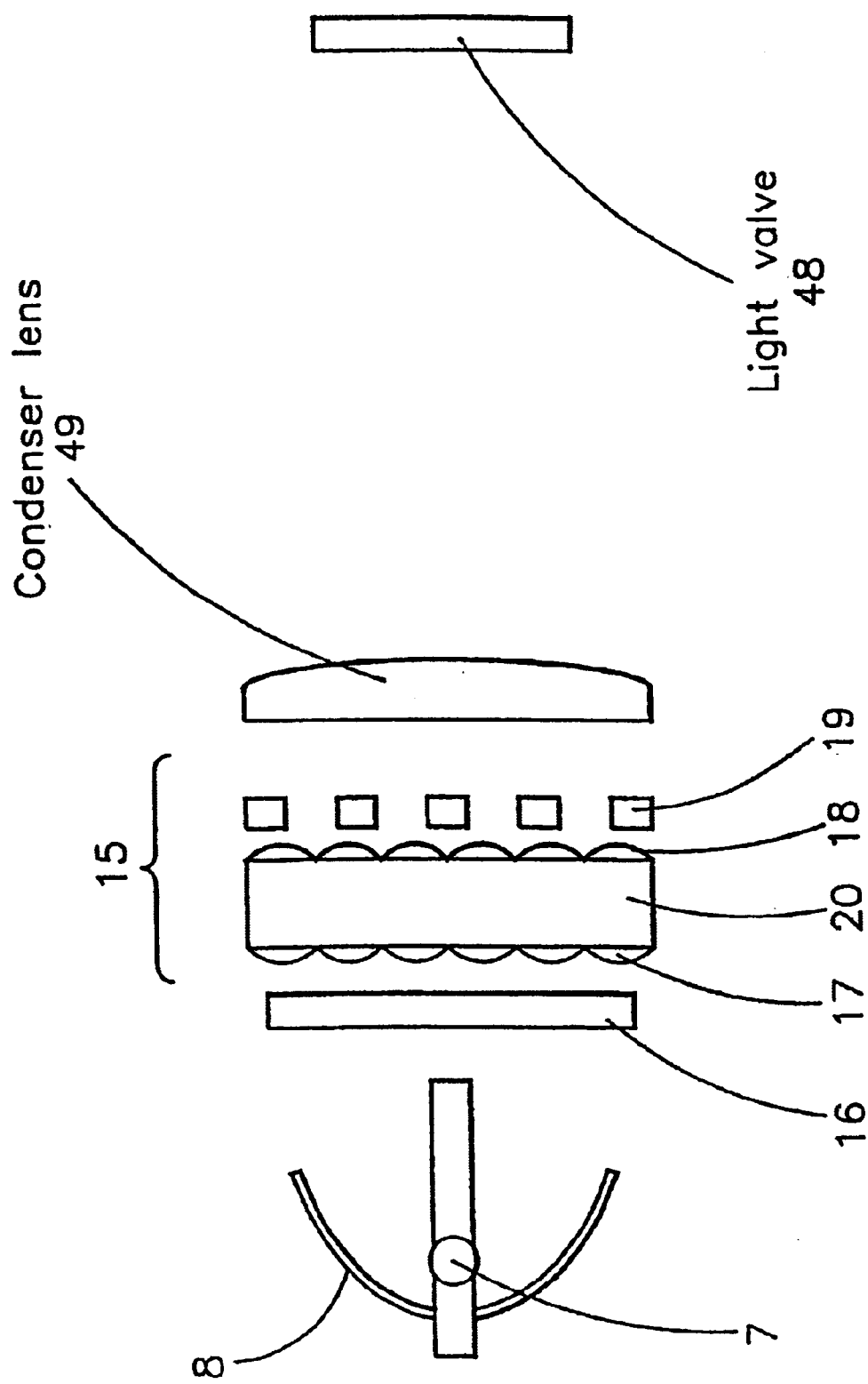

POLARIZATION SEPARATION ELEMENT, A POLARIZATION CONVERSION SYSTEM, AN OPTICAL ELEMENT, AND A PROJECTION DISPLAY SYSTEM

BACKGROUND OF THE INVENTION

1. Field of the Invention

The present invention relates to a polarisation separation element that separates incident unpolarised or partially polarised light into two angularly separated output beams having different polarisation states. The invention also relates to a polarisation conversion system that converts light that is unpolarised or partially polarized to light that is substantially completely polarised. The invention also relates to an optical element that comprises two lens arrays disposed on opposite faces of a substrate. The invention also relates to a projection display system incorporating such a polarisation-conversion system and possibly such an optical element.

2. Description of the Related Art

Many optical systems require that they are illuminated by light; that is substantially completely polarised. Where such a device is operated with light that is unpolarised, or that is partially polarised, it is necessary for the light to be completely polarised—that is, converted to a single polarisation state—before it is incident upon the optical system.

One way of converting unpolarised light to completely polarised light is the well-known linear polariser. An idealised linear polariser transmits light that is linearly polarised in one direction without loss and completely absorbs light that is linearly polarised in an orthogonal direction, so that unpolarised light incident on the polariser is converted into light that is completely linearly polarised. While such a linear polariser is a straightforward means for producing linearly polarised light, it has the disadvantage of having a low efficiency. An ideal linear polariser, in which there is no loss of the polarisation component that is intended to be transmitted owing to absorption within the polariser and/or reflection at the surfaces of the polariser, has an efficiency of only 50%, and the efficiency of a practical linear polariser is generally within the range 40–45%.

Another known means for converting unpolarised light to polarised light is a polarisation conversion system. In a polarisation conversion system, incident light that is already polarised in a desired polarisation state is transmitted unchanged. Light that is polarised in a polarisation state orthogonal to the desired polarisation state is converted to light of the desired polarisation state, rather than being blocked as happens if a conventional linear polarise is used.

A polarisation conversion system consists essentially of a polarisation splitting element (PSE) that splits incident unpolarised or partially polarised light, so that light of one polarisation state is emitted from the PSE spatially or angularly separated from light having an orthogonal polarisation state. A polarisation conversion system also comprises a polarisation conversion element for changing the polarisation state of one of the components emitted by the PSE into the orthogonal polarisation state.

Many polarisation separation elements are known. As one example, FIG. 19 shows an embodiment of the well-known Wollaston prism in which two birefringent wedges W1,W2 are joined to form a composite block, with the hypotenuse faces of the two prisms adjacent to one another. In this embodiment of the Wollaston prism, described in EP-A-0 993 323, the two wedges W1,W2 are embodied as liquid crystal layers having varying thickness. The direction of the optic axis in each wedge rotates through 90° across the thickness of the wedge, with the optic axis of the two wedges being perpendicular to one another at the interface between the two wedges.

U.S. Pat. No. 5,978,136 discloses a conventional PCOS, which is illustrated in FIG. 21(a) of the accompanying drawings. This polarisation conversion system comprises two microlens arrays 5 and 6. The elements of the first microlens array 5 image to corresponding elements of the second microlens array 6. A set of polarising beam splitter cubes 2 that contains polarising separation films 2a then spatially separates P and S components of the light so that only the P or only the S component is incident upon a set of retarder stripes 3. The retarder stripes are configured to be substantially half wave plates, such that light incident on a retarder stripe is converted to its substantially orthogonal state. Light leaving the polarising conversion system is now substantially polarised. The polarising beam splitter cubes further contain reflecting films 2b that reflect the other polarisation component so that it leaves the PCOS in a direction that is substantially parallel to the direction in which light leaves the retarder stripes 3. An opaque mask 9 is disposed between the second microlens array 6 and the polarising beam splitter array 2 to reduce cross-talk. The minimum volume of the PCOS is constrained by the tolerances of the half-wave plates.

The set of polarising beam splitter cubes 2 of the PCOS of FIG. 21(a) may be obtained by obliquely cutting a stack of PBS plates 49, as shown in FIG. 21(b). A suitable cutting cross-section is indicated by reference 50 in FIG. 21(b).

Ogiwara et al describe in "PS Polarisation Converting Device for LC Projector Using Holographic Polymer-Dispersed LC Films", SID 1999, a further conventional PCOS. This device it shown in FIG. 20 and comprises two microlens arrays 5, 6, two polymer dispersed liquid crystal (PDLC) gratings 2, 4 and a set of half wave retarder elements 3. Polarisation splitting is achieved by the PDLC grating 2 that diffracts substantially only light of one linear polarisation (P) and transmits light having the orthogonal linear polarisation (S) without significant diffraction.

The half wave retardation plates 3 are mounted on the second grating 4 and are arranged in the path of p-polarised light emitted by the grating 2. When p-linearly polarised light passes through one of the half wave plates 3, it will be converted to s-linearly polarised light.

The half wave retardation plates 3 are arranged so that the s-linearly polarised light emitted by the grating 2 does not pass through the half wave retardation plates 3. The s-polarised light emitted by the grating 2 is therefore not affected by the half wave plates 3. After passing through the array of half wave plates, the light is therefore completely s-polarised.

In use, the polarisation conversion system is illuminated by collimated light produced by a lamp 7 and a parabolic mirror 8, and incident light is focused by the first microlens array 5. The second microlens array 6 has a similar focal length and pitch to the first microlens array 6. The first and second microlens arrays are separated by approximately their focal length.

This PCOS again has the disadvantage that the minimum volume is constrained by the tolerances of the half-wave retarder elements. A further disadvantage is that this system uses two polarisation splitting elements to reduce dispersion, and this increases the cost and complexity of the PCOS.

The dimensions of the polarisation conversion system shown in FIG. 21(a) are typically of the order 50 mm×50 mm×70 mm. When the polarisation conversion optical system (PCOS) is used with a projector, it significantly increases the overall volume of the projector. The volume of the PCOS of FIG. 21(a) can only be reduced if the focal length of the microlens arrays is reduced, and this requires a corresponding reduction in the pitch of the microlenses, the half way plates and the polarisation splitting cubes. The microlens arrays used in a conventional PCOS of the type shown in FIG. 21(a) would typically have a pitch p of 6 mm, and it would be desirable to reduce this to under 1 mm with a corresponding reduction in optical system throw. It is, however, difficult to do this in the case of a PCOS that incorporates conventional half-wave retarder elements and conventional polarisation splitting cubes, since it becomes difficult to align the elements with one another with the required tolerance. Fabrication and assembly of the PCOS thus become much more difficult. Accordingly, with the elements used in current polarisation conversion systems of the type shown in FIG. 21(a), the physical size of the elements used places a restriction on the minimum volume of the PCOS.

EP 0 887 667 and GB 2 326 729 disclose a method of fabricating a high precision patterned retarder element and the application of such an element to a polarisation conversion optical system comprising an array of beamsplitters.

FIG. 17 shows a further conventional polarisation conversion-system proposed by Minolta. In this PCOS the polarisation separation element 2 is a diffractive optical element (DOE) polarisation splitter. In the device shown in FIG. 17, light in which the plane of polarisation is in the plane of the paper is not deflected, as shown by the solid ray paths. Light polarised in a direction out of the plane of the paper is deflected, as shown by the ray paths in broken lines. The device also comprises a first microlens array 5 for focusing light emitted by the polarisation separation element 2, a conventional large-size array of half wave retarder elements 3, and a second microlens array 6. The device is illuminated by light from a lamp 7 that has been collimated by a parabolic mirror 8 and passed through a UV-IR filter 9'.

The prior art PCOS of FIG. 17 has the disadvantage that it uses a diffractive element as the polarisation separation element 2. Because this is a diffractive element it will suffer from high chromatic dispersion, and will also suffer from polarisation mixing owing to the overlapping of multiple diffraction orders. The high chromatic dispersion of the polarisation separation element will also mean that the efficiency of the PCOS will be low.

FIG. 18 illustrates a further prior art polarisation conversion system. This PCOS is described in U.S. Pat. No. 5,900,977 and in WO97/01779, and consists of three elements that are shown separated in FIG. 18 for clarity.

The first component 10 of the PCOS of FIG. 18 splits unpolarised or partially polarised light into two components propagating in different directions and having orthogonal linear polarisations. The second component 11 is a polarisation-rotating element that rotates the plane of polarisation of light. The rotation of the plane of polarisation produced by the second component 11 is strongly dependent on the angle of incidence of light. Light incident on the component 11 in the normal direction, such as the beam $b_1$, will have its plane of polarisation rotated by 90°. Light that is incident on the element 11 in a non-normal direction, such as the beams $b_2$, will have their plane of polarisation unchanged.

The third component 12 bends the beams of light, so as to produce a substantially collimated output beam. The first and third, components 10, 12 consist of alternating areas of birefringent material and optically isotropic material.

The polarisation conversion system of FIG. 18 suffers from a low acceptance angle. For example, the acceptance angle of a typical projection system may be of order 5 degrees, whereas for this element a lower acceptance angle for high convergence efficiency may be expected. Such an element may be suitable for use with a laser such as in a CD player.

U.S. Pat. No. 5,440,424 discloses a sheet polarisation conversion system that contains a polarisation-separating component, a polarisation-rotating component and a combining component. This polarisation conversion system also has a low acceptance angle.

EP-A-0 753 780 discloses a polarisation separation element that comprises a liquid crystal layer sandwiched between two substrates. One of the substrate has a serrated surface structure, so that the thickness of the liquid crystal layer is not constant. Unpolarised light incident on the polarisation separation element is split into two different polarisation components at the interface between the serrated substrate and the liquid crystal layer, and the two polarisation components leave the polarisation separation element travelling in different directions.

In the polarisation separation element disclosed in EP-A-0 753 780 one of the polarisation components passes through the polarisation separation element without deviation, nominally for all wavelengths of visible light. Light must therefore be incident on the polarisation separation element at non-normal incidence to prevent significant loss of light. This means that an optical projector using the polarisation separation element of EP-A-0 753 780 is required to use a tilted lamp in order to prevent significant loss of light.

SUMMARY OF THE INVENTION

A first aspect of the present invention provides a polarisation separation element comprising: a first array of prisms, each prism having a wedge-shaped cross-section; and a second array of prisms, each having a wedge-shaped cross section; wherein each prism of the first array is disposed with an inclined face disposed adjacent an inclined face of a corresponding prism of the second array; wherein each prism of at least one of the arrays of prisms is a birefringent prism; and wherein the polarisation separation element is arranged to deviate light having the first polarisation and to deviate light hating the second polarisation.

A polarisation separation element of the present invention deviates both the first polarisation component and the second polarisation component. That is, the direction in which the first polarisation component is output from the polarisation separation element and the direction in which the second polarisation component is output from the polarisation separation element are both different from the direction of the incident light. When a polarisation conversion system having a polarisation separation element of the present invention is incorporated in a projection display system, the use of a non-tilted lamp geometry does not lead to additional loss of light assuming the correct materials and prism geometries are used.

Each prism of the first array of prisms may be a birefringent prism and each prism of the second array of prisms may be a birefringent prism. Each prism of the first array may be arranged with its optic axis perpendicular to the optic axis of the corresponding prism of the second array.

Each prism of the first array of prisms may be an optically isotropic prism and each prism of the second array of prisms may be birefringent prism.

The ordinary refractive index $n_o$ of a prism of the second array, the extraordinary refractive index $n_e$ of a prism of the second array and the refractive index n of a prism of the first array may be chosen such that:

$$n_o < n < n_e$$

The array of birefringent prisms, or one of the arrays of birefringent prisms if there are more than one array of birefringent prisms, may comprise a liquid crystal material.

The polarisation separation element may comprise spacers for determining the thickness of the liquid crystal layer. Each spacer element may be integral with a respective one of the prisms of the first array.

The array of birefringent prisms, or one of the arrays of birefringent prisms if there are more than one array of birefringent prisms, may alternatively comprise a reactive mesogen, or may comprise a polymer-stabilised liquid crystal material.

The polarisation separation element may further comprise a third array of prisms, each having a wedge-shaped cross-section; and a fourth array of prisms, each having a wedge-shaped cross-section; and each prism of the third array may be disposed with an inclined face adjacent an inclined face of a corresponding prism of the fourth array; and each prism of the third array may be a birefringent prism.

The direction of the optic axis of a prism of the second array may vary over the thickness of the prism.

The direction of the optic axis of a prism of the second array may vary by substantially 90° over the thickness of the prism, the optic axis being substantially perpendicular to the direction of incident light over the thickness of the prism. The direction of the optical axis of a prism of the second array at the face of the prism disposed closer to the third array of prisms may be perpendicular to the optic axis of the prisms of the third array. The second array of prisms may comprise a liquid crystal layer.

A second aspect of the present invention provides a polarisation conversion element comprising: a first lens array for converging incident collimated light; a polarisation separation element for directing light having a first polarisation in a first direction and for directing light having a second polarisation different from the first polarisation in a second direction different from the first direction: and one or more polarisation conversion elements for converting light having the first and second polarisations to light having a substantially common output polarisation; wherein the polarisation separation element is a polarisation separation element as defined above.

The output polarisation may be the second polarisation.

The array of polarisation conversion elements may be disposed substantially in the focal plane of the first lens array.

The first lens array may be disposed between the polarisation separation element and the polarisation conversion element. Alternatively, the first lens array may be disposed before the polarisation separation element.

The polarisation conversion system may further comprise a second lens array for collimating the output of the polarisation conversion element. The first lens array and the second lens array may have a common substrate. The second lens array may be adjacent and behind the polarisation conversion element.

The polarisation conversion element may be disposed directly on the second microlens array. This prevents the polarisation conversion element becoming mis-aligned from the second microlens array.

The polarisation conversion element may be disposed after and may be optically coupled to the second lens array.

The output from the polarisation separation element may be a first beam of linearly polarised light having a first plane of polarisation and a second beam of linearly polarised light having a second plane of polarisation different from the first plane of the polarisation, and the or each polarisation conversion element may be a polarisation rotation element.

The plane of polarisation of the first beam may be at substantially 90° to the plane of polarisation of the second beam.

The one or more polarisation conversion elements may comprise a retarder array having a plurality of first regions alternating with a plurality of second regions, the first and second regions being arranged to receive light of the first and second polarisations, respectively. The first and second regions may have first and second sizes which are matched to the cross-sectional sizes of light beams of the first and second polarisations, respectively, and which are different from each other.

A third aspect of the present invention provides a projection display system comprising a source of unpolarised or partially polarized light, a polarisation conversion system as defined above, and a projection lens.

A fourth aspect of the present invention provides an optical element comprising: a substrate; a first lens array disposed on one surface of the substrate; and a second lens array disposed on an opposing surface of the substrate, each lens of the second lens array being optically associated with a lens of the first lens array.

The first lens array and the second lens array may be integral with the substrate.

An optical element according to this aspect of the invention is suitable for use in a polarisation conversion system of the second aspect of the invention. By disposing both lens arrays on a common substrate the accuracy with which a lens of one array can be aligned with a lens of the other array can be increased, and this enables the pitch of the lens arrays to be reduced. Reducing the pitch of the lens arrays enables their focal lengths to be reduced, so reducing the distance between the two lens arrays and thereby reducing the volume of a polarisation conversion system incorporating the lens arrays.

The pitch of the first lens array may be substantially equal to the pitch of the second lens array. The pitch of the first lens array and the pitch of the second lens array may each be less than 2 mm.

The width W of the optical element and the thickness T of the optical element may satisfy the relationship W/T>3.

DESCRIPTION OF THE PREFERRED EMBODIMENTS

Preferred features of the present invention will now be described by way of illustrative example with reference to the accompanying figures in which.

Figure 1A:
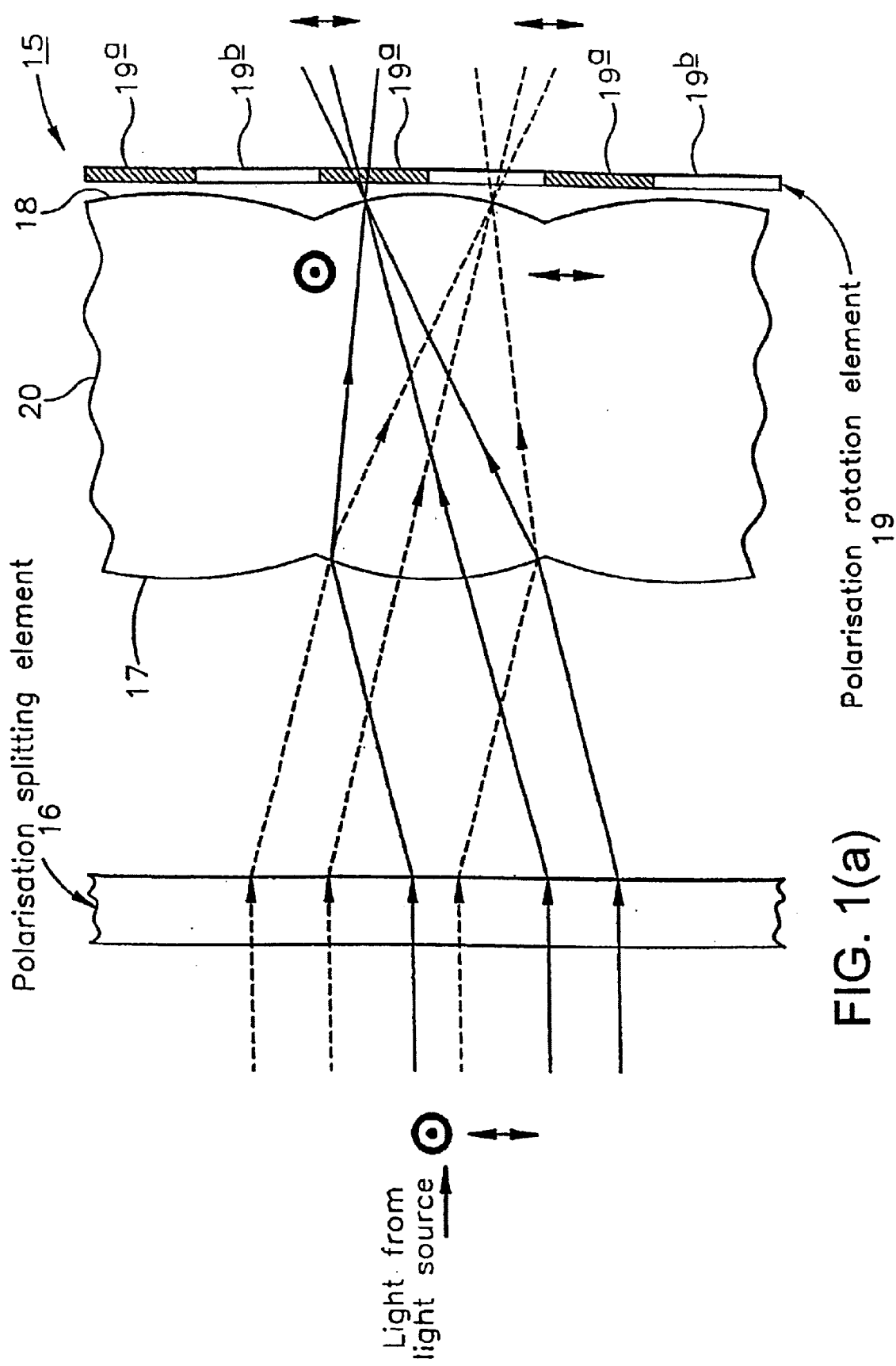
FIG. 1(a) is a schematic diagram of a first embodiment of a polarisation conversion system according to the present invention.
Figure 2A:
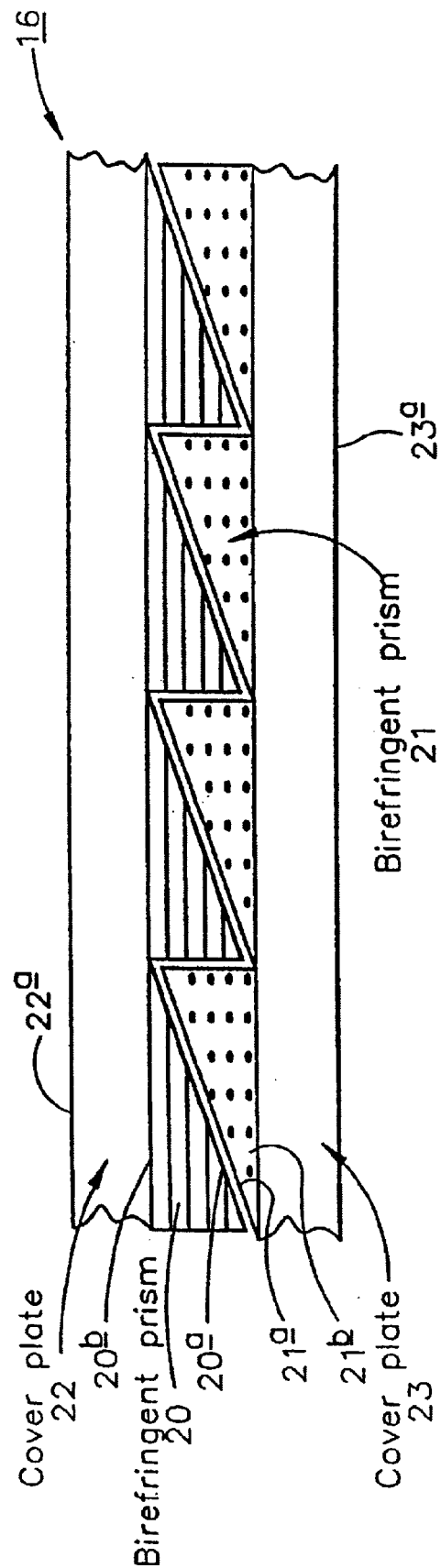
FIG. 2(a) is a schematic sectional view of a first polarisation separation element according to the present invention.
Figure 2B:
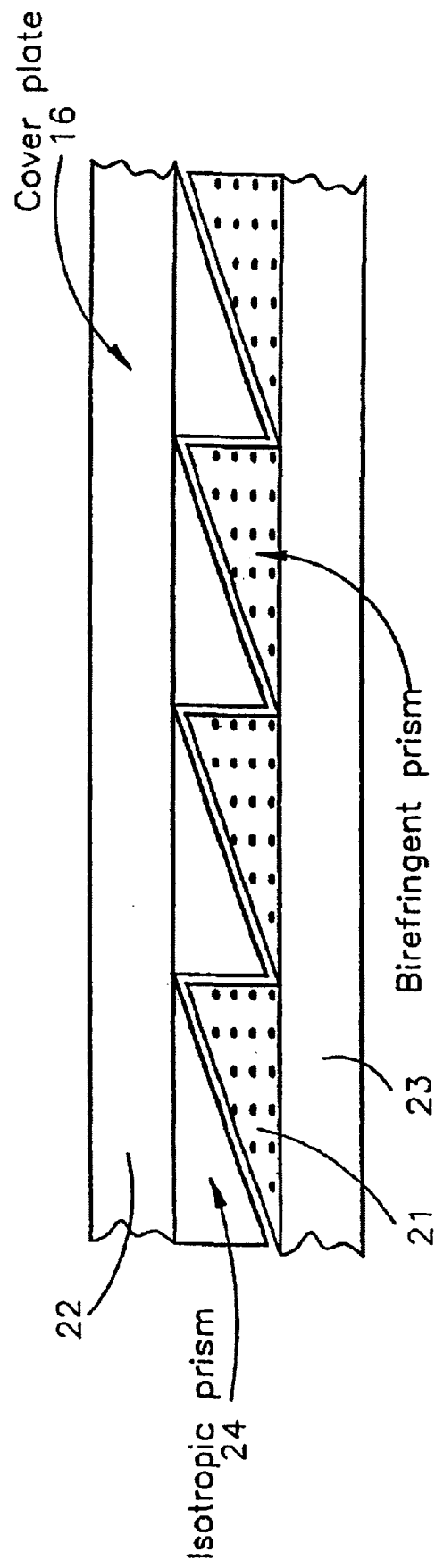
FIG. 2(b) is a schematic sectional view of a second polarisation separation element according to the present invention.
Figure 2C:
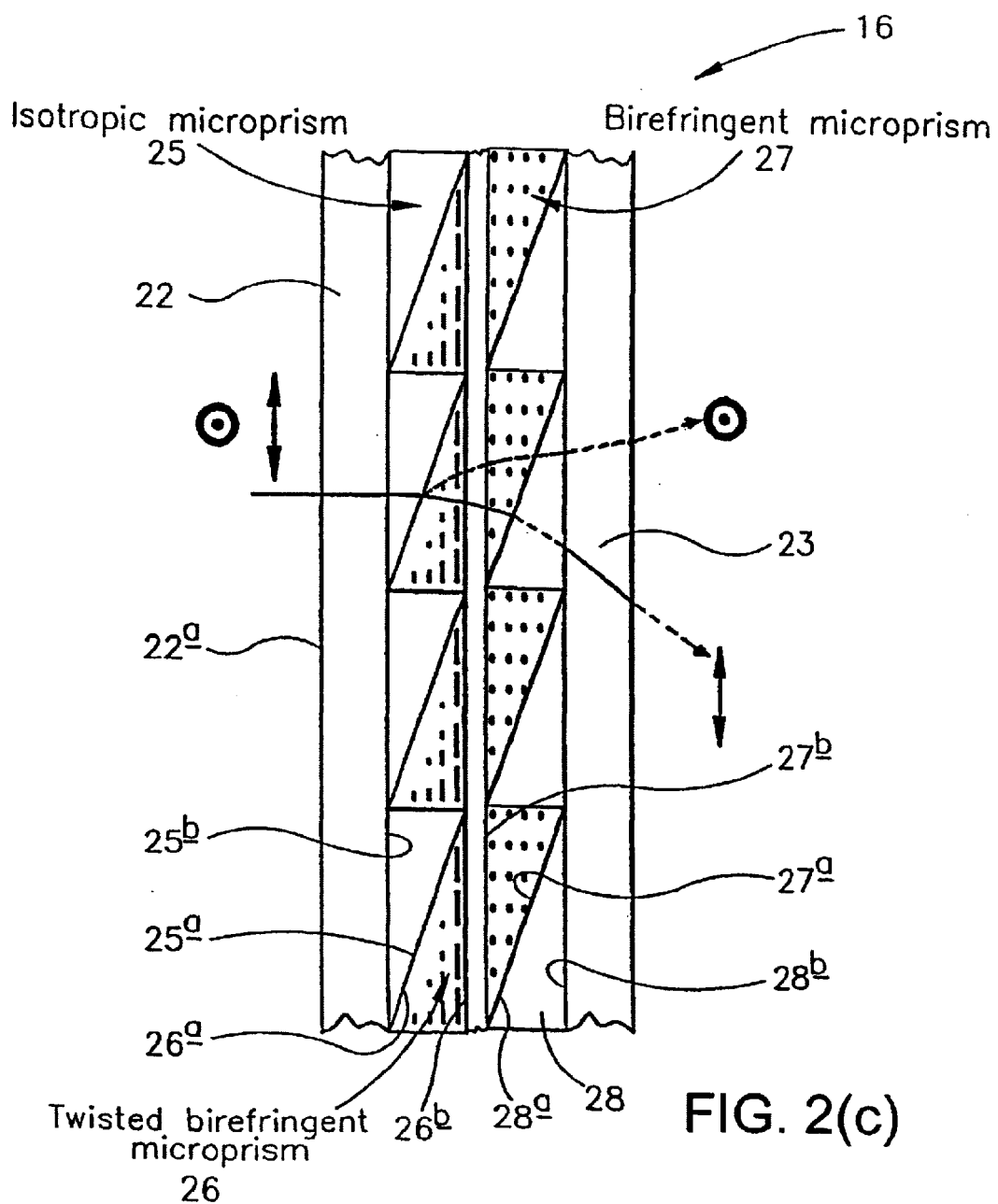
FIG. 2(c) is a schematic sectional view of a further polarisation separation element according to the present invention.
Figure 2D:
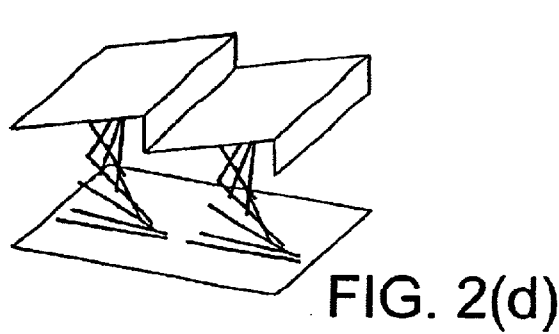
Figure 2E:
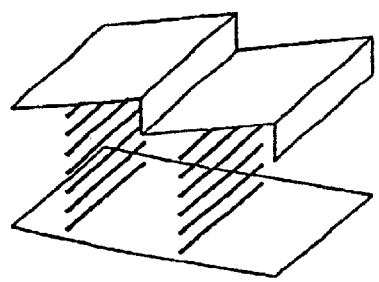
Figure 4:
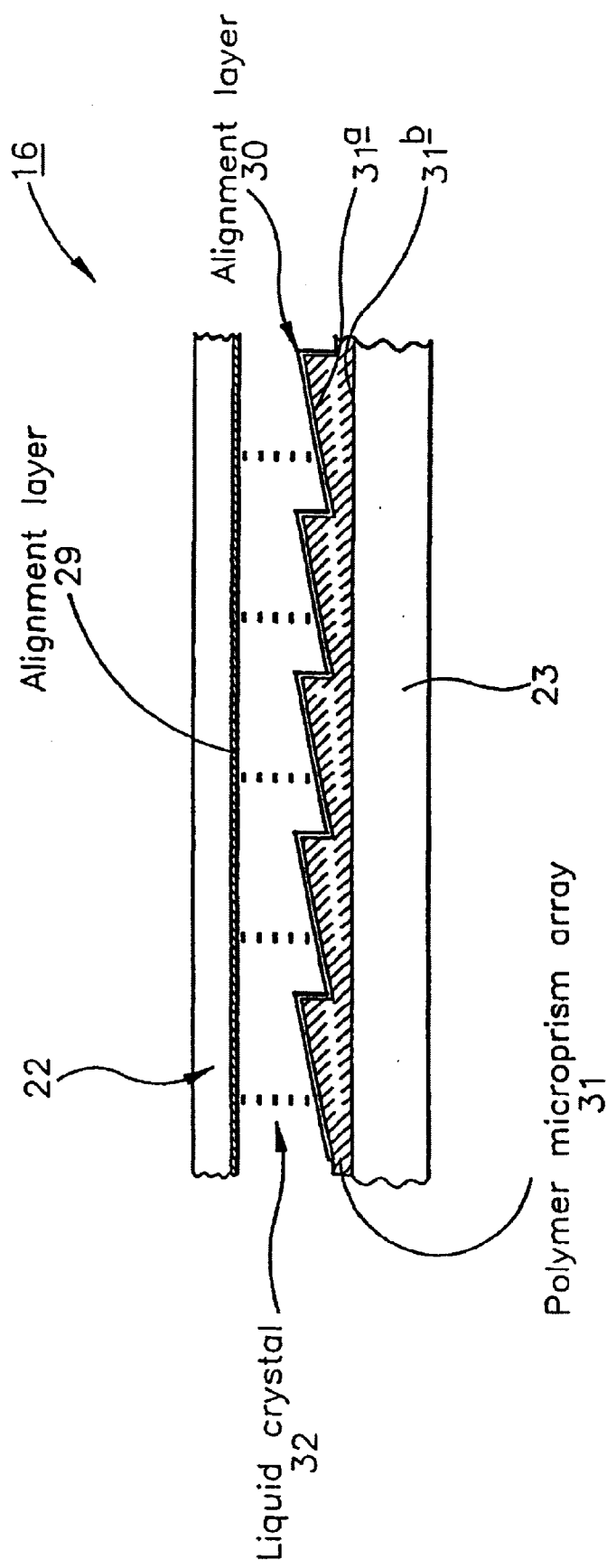
Figure 5:
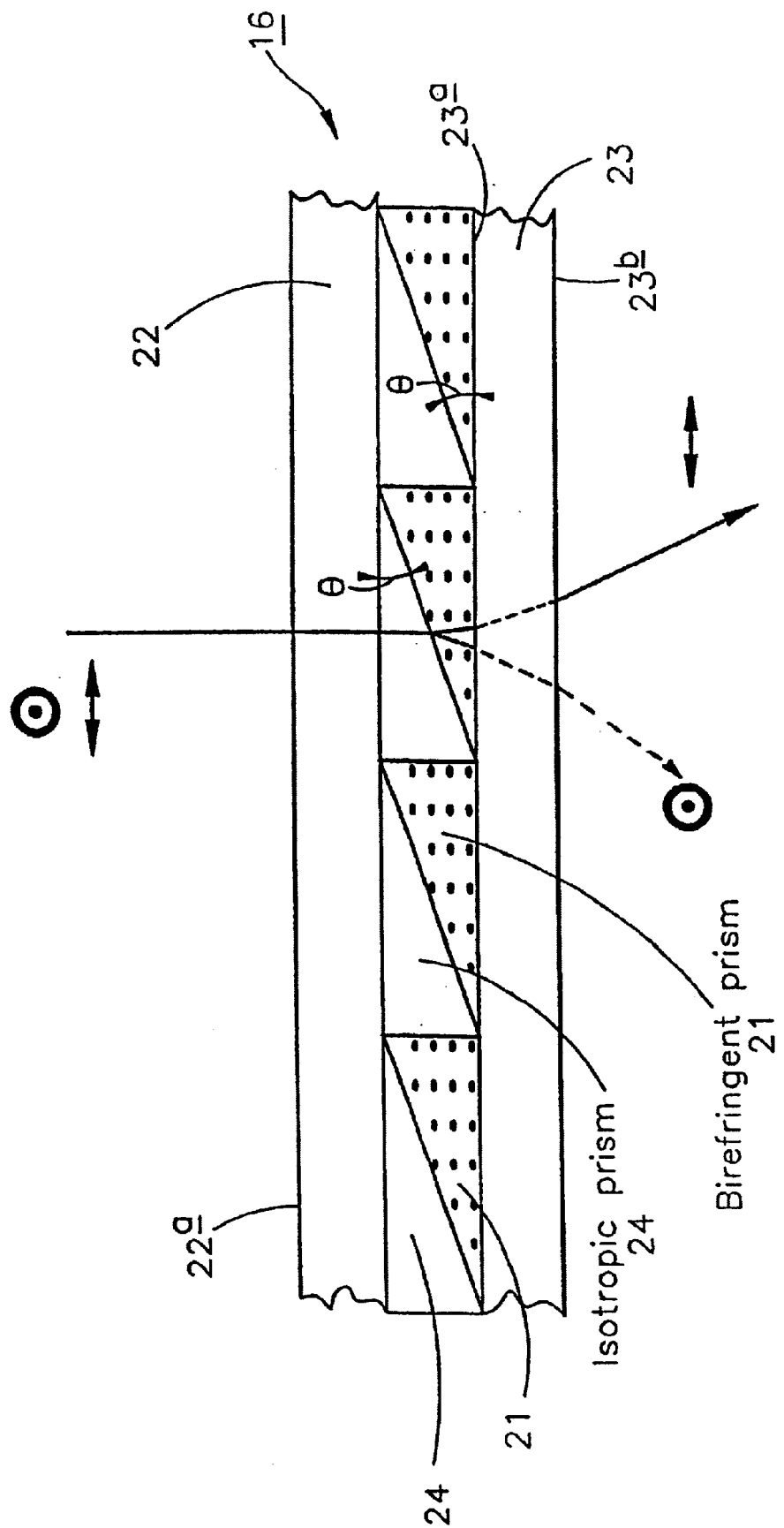
Figure 6A:
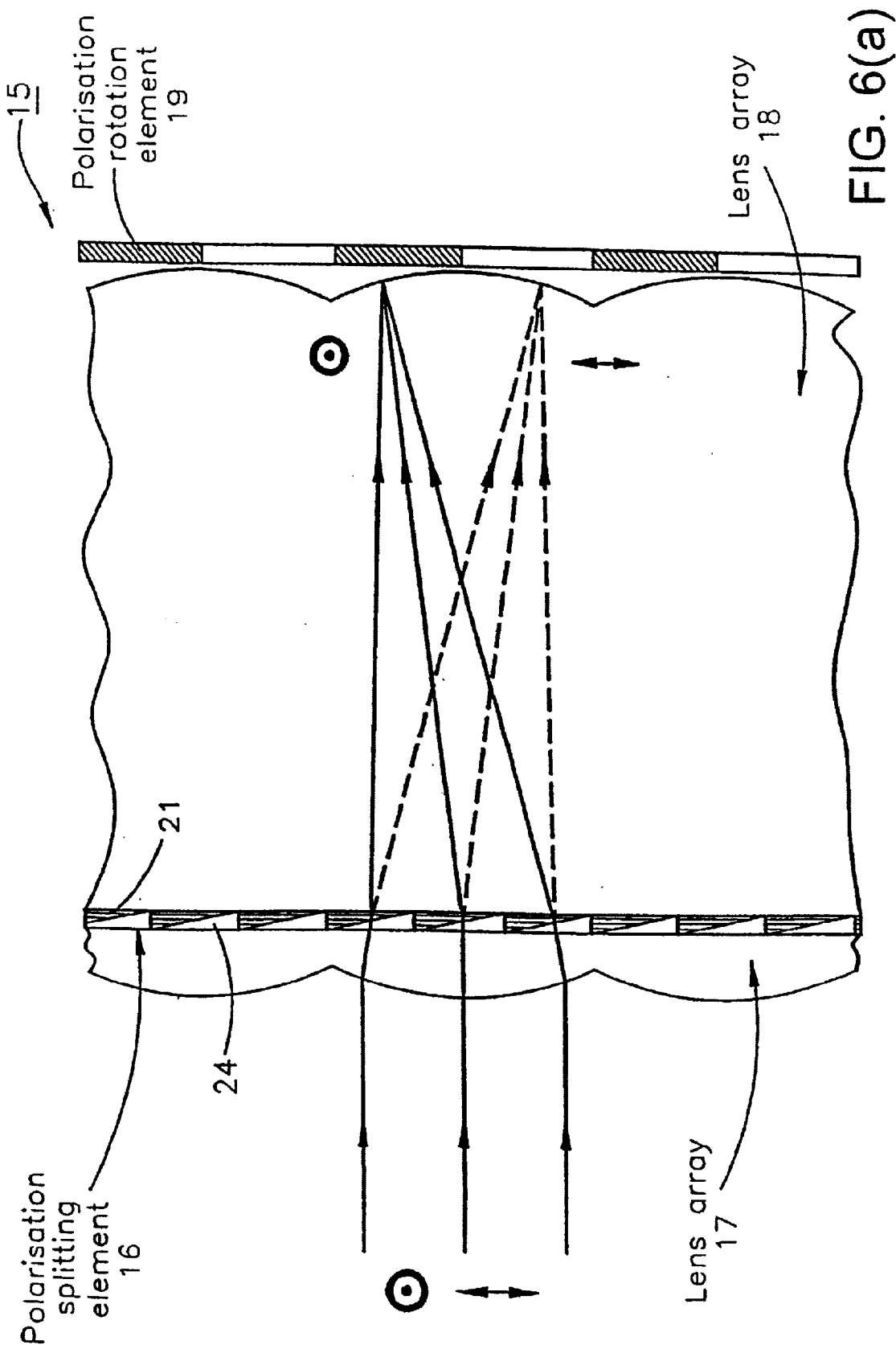
Figure 6B:
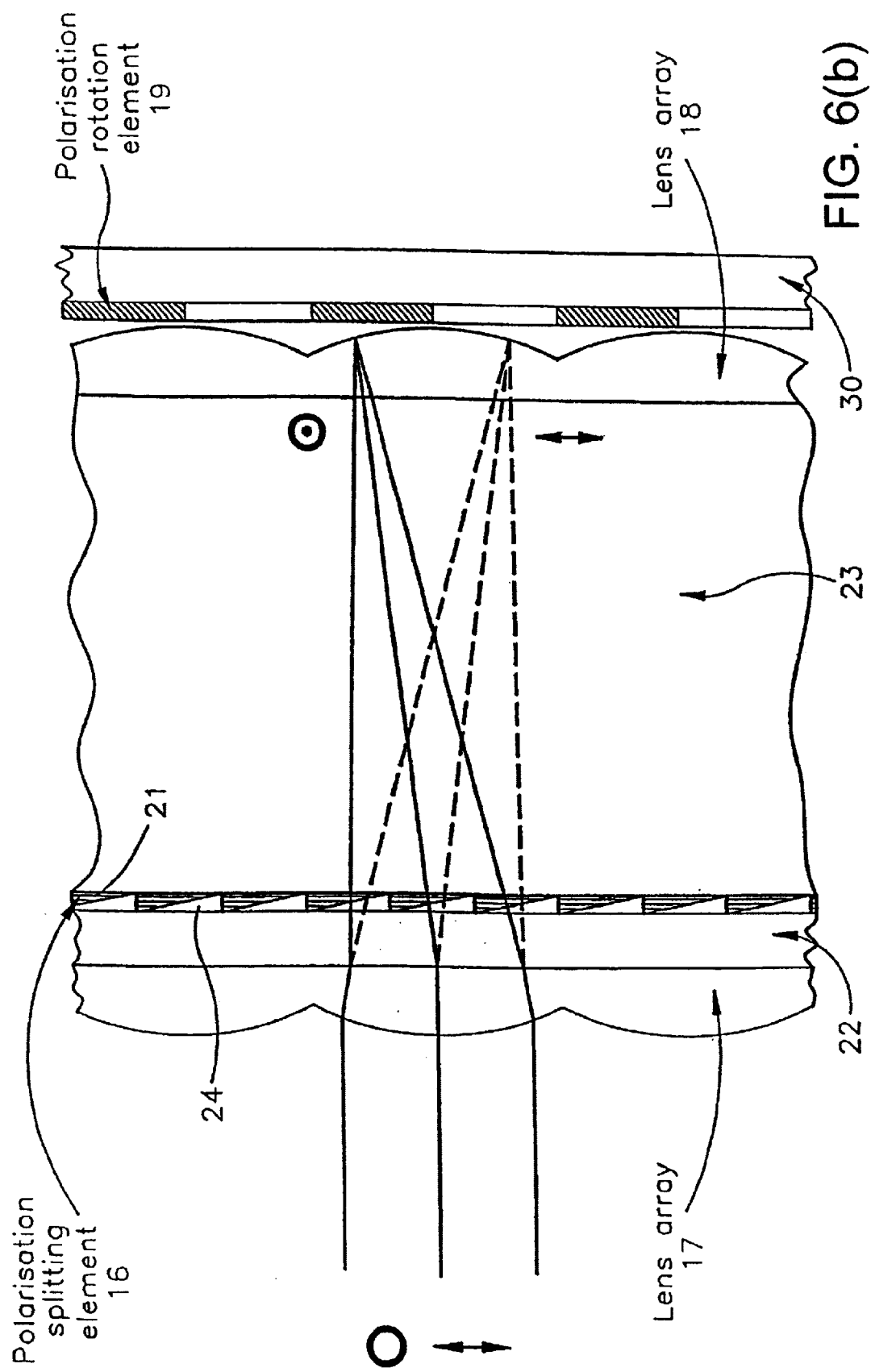
Figure 7A:
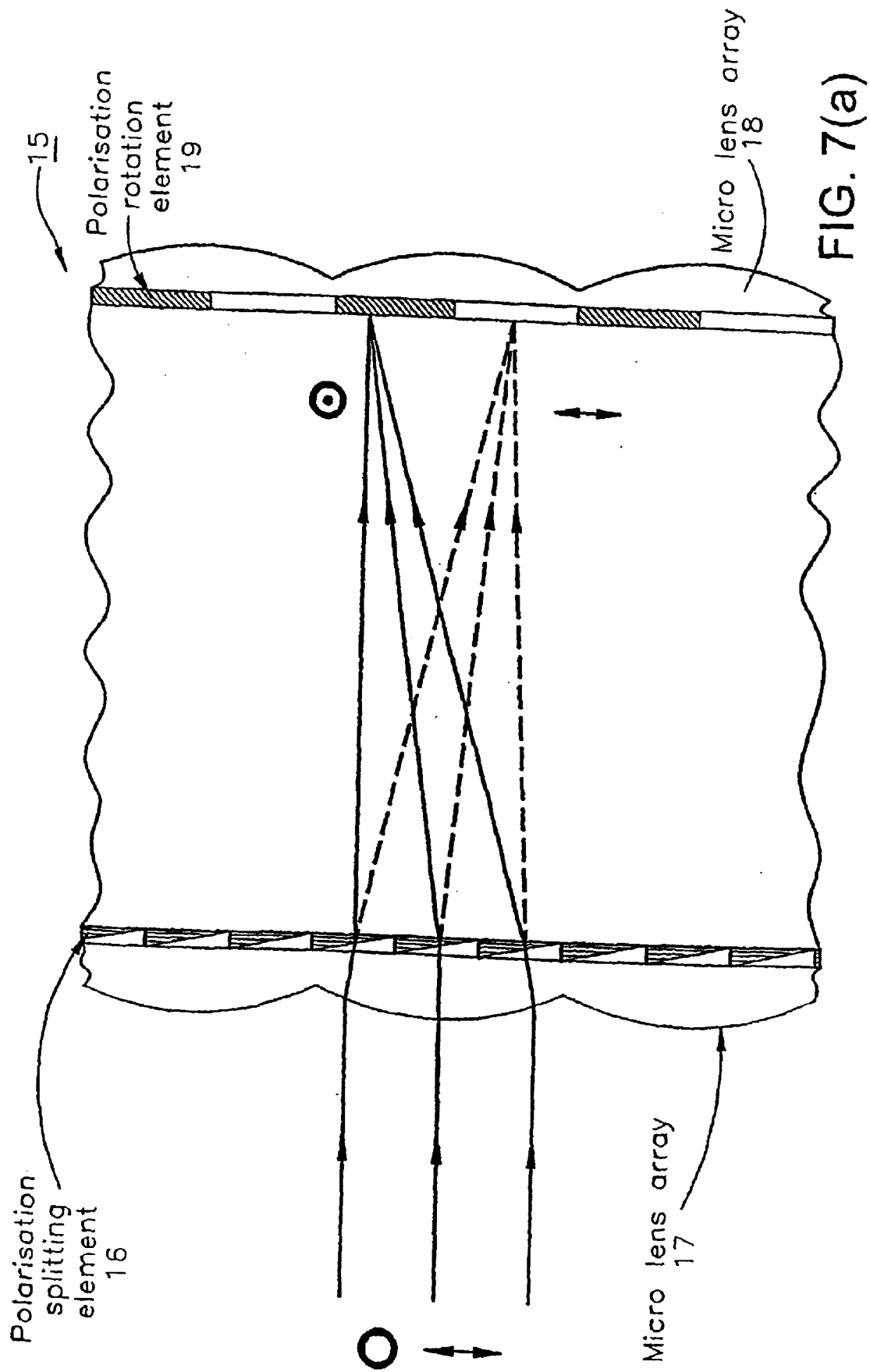
Figure 7B:
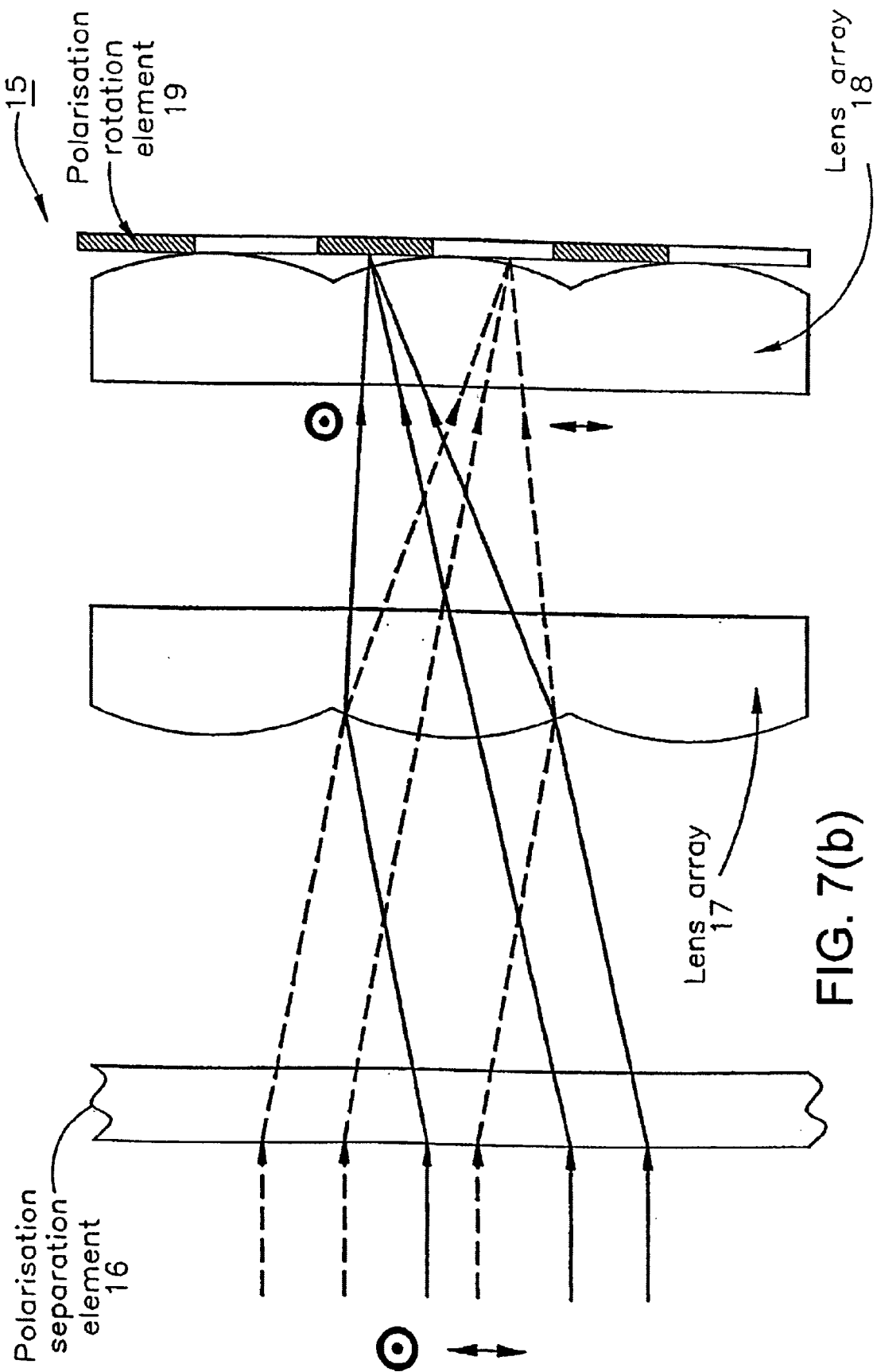
Figure 9:
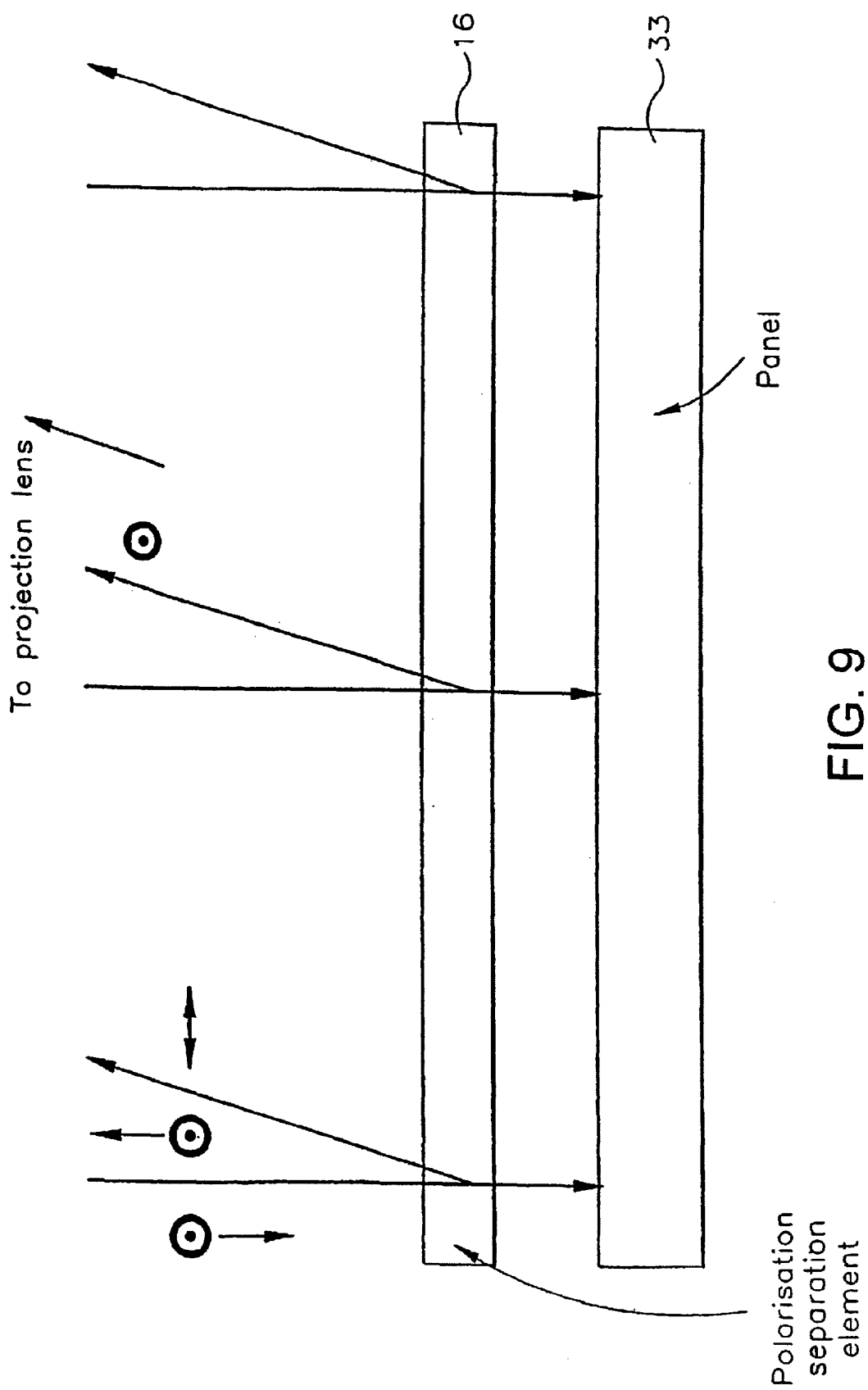
Figure 10:
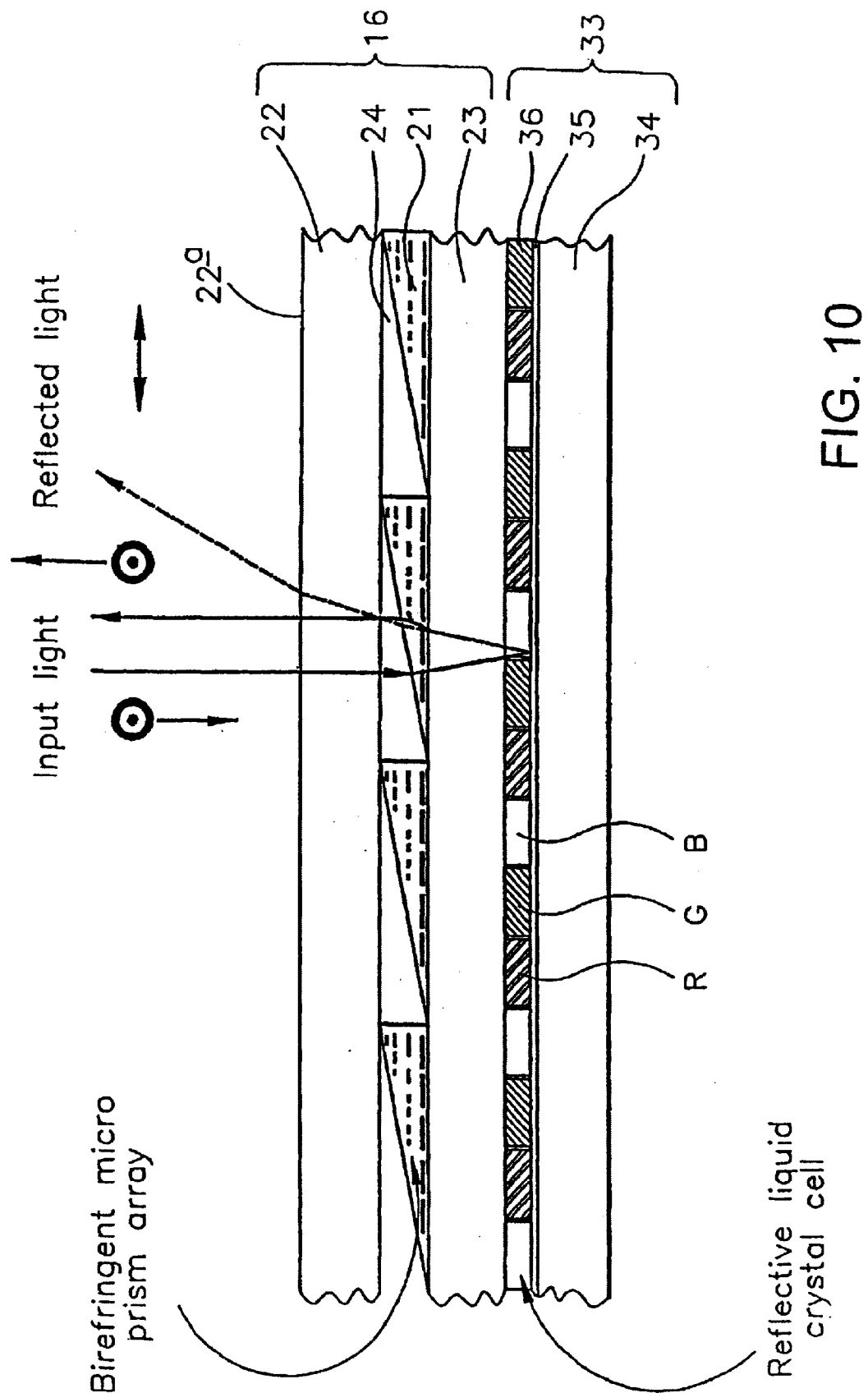
Figure 11:
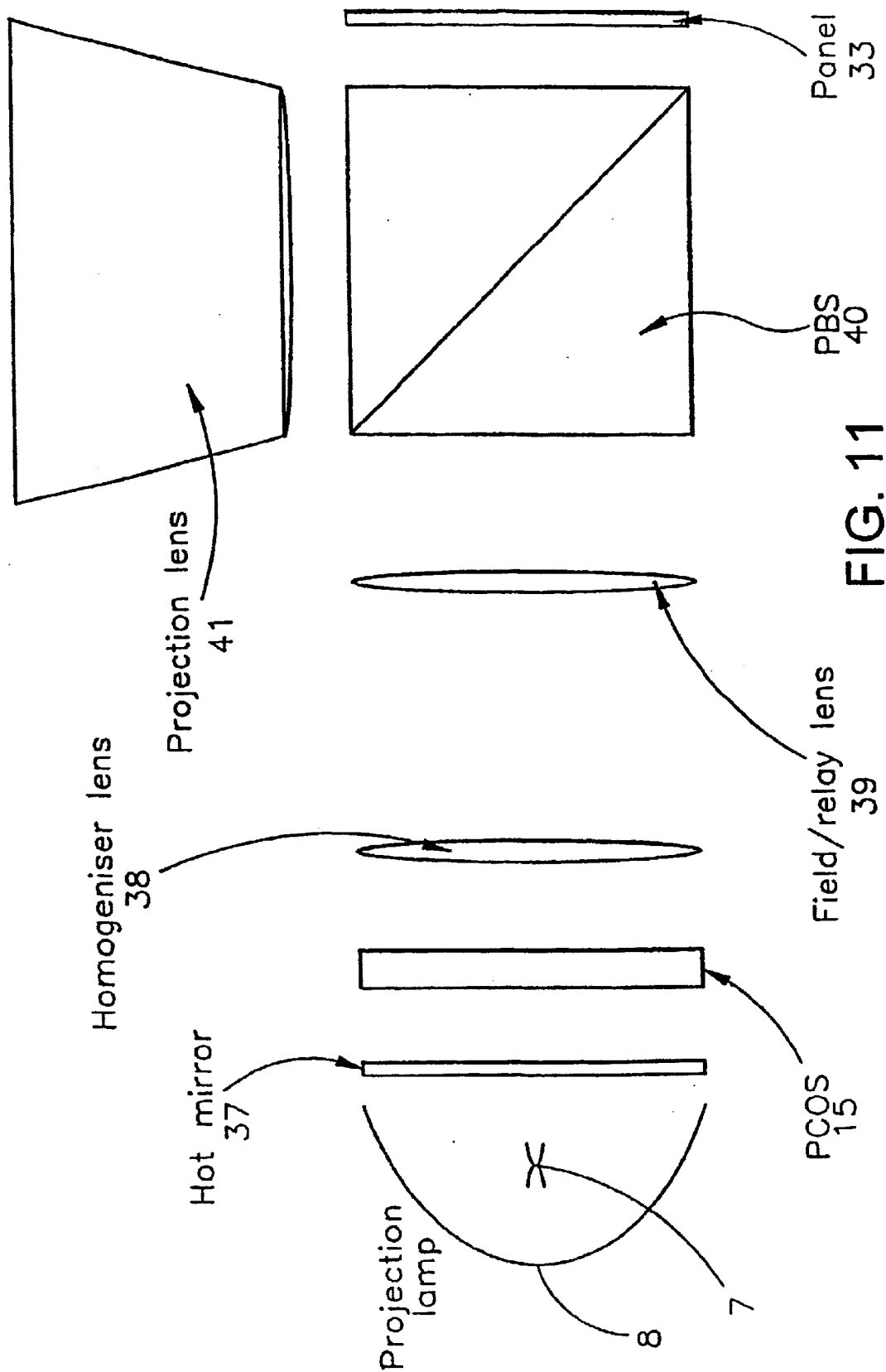
Figure 12:
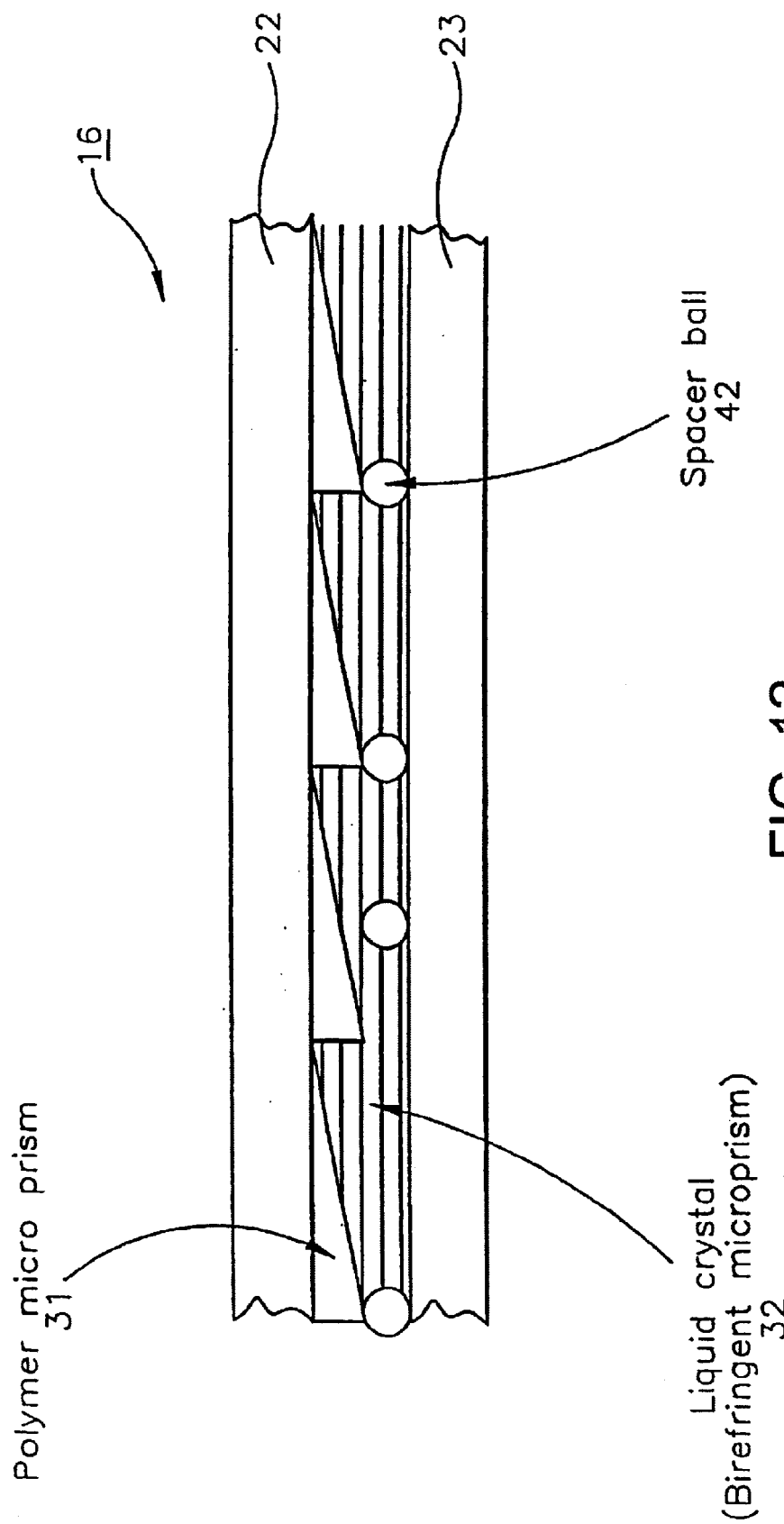
Figure 13:
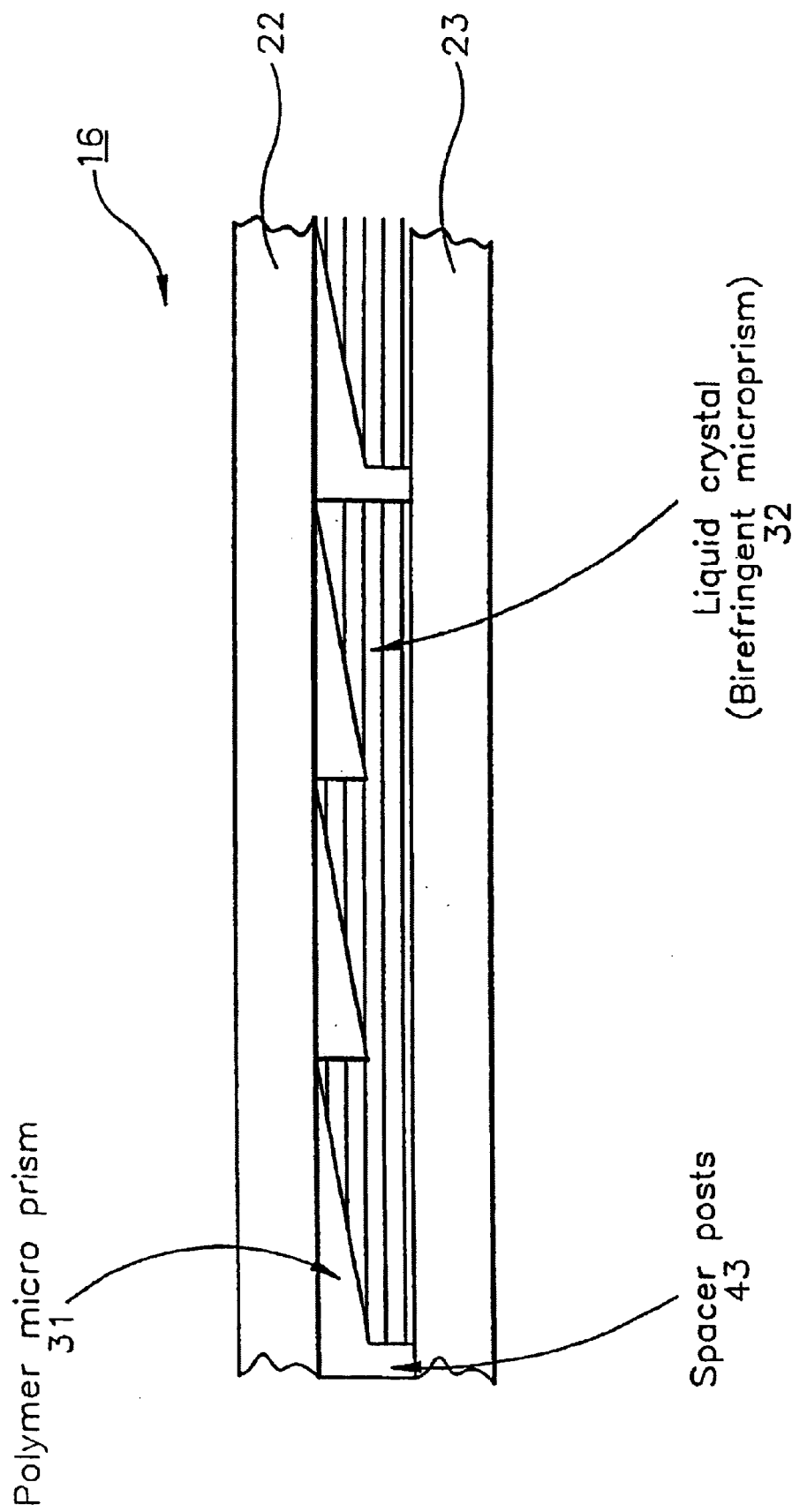
Figure 14C:
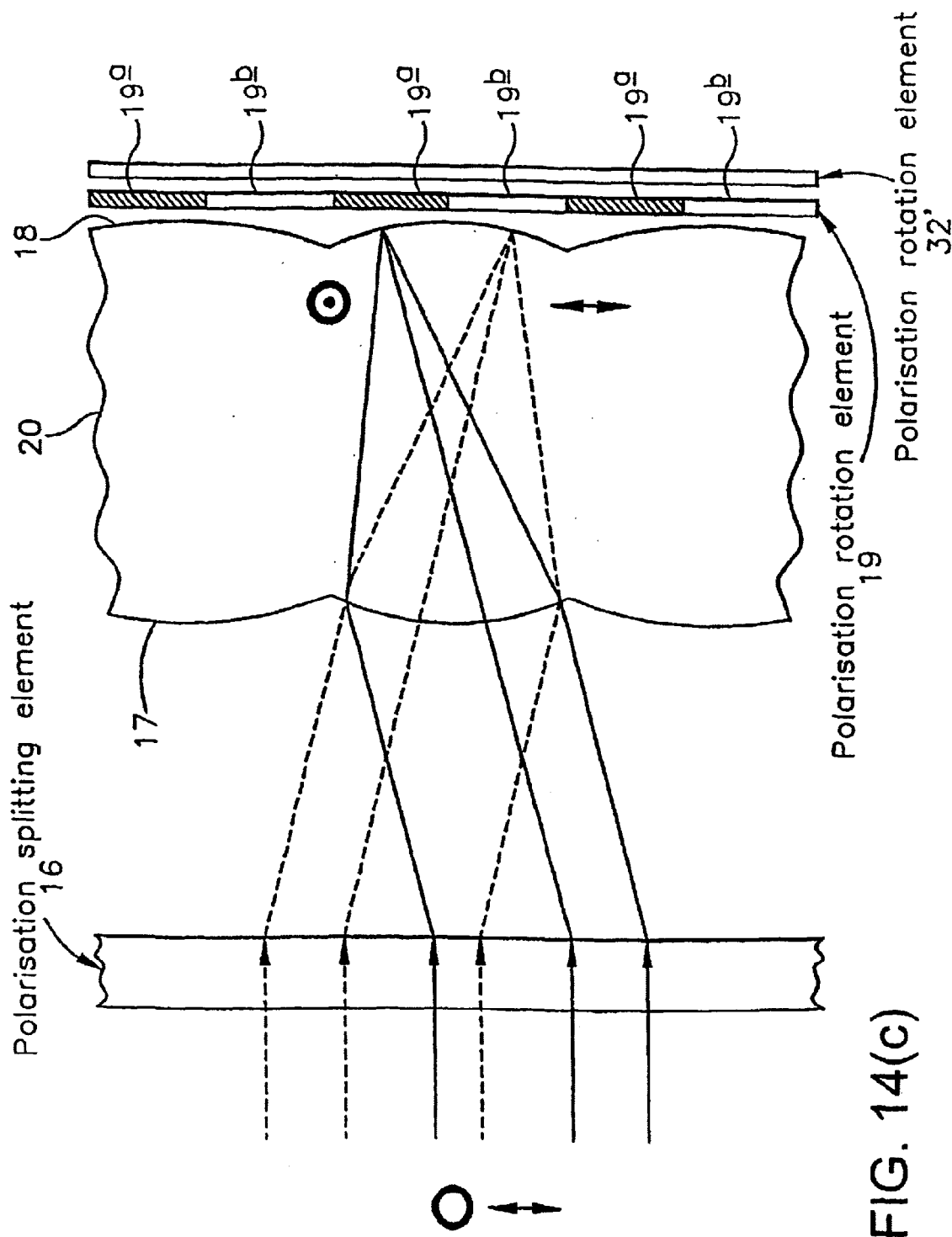
Figure 15A:
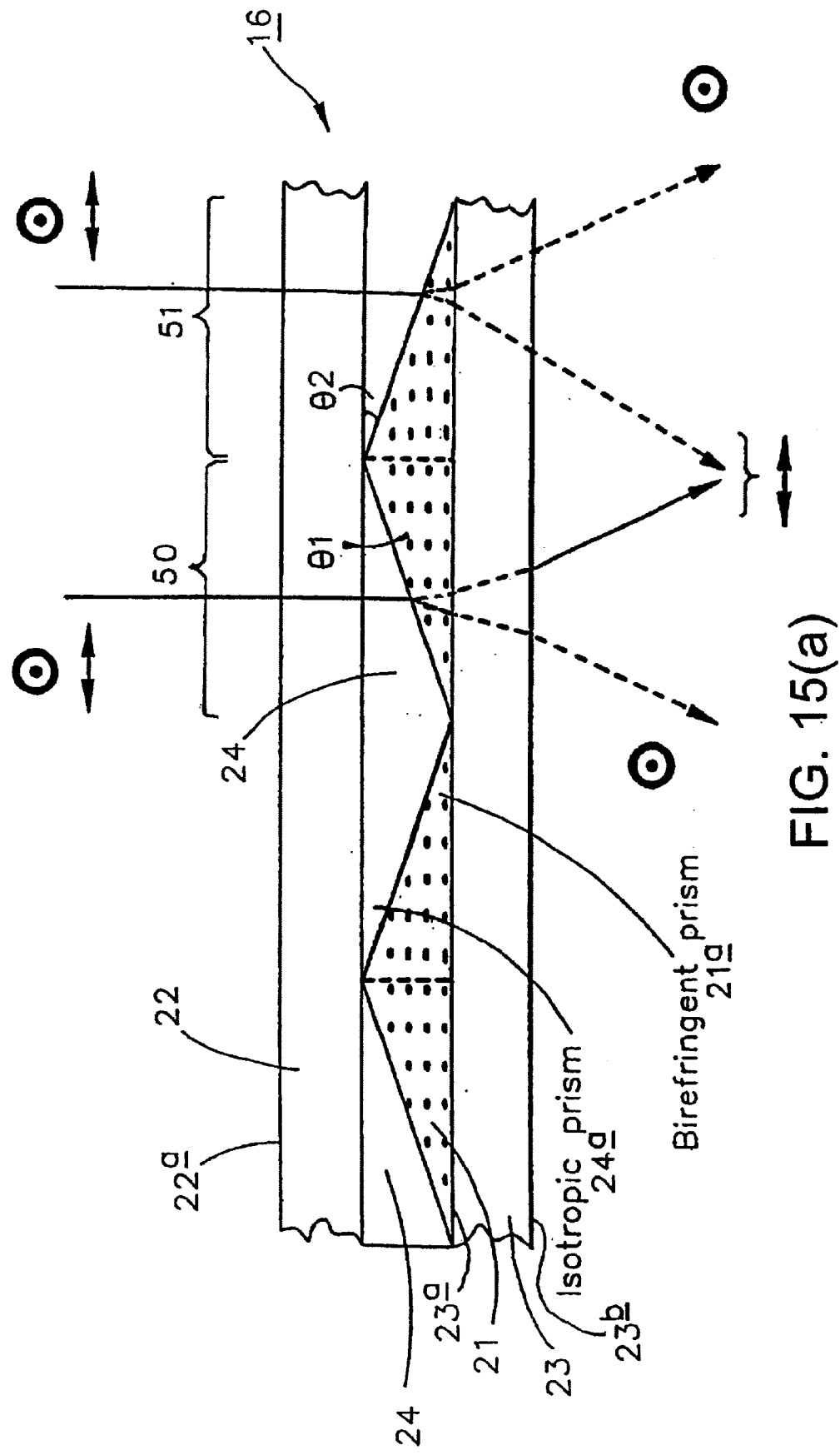
Figure 15B:
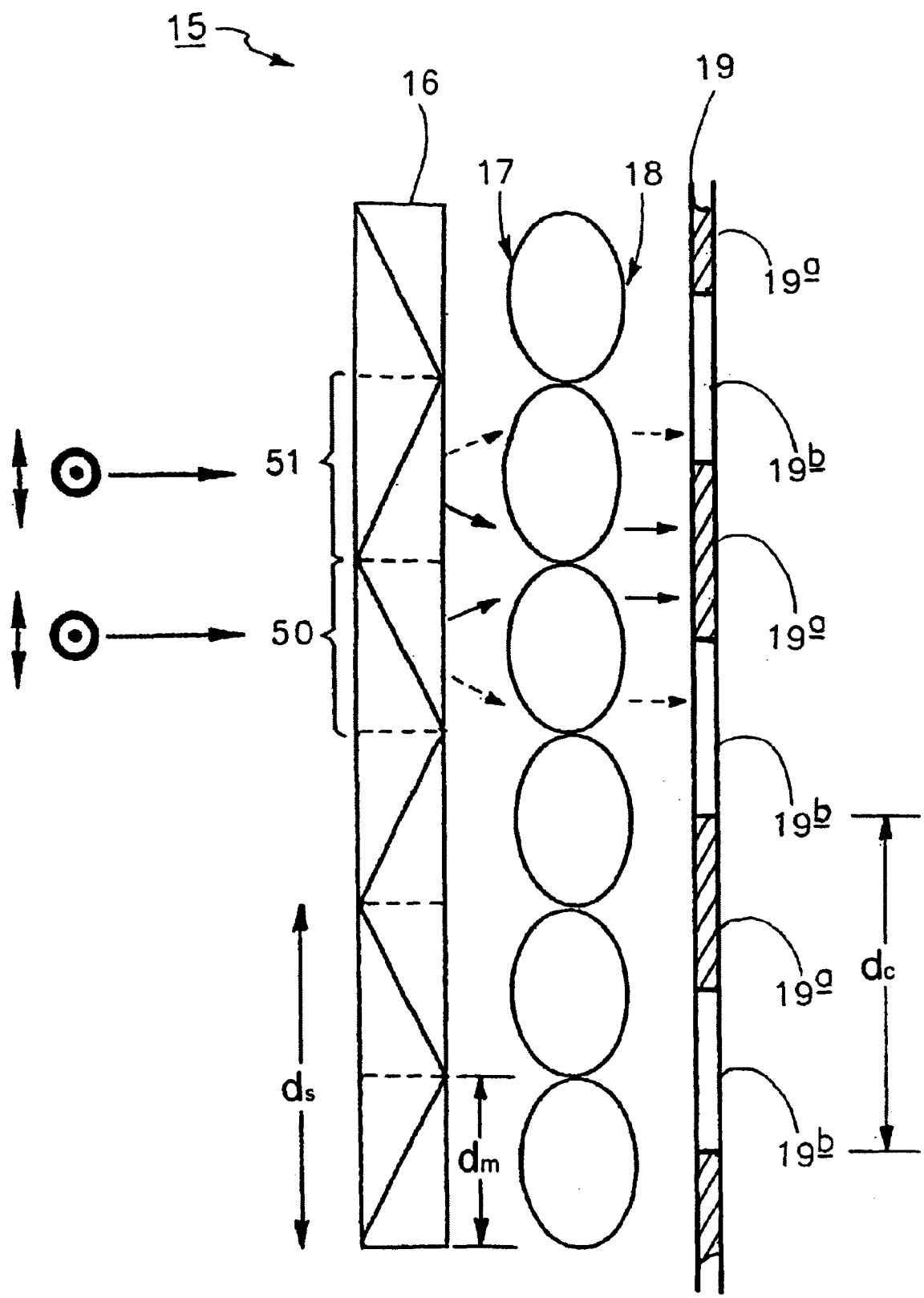
Figure 15C:
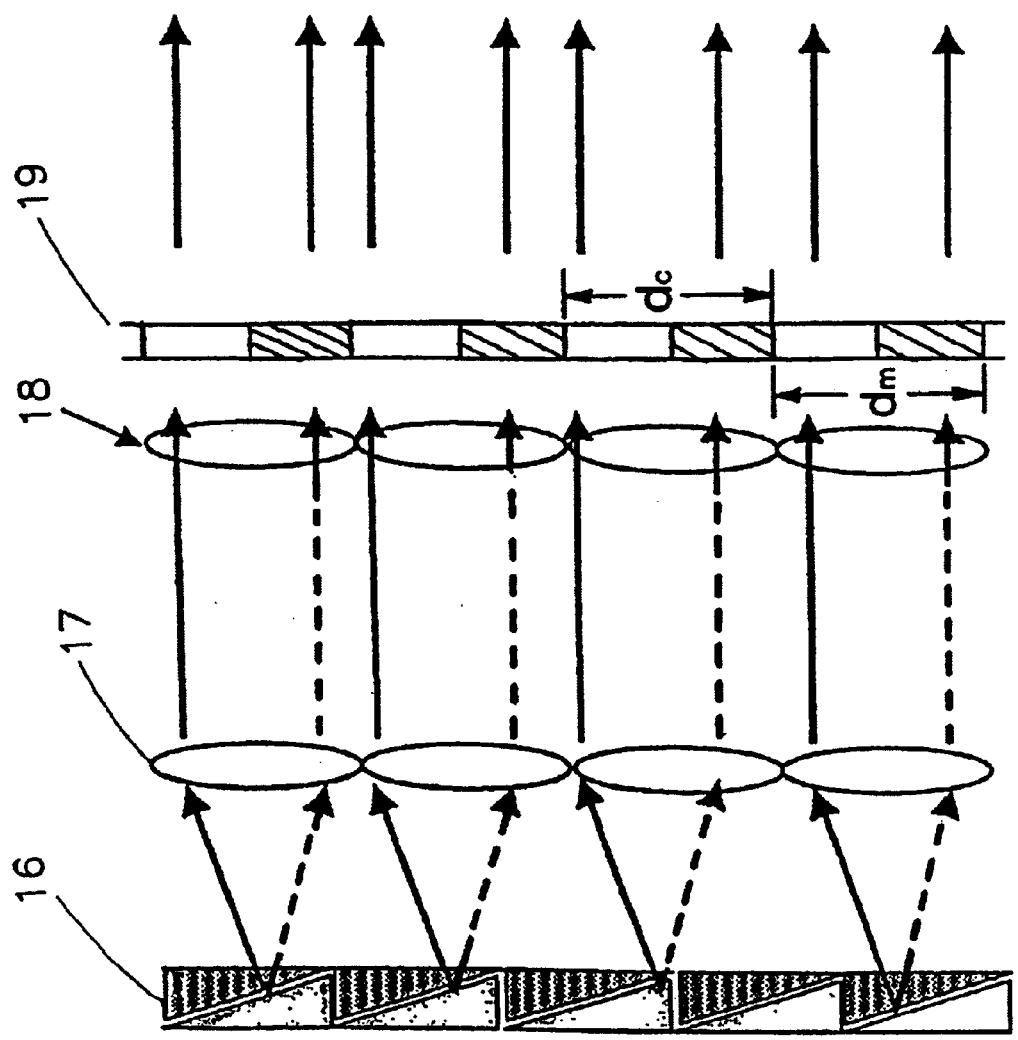
Figure 16:
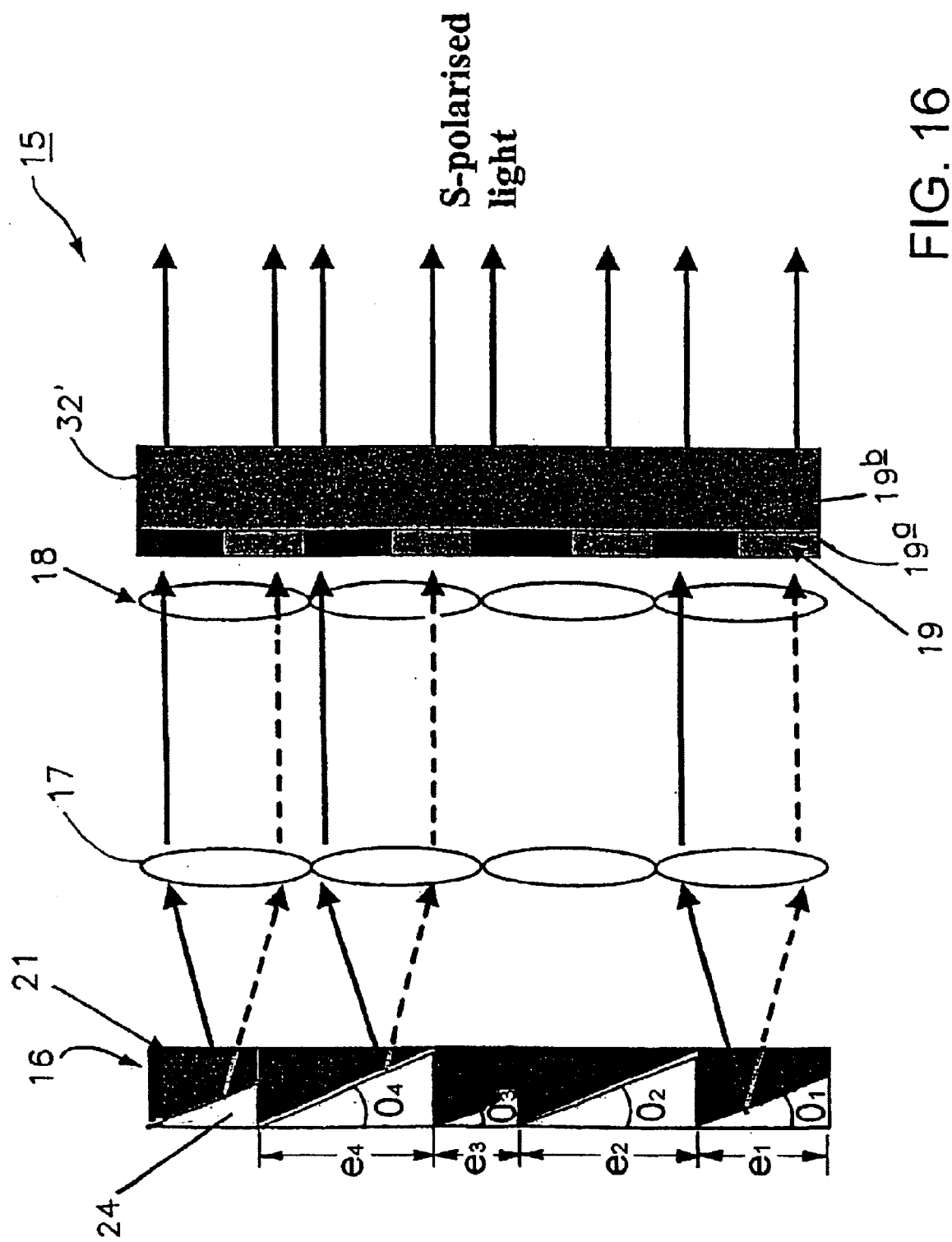
Figure 17:
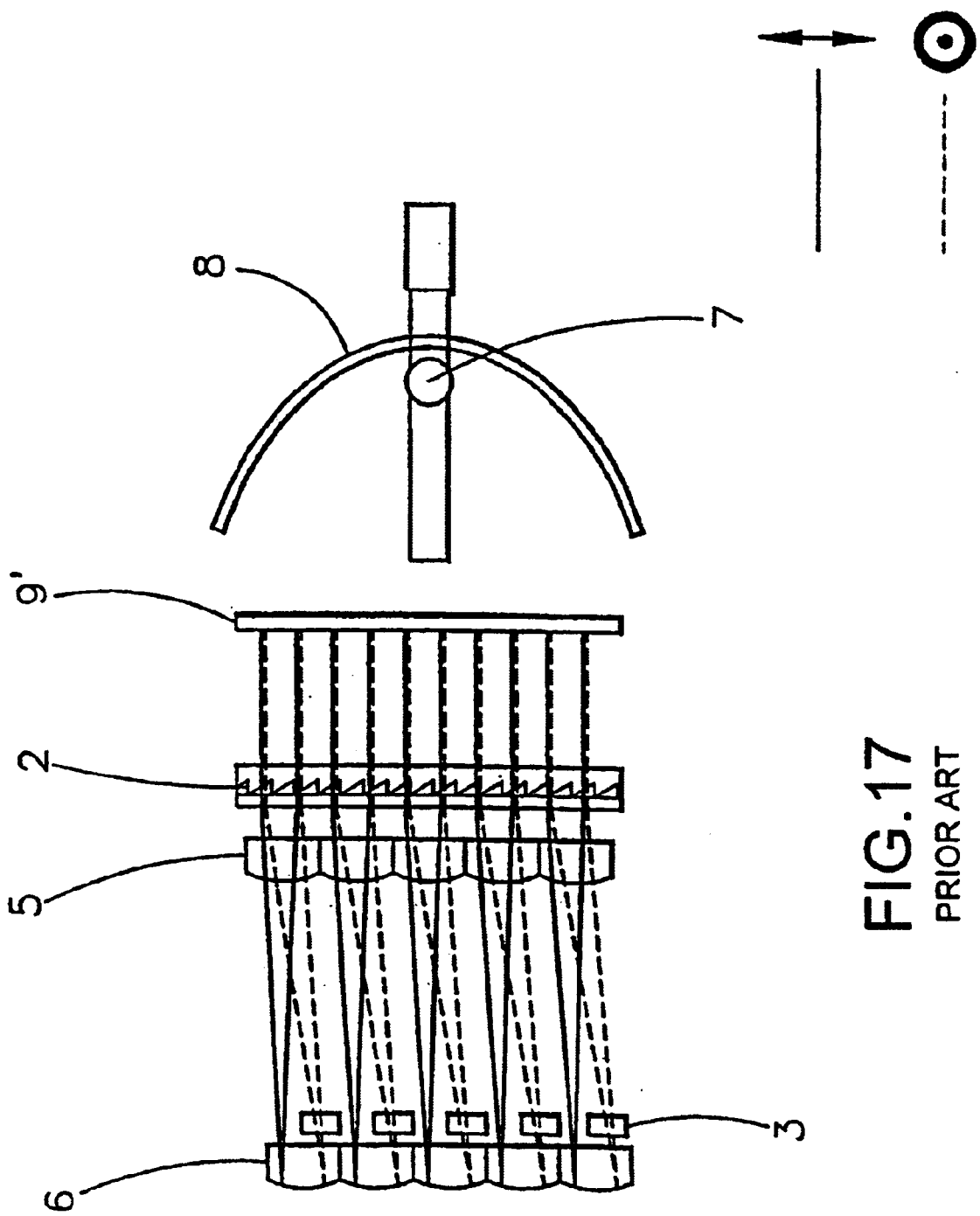
Figure 18:
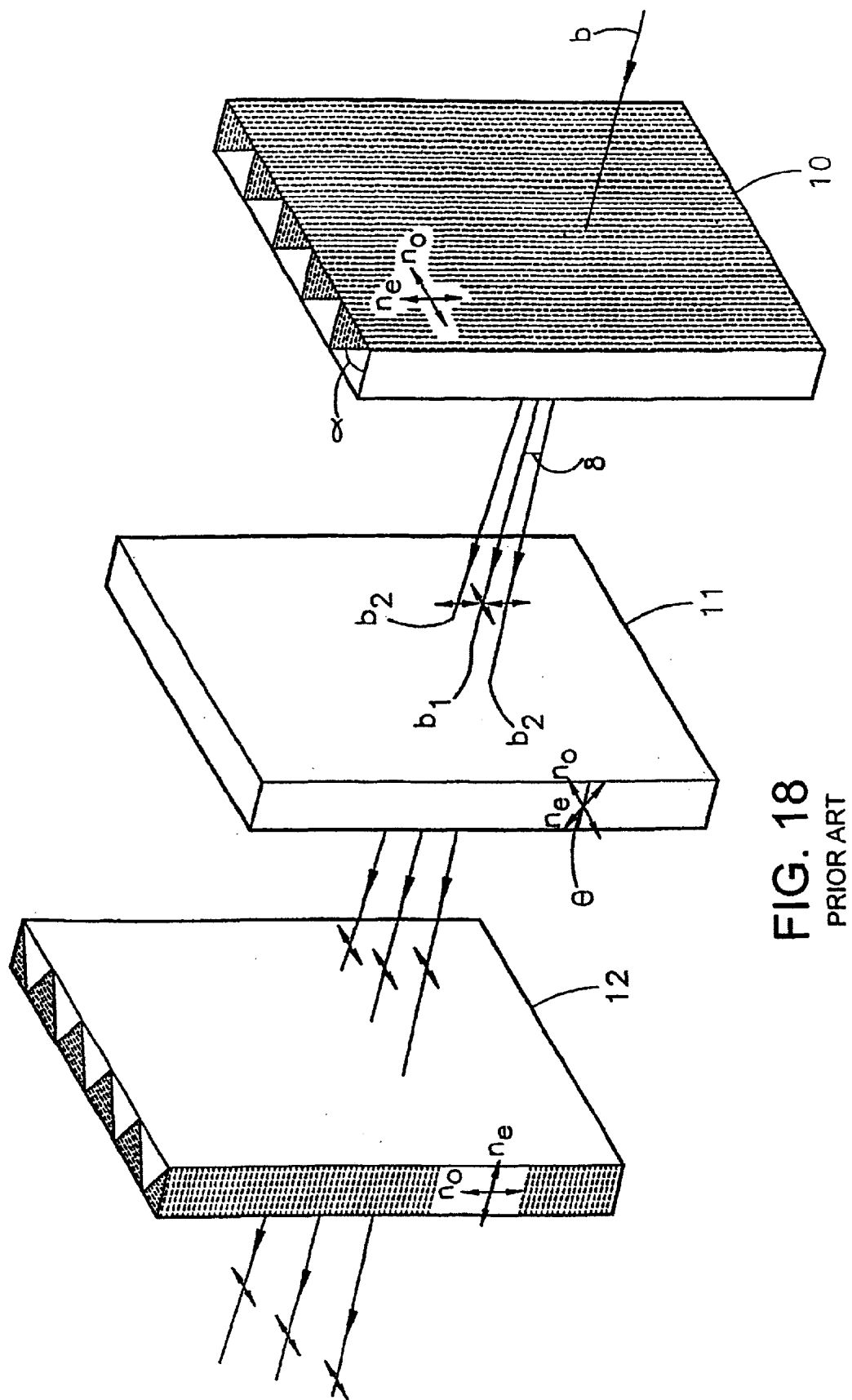
Figure 19:
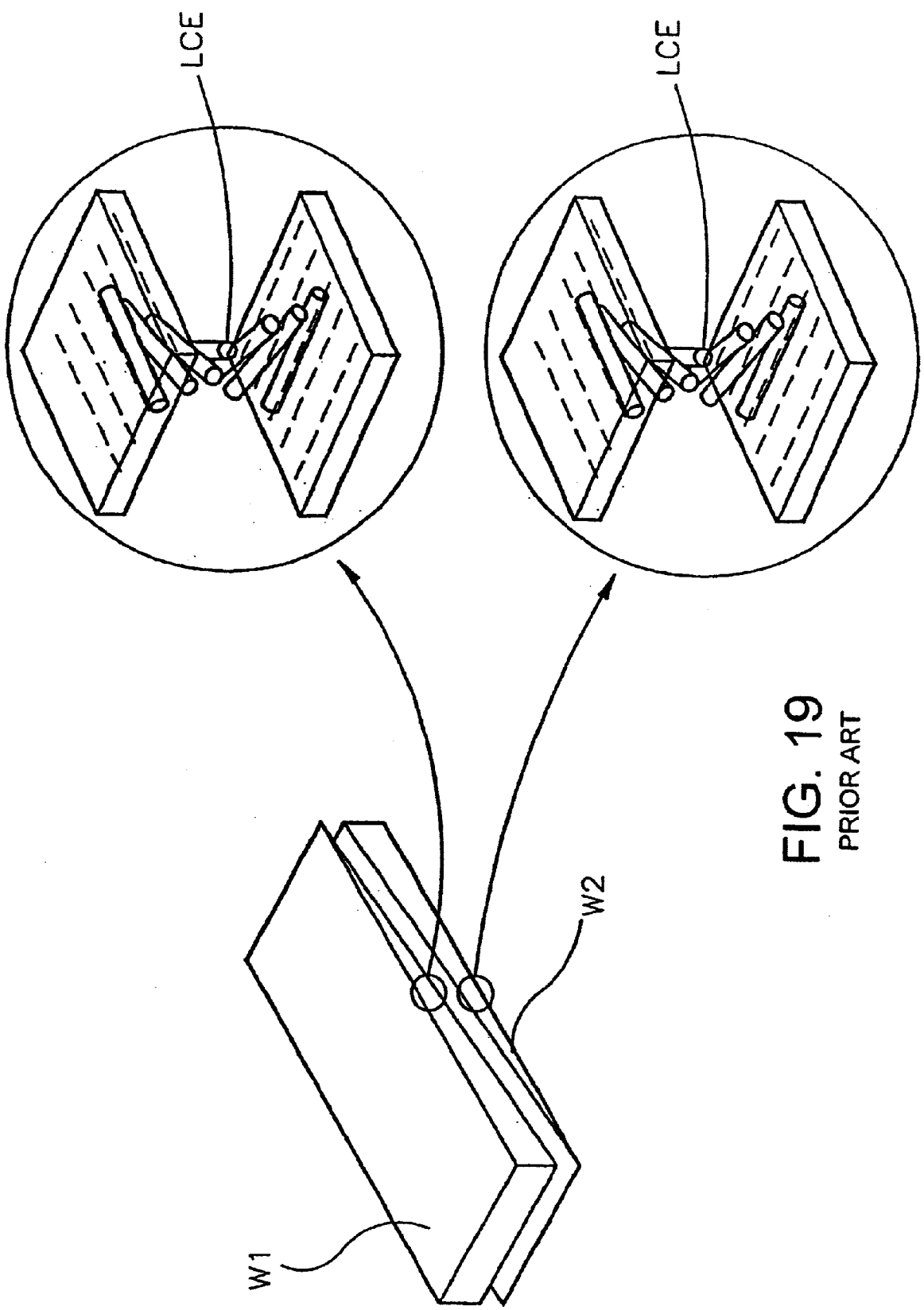
Figure 20:
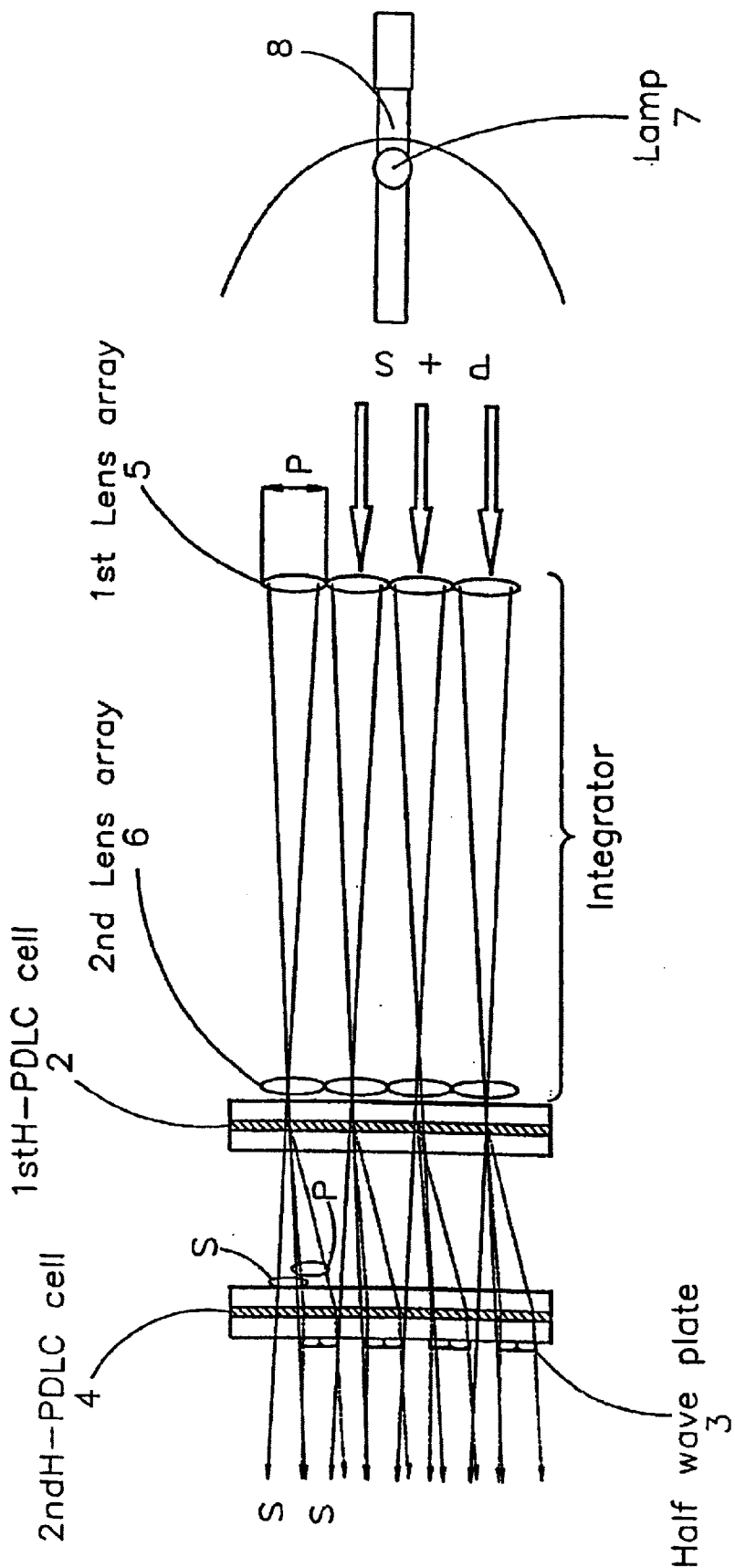
Figures 21A, 21B:
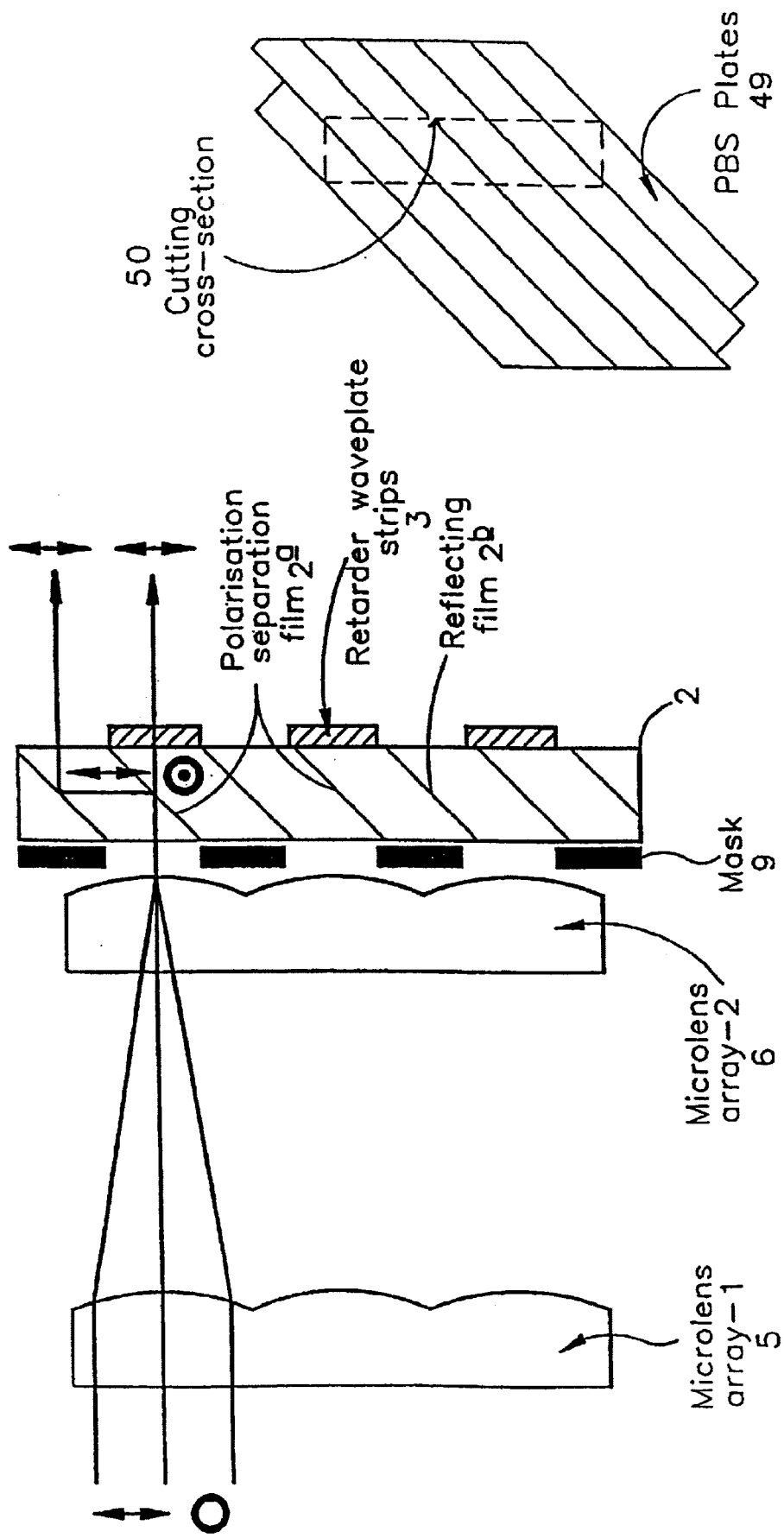
Figure 22B:
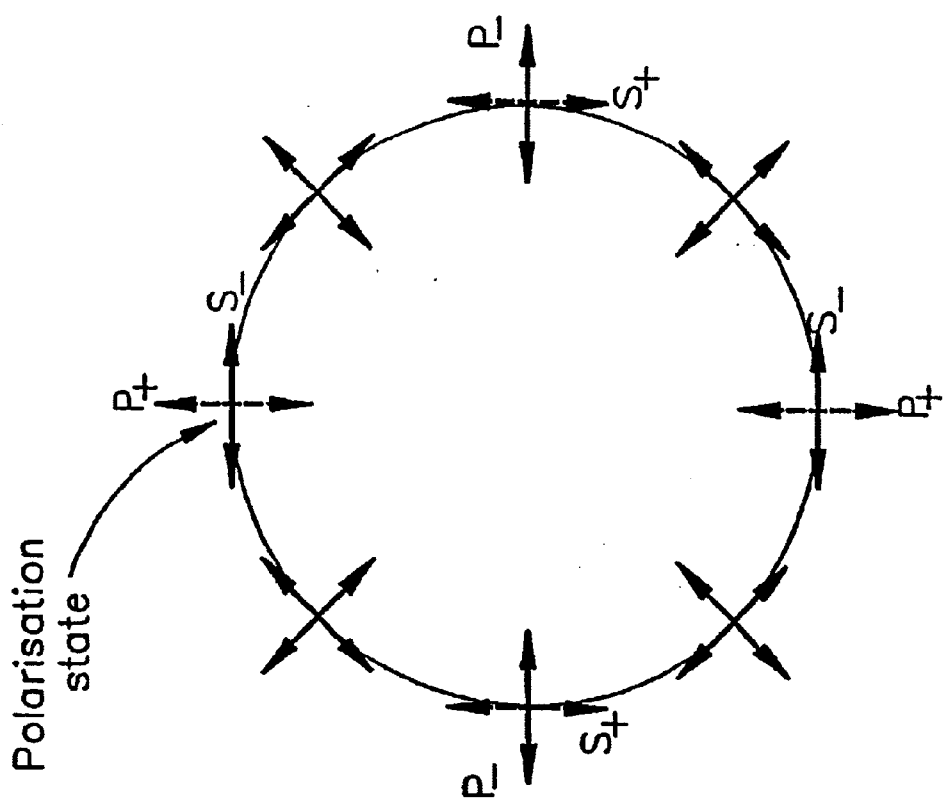
Figure 22A:
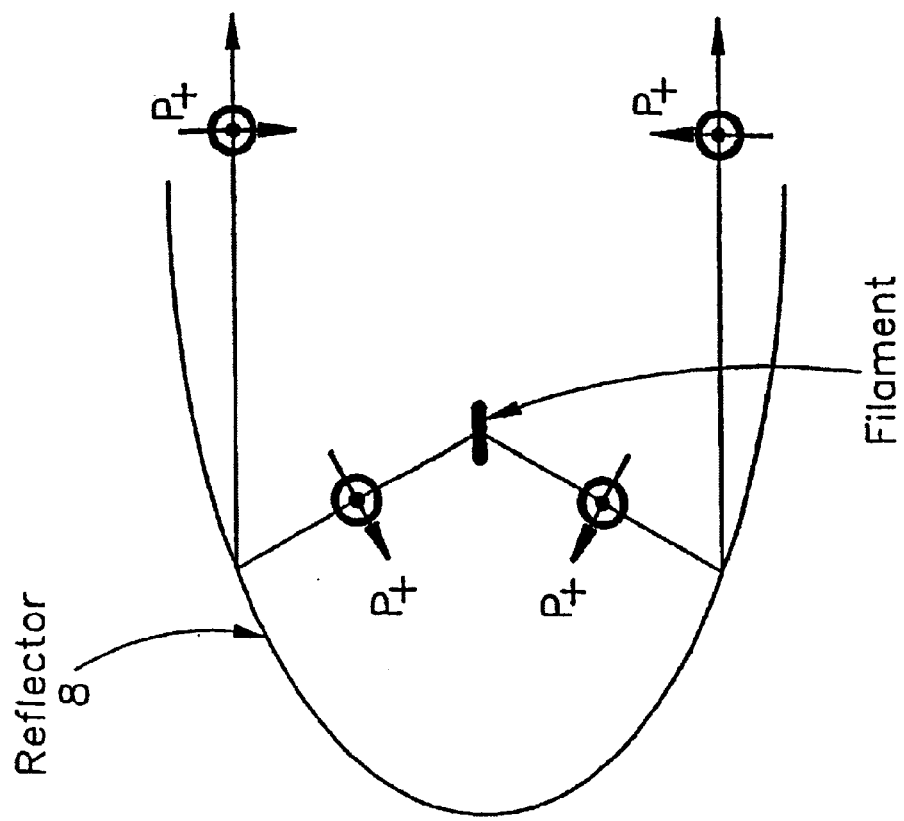
Figure 22D:
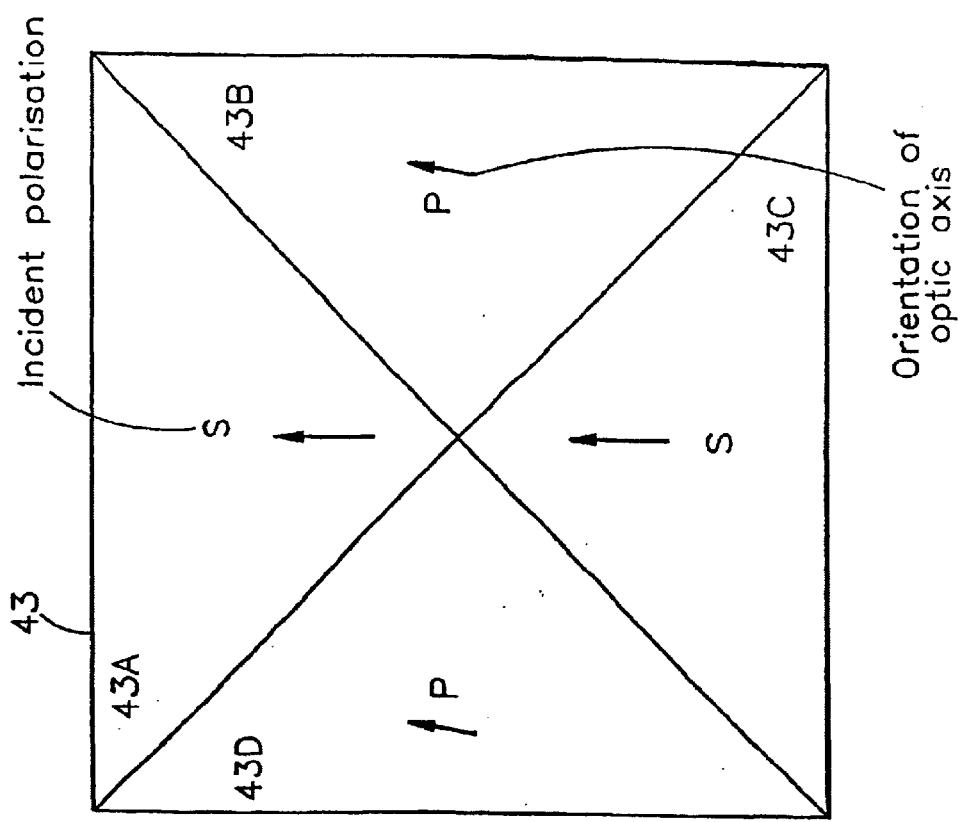
Figure 22C:
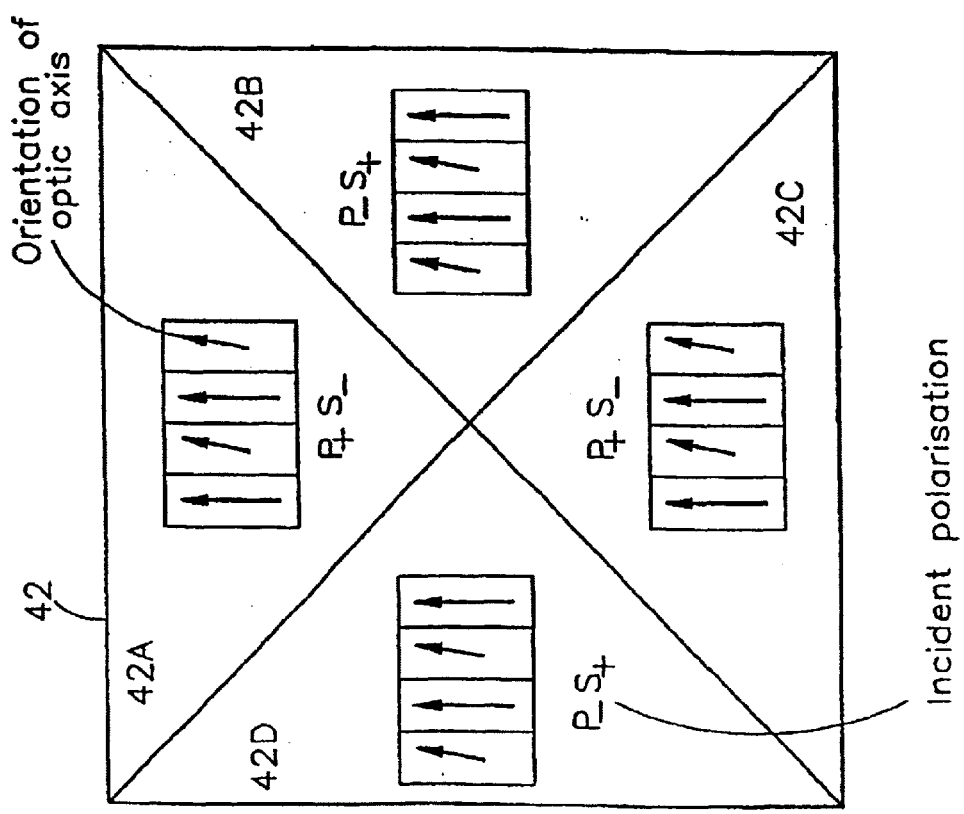
Figure 22E:
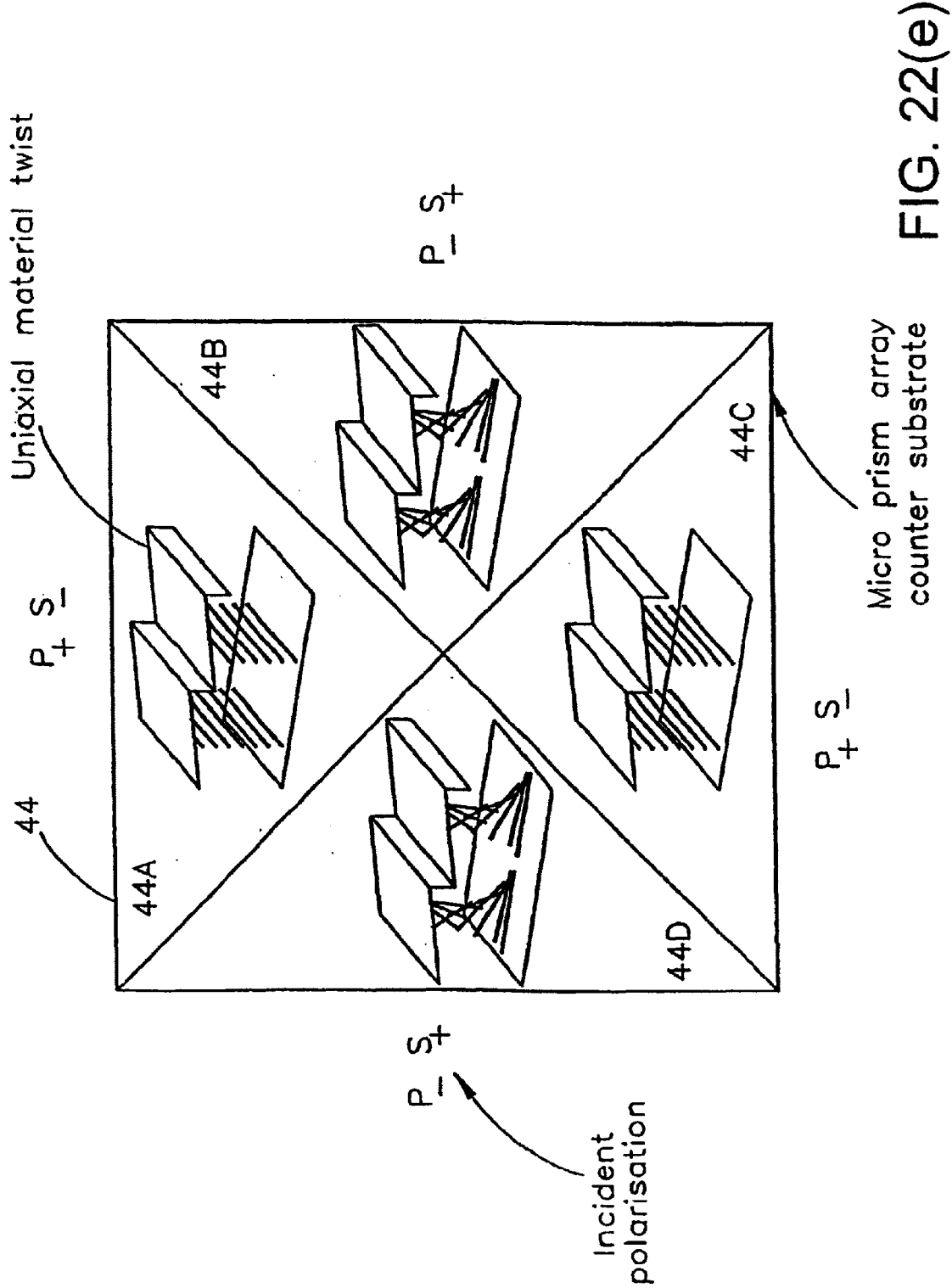
Figure 23B:
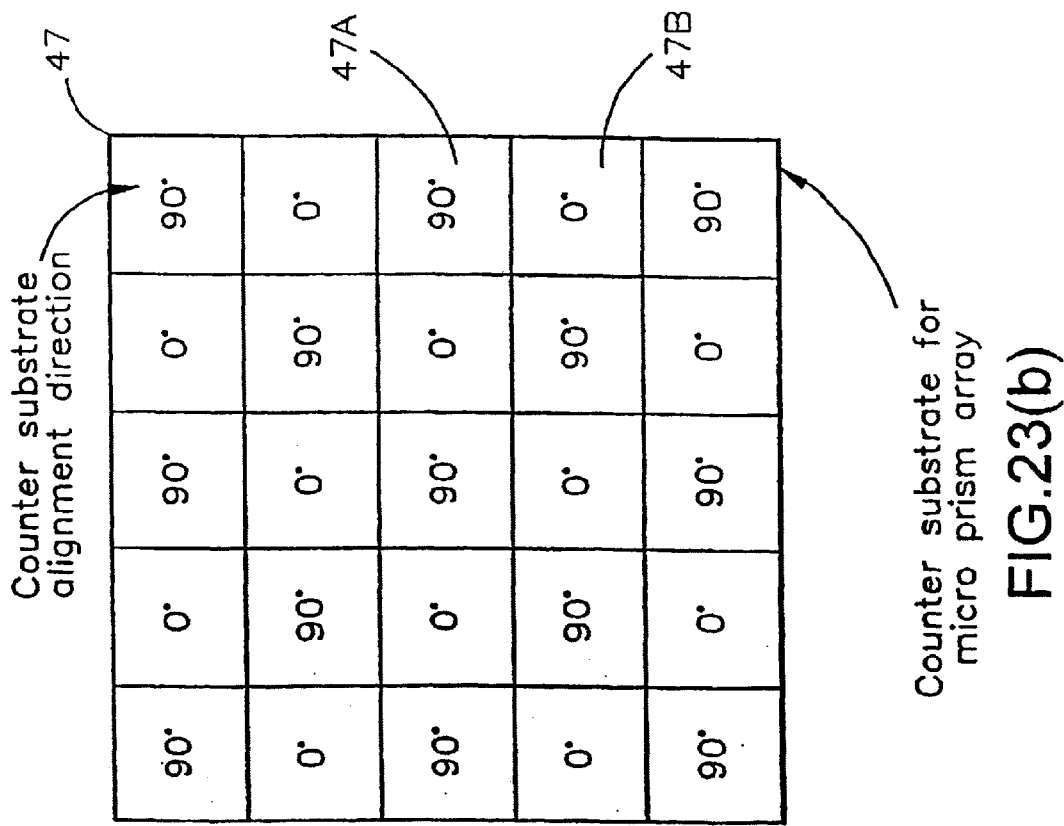
Figure 23A:
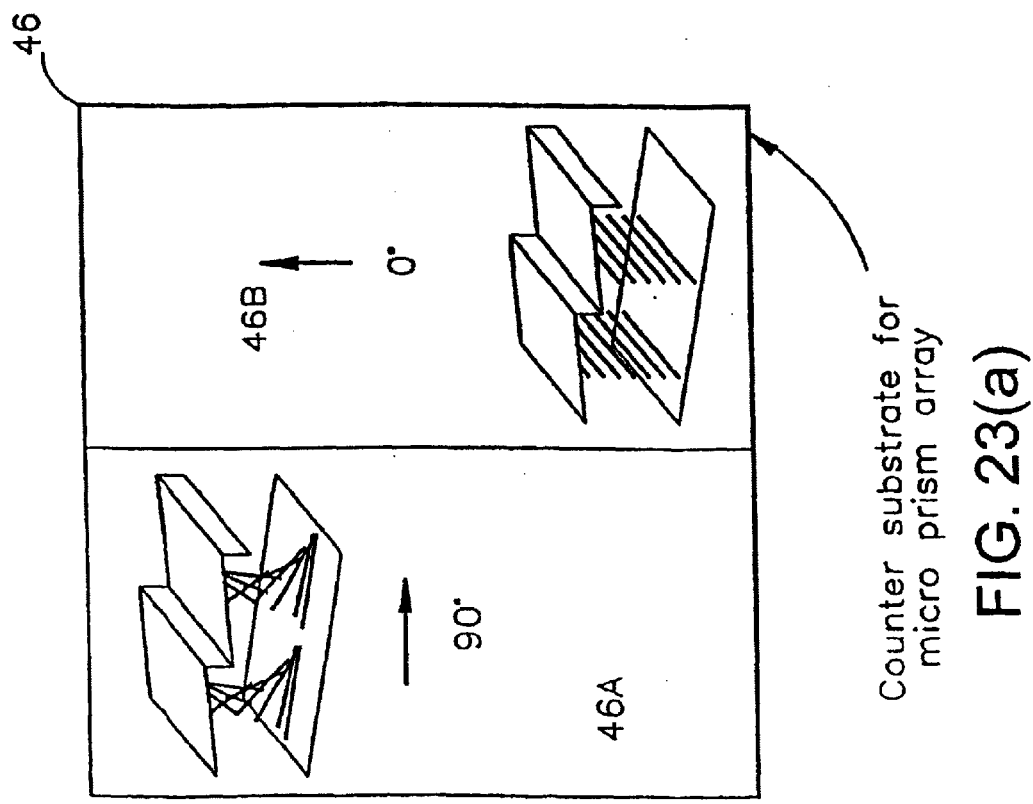
Figure 24:
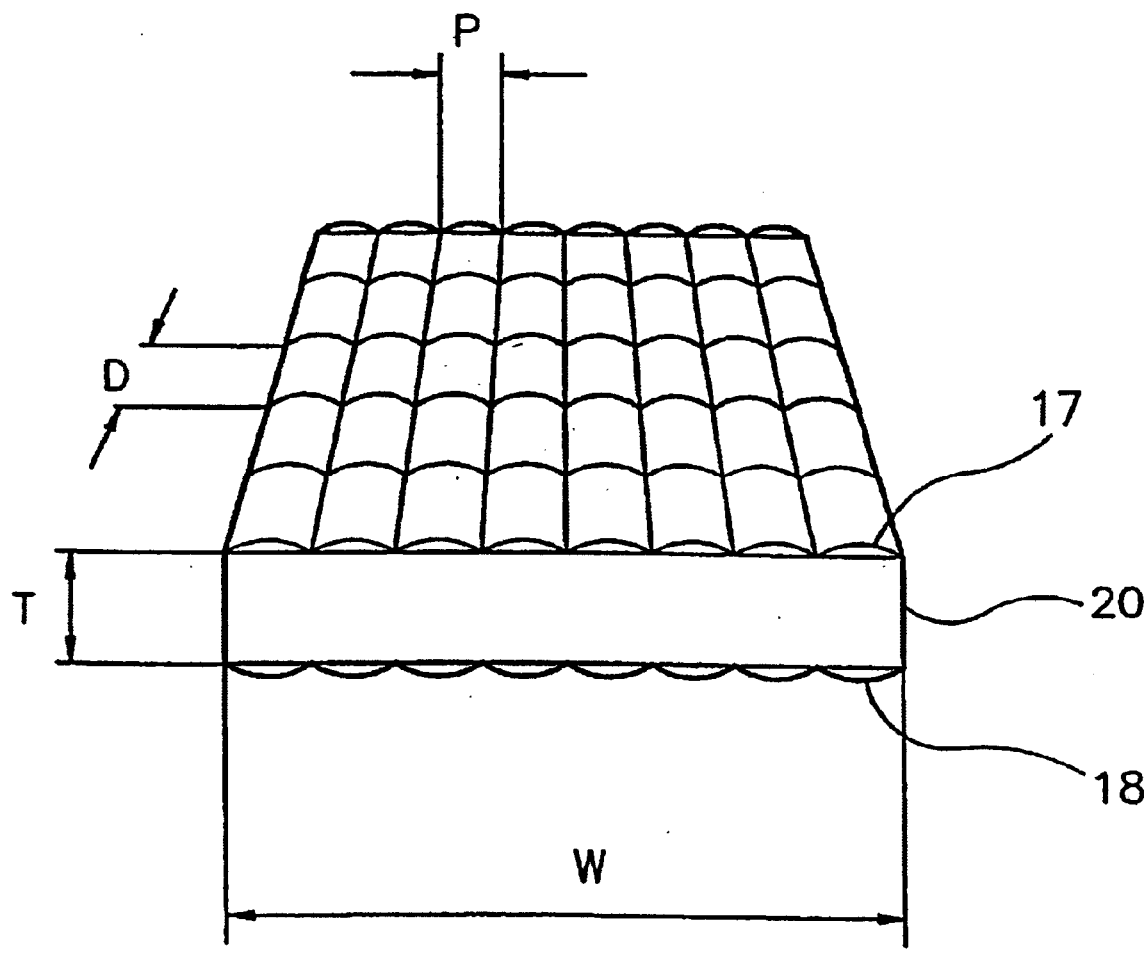

FIGS. 2(d) and 2(e) are partial perspective views of the polarisation separation element of FIG. 2(c);

FIG. 3(a) is a schematic sectional view of a further polarisation separation element;

FIG. 3(b) is a partial sectional view of a further polarisation separation element according to the present invention;

FIG. 4 is a schematic sectional view of a further polarisation separation element according to the present invention;

FIG. 5 is a sectional view illustrating the operation of a polarisation separation element according to the present invention;

FIG. 6(a) is a schematic view of a further embodiment of a polarisation conversion system according to the present invention;

FIG. 6(b) is a schematic view of a further embodiment of a polarisation conversion system according to the present invention;

FIG. 7(a) is a schematic view of a further embodiment of a polarisation conversion system according to the present invention;

FIG. 7(b) is a schematic view of a further embodiment of a polarisation conversion system according to the present invention;

FIG. 8 is a schematic sectional view of a further embodiment of a polarisation conversion system according to the present invention;

FIG. 9 is a schematic view of a reflective polarisation separation element according to the present invention;

FIG. 10 is an enlarged sectional view illustrating a reflective polarisation separation element according to the present invention;

FIG. 11 is a schematic view of a projection system according to the present invention;

FIG. 12 is a schematic sectional view of a further polarisation separation element of the invention, FIG. 13 is a schematic sectional view of a further polarisation separation element of the invention, FIG. 14(a) illustrates the alignment direction of a retarder suitable for use in a polarisation separation element;

FIG. 14(b) is a schematic perspective view of the retarder of FIG. 14(a);

FIG. 14(c) is a schematic diagram of another embodiment of a polarisation conversion system according to the present invention;

FIG. 15(a) is a schematic sectional view of a further polarisation separation element according to the present invention;

FIGS. 15(b) and 15(c) are schematic diagrams of embodiments of a polarisation conversion system according to the present invention;

FIG. 16 is a schematic diagram of another embodiment of a polarisation conversion system according to the present invention;

FIG. 17 is a schematic sectional view of a conventional polarisation conversion system;

FIG. 18 is a perspective view of another conventional polarisation conversion system;

FIG. 19 is a schematic perspective view of a liquid crystal Wollaston type prism FIG. 20 is a schematic view of a further conventional polarisation conversion system;

FIG. 21(a) is a schematic view of a further known polarisation conversion system;

FIG. 21(b) illustrates the fabrication of the polarisation separation element of the polarisation conversion system of FIG. 21(a);

FIGS. 22(a) and 22(b) illustrate the polarisation produced by a parabolic reflector;

FIGS. 22(c) and 22(d) show two waveplates suitable for utilising the polarisation shown in FIGS. 22(a) and 22(b);

FIG. 22(e) is a schematic perspective view of the twist of the optic axis of a uni-axial material suitable for utilising the polarisation induced by the reflector of FIG. 22(a);

FIG. 23(a) Illustrates one embodiment of the alignment direction of a counter-substrate to equalise dispersion for the P- and S-components of linearly polarised light;

FIG. 23(b) shows a further embodiment of the alignment direction of a counter substrate to equalise dispersion for the P- and S- components of linearly polarised light;

FIG. 24 is a perspective view of the lens arrays of the polarisation conversion system of FIG. 1(a); and FIG. 25 is a schematic view of a projection system incorporating the polarisation conversion system of FIG. 1(a).

DESCRIPTION OF THE PREFERRED EMBODIMENTS

Like reference numerals refer to like components throughout the drawings.

FIG. 1(a) is a schematic view of a PCOS 15 according to a first embodiment of the present invention.

In use, collimated light is supplied by a light source (not shown). The light from the light source is unpolarised or partially polarised, and contains two linearly polarized components having orthogonal polarisation directions. One component has the plane of polarisation in the plane of the paper, and this is denoted by the double-ended arrow in FIG. 1 and will be referred to as "horizontally plane-polarised". The other component has the plane of polarisation out of the plane of the paper, and this is denoted by the dot enclosed within a circle symbol in FIG. 1 and will be referred to as "vertically plane-polarised".

The PCOS 15 of FIG. 1(a) contains a polarisation splitting element 16. As indicated in FIG. 1(a), this angularly separates the two polarisation components in the incident light and deviates each polarisation component. One polarisation component of the incoming light is directed in a first direction, and the orthogonal polarisation component is directed in a second direction which is different from the first direction. The first and second directions are each different from the direction of propagation of the incident light, for all wavelengths in the visible spectrum. The structure of the polarisation splitting element is described below.

The PCOS 15 of FIG. 1(a) further comprises a polarisation conversion element placed on the opposite side of the polarisation splitting element to the light source. The polarisation conversion element 19 is arranged so that it converts the first and second polarisation components into light having a substantially common output polarisation. This is conveniently done by providing the polarisation conversion element with a plurality of first areas 19(a) that convert one of the polarisation components generated by the polarisation splitting element 16 into a desired output polarisation, and arranging the polarisation conversion element such that light of the first polarisation component is incident substantially only on these areas. Similarly, the polarisation conversion element further comprises a plurality of second areas 19(*b*) that convert the second polarisation component generated by the polarisation splitting element into light of the desired output polarisation and light of the second polarisation component output by the polarisation separation element is arranged to be incident substantially only on these areas.

The desired output polarisation component may be one of the two polarisation components generated by the polarisation splitting element 16. If this is the case, the polarisation conversion element 19 is arranged to transmit light of the desired polarisation component without substantially changing its polarisation state. The polarisation conversion element is further adapted to convert the other polarisation component produced by the polarisation splitting element into the desired output polarisation component.

In the embodiment shown in FIG. 1(*a*) the polarisation splitting element produces a horizontally plane-polarised component and a vertically plane-polarised component. The desired output state of the polarisation conversion system is horizontally plane-polarised light. In this embodiment, the polarisation conversion element 19 is embodied as a polarisation rotation element. The polarisation conversion element is arranged so that one polarisation component (in the embodiment of FIG. 1(*a*) the vertically plane-polarised component) is incident on areas 19*a* of the polarisation rotation element that rotate the plane of polarisation of that component by substantially 90°. The other polarisation component (in the embodiment of FIG. 1(*a*) the horizontally plane-polarised component) is incident on areas 19*b* of the polarisation rotation element that do not rotate the plane of polarisation of that polarisation component, and its plane of polarisation is substantially unchanged by the polarisation rotation element 19. In consequence, light output from the PCOS 15 of FIG. 1(*a*) contains only horizontally plane-polarized light since the vertically plane polarised component has been converted to horizontally plane polarised by the polarisation rotation element.

In order to ensure that the horizontally plane-polarised component directed by the polarisation splitting element 16 towards the polarisation rotation element 19 does not pass through any of the areas 19*a* that rotate the plane of polarisation, and to ensure that vertically polarised light directed by the polarisation splitting element 16 towards the polarisation conversion element 19 does not pass through any of the areas 19*b* that do not rotate the plane of polarisation, a first microlens array 17 is provided to converge light directed towards the polarisation conversion element 19. In the embodiment of FIG. 1(*a*) the first microlens array 17 is disposed between the polarisation splitting element 16 and the polarisation conversion element 19, so that the array 19 is spaced from the first microlens array 17 by approximately the focal length of the microlens array.

A second microlens array 18 is preferably provided in the PCOS 15 of FIG. 1(*a*), to ensure that the light output from the PCOS is substantially telecentric and arranged to produce an image of each lens in the first array at the plane of the panel when used in combination with a further condensing lens. The second microlens array 18 should ideally be located in the same plane as the array 19 and hence at the focal plane of the first micro lens array 17, because separation of the planes of the arrays 18 and 19 results in light loss.

The focal length of the first microlens array 17 is preferably equal, or substantially equal, to the focal length of the second microlens array 18. In the embodiment of FIG. 1(*a*) the pitch and lateral dimensions of the lens elements in the first microlens array are equal to the pitch and lateral dimensions of the lens elements in the second microlens array 18. The pitch of both microlens arrays is preferably 2 mm or less. It would alternatively be possible for the lateral dimensions of the lens elements in one microlens array to be different from the lateral dimensions of the microlens elements in the other array, in order to modify the etendue using the method disclosed in European patent application 99115664.7.

In the embodiment of FIG. 1(*a*), each and every lens element of the first microlens array 17 produces two images of the light source at the corresponding lens element of the second microlens array 18. The angular separation elements cause a separation of the images of the source at the second lens array 18 when imaged by the first lens array 17. The splitting angle and power of the first lens array 17 is set so that the two images are interleaved and substantially non-overlapping in the image plane of the first lens array 17 which corresponds substantially to the plane of the second lens array 18 and polarisation conversion element 19, When the polarisation splitting element 16 is illuminated by light that is substantially unpolarised, the two separated, orthogonally polarised beams produced by the polarisation separation element 16 will have substantially equal intensity to one another. However, if the light from the light source has some degree of linear polarisation, then the relative intensities of the two separated, orthogonally polarised beams produced by the polarisation separation element will depend on the input polarisation ratio of the light from the light source.

A suitable light source for use with the PCOS 15 of FIG. 1(*a*) is an approximately 1.3 mm UHP (™) arc lamp, as manufactured by Philips.

In the embodiment of FIG. 1(*a*) the first micro lens array 17 and the second micro lens array 18 are formed on opposite faces of the same substrate 20. It would alternatively be possible for the first and second micro lens arrays 17, 18 to be formed on separate substrates as illustrated in, for example, FIG. 7(*b*).

FIG. 24 is a perspective view of the first and second micro lens arrays 17, 18 of the PCOS of FIG. 1(*a*). The first microlens arrays 17 is formed on one face of a substrate 20 and the second microlens array 18 is formed on an opposite face of the substrate 20. Each lens element of the second microlens array is optically associated with a lens element of the first microlens array, in that light incident on a lens element of the first microlens array is directed to an associated lens element of the second microlens array. As noted above, in the embodiment of FIG. 1(*a*) the pitch P and lateral dimension D of the lens elements in the first microlens array are equal to the pitch and lateral dimensions of the lens elements in the second microlens array 18. The pitch of both microlens arrays is preferably 2 mm or less, The first and second microlens arrays 17,18 are preferably integral with the substrate 20. For example, the first and second microlens arrays 17,18 and the substrate 20 could be moulded in a transparent plastics material in one integral unit, or the first and second microlens arrays could be pressed into faces of a suitable transparent substrate. As an alternative, the lens arrays could be fabricated by manufacture of separate lens arrays and bonding of the two lens arrays using an index matching material to form a common optical substrate.

This would avoid mechanical alignment of the element during projector assembly and reduce the number of surfaces of the element, thus reducing unwanted surface reflections and the cost of anti-reflection coating of the element. Microlenses of these types can be fabricated by a variety of other techniques including UV casting, hot embossing, etching of glass or forming gradient index lenses onto a plastic or preferably glass substrate.

FIG. 25 illustrates a projection system that uses a PCOS 15 of the type shown in FIG. 1(*a*). In this projection system the PCOS 15 is illuminated by light emitted by a light source 7 and collimated by a parabolic mirror 8. Light leaving the PCOS 15 illuminates a light valve 48, for example a spatial light modulator, that modulates the intensity of light thereby enabling an image to be displayed. A condenser lens 49 is preferably disposed between the PCOS 15 and the light valve 48.

In an example in which the light valve has an aspect ratio of 4:3 and a diagonal of 0.7" (approximately 18 mm), the breadth of the light valve is ⅘ of the diagonal, i.e. approximately 14.22 mm. If the pitch of the microlens arrays is 2 mm, the ratio of the distance from the first microlens array to the second microlens array to the distance from the second microlens array to the light valve is 14.22/2. Thus, if the distance from the second microlens array to the light valve is desired to be 100 mm, the distance from the first microlens array to the second microlens array should be 100 mm×2/14.22=14.06 mm (all distances assumed to be in air). If the microlens arrays 17,18 and the substrate 20 are formed of a glass with a refractive index of 1.52, the thickness T of the substrate 20 should be 21.4 mm. Integrating both lens arrays onto a single glass substrate having this thickness is possible, so making the pitch of the microlens arrays less than 2 mm allows both microlens arrays to be integrated onto a single substrate.

Further in this example, if the reflector 8 has a diameter of 60 mm, the width W of the microlens arrays 17,18 is preferably 60 mm or more, to ensure that all light from the lamp passes through the PCOS. If the thickness T of the substrate 20 is approximately 20 mm, then the width W and thickness T of the substrate 20 satisfy the following relationship: W/T>3. Ideally the lens pitch will be of order 200 microns so that the glass thickness is of order 2 mm, corresponding to a sandwich of two standard LCD glass substrates. This will allow access to high-volume low-cost glass and to standardised glass-processing equipment. That is to say, the thickness of the microlens substrate, for a given width, is much lower it the invention than in the prior art, so that the volume of the PCOS of the invention is much lower than the volume of a conventional PCOS. For a prior art device, typical values of W and T are w=50 mm and T=50 mm, giving W/T=1.

The construction of one polarisation splitting element 16 of the invention, which is suitable for use in the PCOS 15 of FIG. 1(*a*), is shown in detail in FIG. 2(*a*). It will be seen that the polarisation splitting element 16 consists essentially of two arrays of birefringent prisms 20, 21. The prisms 20, 21 of each array have a wedge-shaped cross-section. The wedge angle of the prisms 20 of the first array is equal or substantially equal to the wedge angle of the prisms 21 of the second array, and the cross-sectional dimensions of the prisms 20 of the first array are equal or substantially equal to the cross-sectional dimensions of the prisms 21 of the second array.

The arrays of prisms are disposed such that a prism 20 of the first array has its oblique face 20*a* (hypotenuse face) adjacent to the oblique face 21*a* of a prism 21 of the second array. (In FIG. 2(*a*) a small gap is shown between the prism 20 and the prism 21 for clarity.) Since the prisms of the first array have substantially the same wedge angle as the prisms of the second array, the base face 20*b* of a prism 20 of the first array is substantially parallel to the base face 21*b* of the corresponding prism 21 of the second array.

In FIG. 2(*a*) the prisms 20 of the first array are attached to a first cover plate or substrate 22, and the prisms 21 of the second array are attached to a second cover plate or substrate 23. The cover plates can be made of any transparent, optically isotropic material such as a glass or a plastics material. The covers plates 22,23 preferably each have a uniform thickness, so that the front surface 22*a* of the first cover plate is parallel to the rear face 23*a* of the second cover plate 23. The front surface 22*a* of the first cover plate 22 forms the entrance face of the polarisation separation element, and the rear face 23*a* of the second cover plate 23 forms the exit face of the polarisation separation element 16.

The optic axis of the prisms 20 of the first prism array and the optic axis of the prisms 21 of the second prism array are parallel to the entrance and exit faces of the polarisation splitting element 16. The optic axes of the prisms are therefore generally perpendicular to light propagating through the polarisation separation element. Moreover, the optic axis of each first prism 20 is orthogonal to the optic axis of each second prism 21.

In use, light from the light source enters the polarisation splitting element 16 and then passes through the first cover plate 22 and one of the prisms 20 of the first birefringent prism array. Angular separation between light of one linear polarisation and light of the orthogonal linear polarisation will occur at the inclined interface between a prism 20 of the first prism array and the corresponding prism 21 of the second prism array.

FIG. 2(*b*) illustrates an alternative polarisation splitting element 16 of the invention, which is again suitable for use in the PCOS 15 of FIG. 1(*a*). This generally corresponds to the polarisation splitting element 16 of FIG. 2(*a*), except that the first array of birefringent wedge-shaped prisms 20 of FIG. 2(*a*) is replaced by an array of wedge-shaped prisms 24 made of an optically isotropic material such as a glass or a plastics material. Provided that the refractive index of the material used to form the optically isotropic wedge-shaped prisms 24 is not equal to the ordinary refractive index or to the extraordinary refractive index of the birefringent material used to form the birefringent prisms 21, both polarisation components will be deviated. The refractive index of the material used to form the optically isotropic wedge-shaped prisms 24 and the ordinary and extraordinary refractive indices of the birefringent material used to form the birefringent prisms 21 may be chosen such that $n_o < n < n_e$ over the entire visible spectrum, where $n_o$ and $n_e$ are the ordinary and extraordinary refractive indices of the birefringent material used to form the birefringent prisms 21, and n is the refractive index of the material used to form the optically isotropic prisms 24.

The splitting angle of the light cone is defined by the tilt angle of the prisms and the birefringence whereas the mean tilt of the two cones with respect to the input optical axis is defined by the relative refractive index of the isotropic material. In addition, dispersion differences between the ordinary and the extraordinary components may mean that the two polarisation states have different dispersive properties. Thus, it is possible that the size of the spot falling on the second lens array 18 is different for the two orthogonal polarisation states. This is illustrated in FIG. 1(*b*), where the relative size and shape of one light spot is shown at 50 and the relative size and shape of the other light spot is shown at 51 (with the first spot shown superimposed for comparison). In order to compensate for the difference in spot sizes, the polarisation rotation element 19 may be adapted as shown in FIG. 1(*b*) such that the areas 19(*a*) which rotate the plane of polarisation and which receive light from the larger light spot 51 are larger than the areas 19(*b*) which do not rotate the plane of polarisation and which receive light from the light spot 50.

The embodiment of FIG. 1(*b*) further differs from that of FIG. 1(*a*) in that the second lens array 18 is optically coupled to the polarisation rotation element 19 by an isotropic medium 52 having a refractive index $n_2$. A suitable material for the isotropic medium 52 is UV-OPTI-CLAD-138-X produced by Opti-clad, having a refractive index $n_2$=1.38. Suitable material for the second lens array 18 is OC 462 from Nye, having a refractive index $n_1$=1.6.

The array of birefringent prisms 21 of FIG. 2(*b*) and one or both of the arrays of birefringent prisms 20,21 of FIG. 2(*a*) may be embodied as a liquid crystal layer, for example by using the fabrication technique disclosed by D. J. Broer in "Mol. Cryst. Liq. Cryst." Vol. 261, pp 513–523 (1995). They may alternatively be embodied using a reactive mesogen layer or using a polymer-stabilised liquid crystal layer.

FIG. 2(*c*) shows an alternative polarisation splitting element 16 of the invention, which is again suitable for use in the PCOS of FIG. 1. As for the polarisation splitting elements of FIGS. 2(*a*) and 2(*b*), the polarisation splitting element of FIG. 2(*c*) deviates both polarisation components.

The polarisation splitting element of FIG. 2(*c*) again comprises wedge-shaped prisms disposed between a first transparent cover plate 22 and a second transparent cover plate 23, but in the polarisation splitting element 16 of FIG. 2(*c*) four arrays of prisms are disposed between the first cover plate 22 and the second cover plate 23. The prisms in each array have a wedge-shaped cross-section.

The first array is an array of optically isotropic wedge-shaped prisms 25, the second array is an array of birefringent prisms 26, the third array is an array of birefringent prisms 27, and the fourth array is an array of optically isotropic prisms 28. Each prism 26 of the second array in arranged with its oblique face 26*a* disposed adjacent to the oblique face 25*a* of a corresponding prism 25 from the first array. Similarly, each prism 27 of the third array is arranged with its oblique face 27*a* disposed adjacent to the oblique face 28*a* of a corresponding prism 28 of the fourth array. Each prism 26 of the second array is disposed with its flat face 26*b* parallel to and adjacent the flat face 27*b* of a prism 27 of the third prism array. The prisms 25 in the first array have substantially the same wedge angle as the prisms 26 in the second array, so that the base face 25*b* of a prism 25 in the first array is substantially parallel to the base face 26*b* of the corresponding prism 26 in the second array. Similarly the prisms 27 in the third array have substantially the same wedge angle as the prisms 28 in the fourth prism array, so that the base face 27*b* of a prism 27 in the third array is substantially parallel to the base face 28*b* of the corresponding prism 28 in the fourth array. The wedge angle of the prisms 25 and 26 of the first and second arrays should be similar to that of the prisms 27 and 28 of the third and fourth arrays and is the same in the illustrated embodiment. Also, the pitch of the prisms 25 and 26 is shown as being the same as that of the prisms 27 and 28 but may be different.

The direction of the optic axis of the prisms 27 of the third array does not change direction throughout its thickness, as shown schematically in FIG. 2(*e*). However, the direction of the optic axis of the prisms 26 of the second prism array is not constant but varies across the thickness of the prism as shown in FIG. 2(*d*) so that the optic axis adjacent the flat face 26*b* of a prism 26 of the second array is substantially perpendicular to the optic axis adjacent the oblique face 26*a* of the prism. The optic axis of the prisms 26 of the second array is always parallel to the front face 22*a* of the first cover plate 22, so that the optic axis is always substantially perpendicular to light passing through the polarisation separation element. The optic axis of a prism 26 of the second prism array is arranged such that, at the face of the prism nearest the corresponding prism of the third prism array (in FIG. 2(*c*) this is the flat face 26*b* of the prism) the optic axis is perpendicular to the optic axis of the corresponding prism 27 of the third prism array.

In a polarisation splitting element of FIG. 2(*c*), a prism 26 of the second prism array and a prism 27 of the third prism array both have their optic axes adjacent their inclined face 26*b*,27*b* oriented parallel to the "wedge grooves", but the optic axis of a prism 26 of the second array at the face nearest the corresponding prism 27 of the third array is perpendicular to the optic axis of the prism 27. This reduces the wedge angle required to provide a given angle of divergence between the ordinary and extraordinary rays, thus reducing dispersion produced by the uniaxial material of the prisms. A further advantage is that the ordinary and extraordinary rays are symmetrically diverged about the normal to the polarisation splitting element, as shown by the ray paths in FIG. 2(*c*). In contrast, where a single uniaxial prism with a wedge-shaped cross-section is used light of one polarisation may be diverged by a greater angle than light of an orthogonal polarisation, if the change in the extraordinary refractive index is higher than the change in the ordinary refractive index.

The wedge-shaped prism 26 in which the direction of the optic axis rotates over the thickness of the prism may be formed using a liquid crystal material, for example the liquid crystal material ZLI-5200–100 (available from Merck). Alternatively, a reactive mesogen such as RM257 (available from Merck) or polymer stabilised liquid crystal material such as NOA6 (available from Norland) mixed with E7 (available from Merck) having homogeneous alignment may be used.

FIG. 4 shows a further polarisation element 16 of the invention, which is again suitable for use in the PCOS 15 of FIG. 1(*a*). This polarisation splitting element again deviates both polarisation components.

The polarisation splitting element 16 of FIG. 4 comprises a first array of optically isotropic prisms 31 disposed between a first transparent cover plate 22 and a second transparent cover plate 23. The optically isotropic prisms are mounted on the second cover plate 23, and each prism 31 in the first prism array has its upper face 31*a* (the face disposed furthest from the second cover plate) at an oblique angle to the face 31*b* adjacent the second cover plate, so that the first prism array has a "saw-tooth" profile.

A liquid crystal layer 32 is disposed, between the first cover plate 22 and the optically isotropic prism array 31. The separation between the first and second cover plates is substantially constant so, since the thickness of the isotropic prisms 31 varies in a "saw-tooth" manner, the thickness of the liquid crystal layer also varies in a "saw-tooth" manner. The liquid crystal layer 32 thus forms an array of birefringent prisms, each prism being a truncated wedge in cross-section. The array of isotropic prisms 31 may be made of a polymer material. The "saw-tooth" profile of the array of prism 31 may be provided by, for example, moulding the polymer using a suitable mould, casting the polymer, or by a lithographic process.

The liquid crystal layer 32 is disposed between a first alignment layer 29 and a second alignment layer 30 for controlling the alignment direction of liquid crystal molecules adjacent the alignment layers 29, 30. In the embodiment of FIG. 4 one alignment layer 29 is disposed on the first cover plate 22, and the second alignment layer 30 is disposed on the upper face of the array of prisms 31.

The alignment layers 29, 30 can be formed of any suitable material such as, for example, the material PI2555. Alternatively, alignment layers designed for use at lower fabrication temperatures may be used. The alignment layers 29, 30 may be rubbed or photo-aligned so that they orient liquid crystal molecules in a desired direction. In the case that the alignment layer 30 is aligned by a rubbing process, it may, in principle, be rubbed in a direction parallel to the grooves of the micro prism array or in a direction perpendicular to the grooves of the micro prism array. It is, however, preferable to rub the alignment layer in a direction parallel to the grooves of the micro prism array, since rubbing it in a direction perpendicular to the grooves may present alignment difficulties and may change the director profile of the liquid crystal material adjacent the alignment layer 30.

FIG. 5 illustrates the principle of operation of a polarisation splitting element 16 of the invention. FIG. 5 relates to a polarisation Separation element of the type shown in FIG. 2(*b*), in which an array of isotropic wedge-shaped prisms and an array of birefringent wedge-shaped prisms are disposed between a first transparent cover plate 22 and a second transparent cover plate 23; however, the polarisation separation elements of FIGS. 2(*a*), 2(*c*) and 4 operate in a generally similar manner.

The polarisation splitting element 16 of FIG. 5 is illuminated substantially normally and telecentrically to the front face of the first cover plate 22 which, as noted above, forms the entrance face of the polarisation splitting element. The incident light enters the first cover plate 22; since the light is normally incident, the propagation of light is substantially unaltered at the front face 22a of the cover plate 22. There is also substantially no deviation of the direction of propagation of light at the interface between the transparent cover plate 22 and the array of isotropic wedge-shaped prisms 24. (In practice, some reflection will occur at the two faces of the transparent cover plate 22, but this has been omitted from FIG. 5 for clarity.)

When the light passes through one of the isotropic prisms 24 it encounters the interface between the isotropic prism 24 and a corresponding birefringent prism 21. This interface is inclined with regard to the faces of the transparent cover plate 22, so that the light will be obliquely incident on this interface and the angle of refraction will be different for p-linearly polarized light and s-linearly polarised light. Because the angle of refraction is different for the two orthogonal linear polarisations, the incident beam of light is split with p-linearly polarised light being directed in a first direction and s-linearly polarised light being directed in another direction.

As a consequence of refraction occurring at the inclined interface between the isotropic prism 24 and the birefringent prism 21, light is no longer propagating in a direction normal to the entrance face of the polarisation splitting elements. This is true for both the ray of p-linearly polarised light and the ray of s-linearly polarised light. Consequently, refraction will occur at the interface between birefringent prism 21 and the front face 23a of the second cover plate 23, and refraction will also occur at the rear face 23b of the second cover plate 23. The refraction that occurs at these two last interfaces will increase the angular separation between the p-linearly polarised light and the s-linearly polarised light. In consequence, the p-linearly polarised light and the s-linearly polarised light exit the polarisation splitting element 16 in directions that are different from one another and from the propagation of the incident unpolarised or partially polarised light.

The polarisation splitting element 16 of FIG. 5 is similar in operate on to a Wollaston prism, but differs in that only one birefringent wedge-shaped prism is used. The angle of deviation between the two orthogonally polarised beams of light is determined primarily by the refractive index of the isotropic prism 24, by the ordinary and extraordinary refractive indices of the birefringent prism 21 and by the inclination angle θ. For instance, in a specific example of this embodiment, a 5 degree split between vertical and horizontal polarisation is required, as defined by the etendue requirements of the optical system. An isotropic microprism of tilt angle 29.5 degrees and refractive index 1.56 is attached to the glass substrate. A birefringent liquid crystal material having an ordinary refractive index at 550 nm of 1.534 and an extraordinary refractive index at 550 nm of 1.690 is aligned to the microprism surface. A splitting angle of 5 degrees is produced by the element.

As is evident from FIG. 5, the separation of light having one linear polarisation from light having an orthogonal linear polarisation occurs at an interface that is inclined with respect to the direction of propagation of the light. In principle, such an oblique interface could be achieved by providing the polarisation splitting element with a single pair of wedge-shaped prisms, one disposed on each of the cover plates. The polarisation splitting element would then have a single inclined interface that extended across the entire area of the device, as shown schematically in FIG. 3(*a*). This has the disadvantage that the overall thickness of the device will be relatively large. For a given angle of inclination θ of the prism, and for a given lateral dimension of the polarisation splitting element, there will be a lower limit on the thickness of the polarisation splitting element, beyond which it will not be possible to reduce the thickness.

In contrast, in the present invention the polarisation splitting element is provided not with a single wedge-shaped prism, but with an array of "truncated" prisms. The prisms are truncated in that they do not extend over the entire lateral dimension of the polarisation splitting element, but instead extend only over a part of the lateral dimension of the polarisation splitting element. In consequence, the array of prisms has a saw-tooth profile as shown in FIG. 3(*b*). By truncating the prisms in this way, the overall thickness of the polarisation splitting element can be reduced.

Diffraction will occur from the regular structure of truncated microprisms. The diffraction angle is inversely proportional to the pitch of the truncated prisms. For a given prism angle, the height of the truncated prism is also proportional to the pitch. Therefore, increasing truncation height will reduce diffraction angle and increase the amount of diffracted light within a given angle.

In the PCOS 15 of FIG. 1(*a*) or 1(*b*), the polarisation conversion element contains first elements 19a that rotate the plane of polarisation of linearly polarised light by 90°, and elements 19b that do not rotate the plane of polarisation of linearly polarised light. In principle, the polarisation rotation could be performed by an array of discrete half wave-plates acting as the elements 19a that rotate the plane of polarisation, with space between adjacent half-wave-plates acting as the elements 19b that do not rotate the plane of polarisation. In one embodiment of the invention, however, the polarisation rotation element 19 comprises a uniaxial layer that extends over the entire area of the PCOS. The thickness of the uniaxial layer is chosen such that the uniaxial layer operates substantially as a half-wave plate. The regions 19a that rotate the plane of polarisation of linearly-polarised light and the regions 19b that do not rotate the plane of polarisation of linearly-polarised light are defined by varying the direction of the optic axis of the uniaxial layer. This is illustrated in FIGS. 14(a) and 14(b).

As shown in FIG. 14(b), the uniaxial layer 19 has an optic axis which is not uniformly oriented over the area of the layer. The layer 19 has one or more regions in which the optic axis is oriented in one direction and one or more regions in which the optic axis is oriented in a different direction. In the embodiment of FIG. 14(b), the first optic axis orientation has the optic axis substantially parallel to the direction of polarisation of the first polarised state and the second optic axis orientation has the optic axis orientated 45° to the direction of polarisation of the second polarisation state. In the PCOS the uniaxial layer 19 is oriented so that the light of the first and second polarisation state is incident on a region of the layer 19 having the first or second optic axis orientation, respectively. The action of the uniaxial layer therefore is to change the angle of polarisation of the second polarisation state by 90° to be in substantially the same polarisation state as the first polarisation state.

The manufacture of a half wave plate in which the direction of the optic axis varies over the wave-plate is described in EP 0 887 667 the contents of which are hereby incorporated by reference.

The patterned retarder element shown schematically in FIG. 14(a) may alternatively be constituted by the combination of a patterned retarder element and an un-patterned retarder element, as described in EP 0 629 744 the contents of which are incorporated by reference. The use of a patterned retarder element 19 in series with an unpatterned retarder element 32', as shown in FIG. 14(c), reduces the wavelength dependence of the polarisation rotation element, and therefore improves the efficiency of the polarisation conversion element thereby reducing the light loss. The unpatterned retarder element 32' may, for example, be similar to the plastic retardation films available from Sumitomo. Alternatively, the unpatterned retarder element 32' may be a liquid crystal material, a reactive mesogen or any other suitable birefringent material.

In an embodiment in which the polarisation splitting element 16 splits light in the horizontal plane, pairs of linear images of substantially orthogonally polarisation to one another will be formed on the polarisation rotation element 19. In this case, the uniaxial layer 19 should contain vertical stripes of alternative alignment of the optic axis at 0° to the Vertical and 135° to the vertical as shown in FIG. 14(a).

A uniaxial layer in which the direction of the optic axis varies over the area of the uniaxial layer in the manner shown in FIG. 14(a) may be constituted by a liquid crystal layer or a layer of a reactive mesogen material disposed over an alignment layer, as shown schematically in FIG. 14(b). The device Shown in FIG. 14(b) comprises an optically isotropic, transparent substrate 30, an alignment layer 31, and a layer of uniaxial material 32 that acts as the half-wave plate. The orientation of the alignment layer varies over its area, in substantially the same manner as the desired orientation of the optic axis of the uniaxial material. A second layer of uniaxial material having uniform alignment of its optic axis may be disposed on the reverse side of the substrate 30 to provide an un-patterned retarder element 32' as illustrated in FIG. 14(c).

FIG. 6(a) shows a further embodiment of a PCOS 15 according to the present invention. This embodiment differs from the embodiment of FIG. 1(a) in that the first lens array 17 is disposed between the light source (not shown) and the polarisation splitting element 16. The polarisation splitting element 16 is ideally substantially in the plane of the first lens array 17. In practice, the first array 17 may be attached to the cover plate 22 of the PSE 16 and the second lens array 18 attached to the counter substrate 23 of the PSE 16 with a suitable spacer material as illustrated in FIG. 6(b). Furthermore, the polarisation conversion element 19 may be mounted on a transparent substrate 30, for example a glass plate, as shown in FIG. 6(b).

In the embodiments shown in FIGS. 6(a) and 6(b), the polarisation splitting element 16 may have has the general form shown in any of FIG. 2(a), 2(b), 2(c), 4 or 5. In particular, the polarisation splitting element preferably comprise arrays of truncated wedge-shaped prisms as shown in FIG. 3(b). This reduces the overall thickness of the polarisation splitting element 16, and allows it to be positioned between the first lens array 17 and the second lens array 18.

FIG. 7(a) shows a PCOS according to a further embodiment of the present invention. In this embodiment, the first microlens array 17 is disposed between the polarisation splitting element 16 and the light source (not shown), and the polarisation rotation element 19 is disposed between the polarisation splitting element 16 and the second micro lens array 18. In this embodiment the polarisation rotation element 19 is preferably a half-wave-plate retarder, in which the direction of the optic axis varies over the area of the wave-plate, of the type shown in FIG. 14(a). The polarisation rotation element is preferably formed of a thin layer of a birefringent material, for example such as a reactive mesogen. The use of a thin polarisation rotation element allows the polarisation rotation element to be disposed between the first and second microlens arrays. Thus, in the embodiment of FIG. 7(a) both the polarisation splitting element 16 and the polarisation rotation element 19 are disposed between the first microlens array 17 and the second microlens array 18. The second microlens array 18 may be a UV cast polymer on the surf ace of the element 19 so as to provide a reduction in thickness of the PCOS and so as to provide some protection for the element 19.

FIG. 7(b) shows a PCOS 15 according to a further embodiment of the invention. In this embodiment, the first and second lens arrays 17,18 are disposed on separate substrates. This embodiment is particularly advantageous when the lens arrays 17, 18 have a large focal length, since, in this case, forming the two lens arrays on a common substrate would result in a large and heavy element.

Apart from the fact that the first and second lens arrays 17, 18 are formed on separate substrates, the embodiment of FIG. 7(b) is generally similar to the embodiment of FIG. 1. The polarisation separation element 16 of the embodiment of FIG. 7(b) can be a polarisation separation element as described with reference to any of FIGS. 2(a), 2(b), 2(c), 4 and 5.

FIG. 8 shows a PCOS 15 according to a further embodiment of the invention. In this embodiment the polarisation conversion element, which in this embodiment is formed by an array of half waveplates 19a, is disposed directly on the second microlens array 18. This eliminates the risk of the polarisation conversion element becoming mis-aligned with the microlens array during use of the PCOS.

Apart from the fact that the polarisation conversion element is disposed directly on the second lens array 18, the embodiment of FIG. 8 is generally similar to the embodiment of FIG. 1. The polarisation separation element 16 of the embodiment of FIG. 8 can be a polarisation separation element as described with reference to any of FIGS. 2(a), 2(b), 2(c), 4 and 5.

In the embodiment of FIG. 8 the first and second microlens arrays 17, 18 are disposed on a common substrate 20. It is, however, possible for the polarisation conversion element to be disposed directly on the surface of the second microlens array even if the first and second microlens arrays 17, 18 are not disposed on a common substrate.

As will be understood from the above description, the two beams of light output from the polarisation separation element 16 are both linearly plane-polarised, with the plane of polarisation of one beam being orthogonal to the plane of polarisation of the other beam. One measure of the performance of a polarisation separation element is the extent to which the two output beams are indeed linearly polarised. This is known as the "discrimination" of a polarisation separation element.

For a polarisation separation element that is intended for use in a PCOS, a relatively low value of the discrimination such as 10:1 may be tolerated, since a "clean-up" polariser is often used before the output light from the PCOS is supplied to, for example, a projection system (for a single beam, the polarisation discrimination measures the amount of light in a given linear polarisation to the amount of light in the orthogonal polarisation). If a large discrimination is achieved, for example greater than 100:1, the polarisation separation element itself may be used as a polarising beam splitter.

FIGS. 9 and 10 illustrate a polarisation separation element of the invention used as a polarising beam splitter in a liquid crystal projection system.

FIGS. 9 and 10 show a polarisation separation element 16 disposed in front of a pixellated liquid crystal panel 33. In FIGS. 9 and 10 the polarisation separation element 16 is a polarisation separation element of the type shown in FIG. 2(b), in which an array of birefringent wedge-shaped prisms 21 and an array of optically isotropic wedged-shaped prisms 24 are disposed between a transparent cover plate 22 and a transparent cover plate 23. However, a polarisation separation element according to FIG. 2(a), 2(c), 4 or 5 could alternatively be used in the projection system shown in FIGS. 9 and 10.

The liquid crystal layer comprises a rear substrate 34, a reflective layer 35 disposed over the substrate 34, and a pixellated liquid crystal layer 36 disposed over the reflective layer 35. The second transparent cover plate 23 of the polarisation separation element 16 also functions as the upper substrate of the liquid crystal display device 33. Electrodes (not shown) are provided to enable individual pixels of the liquid crystal layer 36 to be addressed. Filtering (not shown) is provided to form sets of red, green and blue pixels as illustrated by R, G and B in FIG. 10.

In operation, the projection system of FIGS. 9 and 10 is illuminated with substantially collimated plane-polarised light. The incoming plane-polarised light is incident normally and telecentrically upon the front face 22a of the upper cover plate 22 which forms the entrance face of the polarisation separation element 16.

The polarisation separation element is arranged such that the incoming plane-polarised light is transmitted through the polarisation separation element without change in polarisation. In the embodiment of FIGS. 9 and 10 the incoming plane-polarised light has its plane of polarisation out of the paper, so that the light reaching the liquid crystal layer 36 will also be plane-polarised in this direction.

The liquid crystal layer 36 acts to selectively change the polarisation state of the light that passes through the liquid crystal layer, is reflected by the reflective layer 35 and passes back through the liquid crystal layer 36. By changing the voltage applied to a pixel of the liquid crystal layer, it is possible to select that light leaving the liquid crystal layer 36 after reflection by the reflector 35 has its plane of polarisation unchanged, or it is possible to select that light exiting the liquid crystal layer 36 after reflection by the reflective layer 35 has had its plane of polarisation rotated by 90°. Light that exits the liquid crystal layer 36 with its a plane of polarisation unchanged is directed by the polarisation separation element back towards the light source. However, light exiting the liquid crystal layer that has had its plane of polarisation rotated by 90° is deflected by the polarisation separation element away from the path of incident light, as shown in FIGS. 9 and 10.

The projection system as shown in FIGS. 9 and 10 further comprises a projection lens (not shown in FIG. 9 or 10). The projection lens is positioned such that light that is deflected by the polarisation separation element after reflection by the reflector 35 is directed towards the projection lens. Light that is reflected by the reflective liquid crystal panel 33 with its plane of polarisation unchanged is directed by the polarisation separation element 16 back towards the light source, and so does not reach the projection lens. In this way, by suitably addressing the pixels of the liquid crystal display device 33 it is possible to direct a desired image towards the projection lens for subsequent projection.

Conventional projection systems that incorporate a reflective liquid crystal panel generally use a dichroic polarising beam splitter (PBS). A dichroic PBS is, however, relatively expensive, and is also bulky. Use of a polarisation separation element of the present invention in a projection system is therefore advantageous, since it reduces the cost and the volume of the projection system. Furthermore, a polarisation separation element of the present invention has less variation of its optical properties as the angle between input light and the normal to the polarisation separation element varies. For a projection system having a small liquid crystal panel having a low F/# illumination cone, the use of a polarisation separation element of the present invention presents an advantage in flux throughput and contrast ratio.

FIG. 11 is a schematic view of a projection system. Light from a lamp 7 is collimated by a parabolic mirror 8. The parabolic mirror 8 also acts as a "cold" mirror and, in combination with a "hot mirror" 37 also serves to remove unwanted heat from the light emitted by the lamp 7. The light is then incident on a PCOS element 15 to produce a plane-polarised telecentric beam of light. The PCOS 15 may be a PCOS of the present invention as described with reference to any of FIGS. 1, 6, 7 and 8 above.

Light leaving the PCOS passes through a collector lens or homogeniser lens 38 that produces a magnified image of the lens array elements of the PCOS substantially in the plane of the field lens 39. Light is transmitted to the liquid crystal panel 33 through the field lens 39 to ensure that the liquid crystal panel is illuminated telecentrically.

A polarising beam splitter 40 is located between the field lens 39 and the liquid crystal panel 33. As described above with reference to FIGS. 9 and 10, when light is reflected by the liquid crystal panel 33 with its plane of polarisation unchanged, it is directed by the polarising beam splitter 40 back towards the lamp 7. However, when light reflected by the liquid crystal panel 33 has its plane of polarisation rotated by substantially 90°, the light is directed towards a projection lens 41. An image encoded in the liquid crystal panel 33 can therefore be projected.

In a polarisation separation element 16 as described with reference to FIG. 4, in which a liquid crystal material is used to form the birefringent wedge-shaped prisms, the assembly of the PCOS requires the transparent cover plates 22, 23 to be cemented to one another with a uniform cell gap between them. FIG. 12 shows a further embodiment of a polarisation separation element of the invention, in which a liquid crystal layer 32 is used to form birefringent wedge-shaped prisms. The polarisation separation element of FIG. 12 also comprises an array of optically isotropic prisms 31.

In the polarisation separation element 16 of FIG. 12, the optically isotropic prisms 31 are formed of a polymer material, for example by moulding or embossing a polymer sheet to provide the array of wedge-shaped prisms. Spacer balls 42 are used to space the polymer wedge-shaped prisms 31 from the lower transparent cover plate 23, thereby ensuring that the separation between the two transparent cover plates 22, 23 is uniform. The spacer balls 42 used in this embodiment can be any conventional spacer balls as used in conventional liquid crystal panels. The spacer balls 42 can be introduced by a spraying process, or they can be mixed in the glue used to cement the upper and lower transparent cover plates 22, 23 together. The spacer balls 42 will generally have a diameter of the order of a few microns.

FIG. 13 shows a further polarisation separation element 16 of the invention. As with the embodiment of FIG. 12, a liquid crystal layer 32 and an array of optically isotropic prisms 31 are disposed between first and second transparent cover plates 22,23. In this polarisation separation element, the optically isotropic wedge-shaped prisms 31 are again formed from a polymeric material, for example by moulding or embossing. The polymer material is further shaped to provide spacer posts 43. When the upper and lower cover plates 22, 23 are assembled together, the spacer posts 43 will ensure that the separation-between the upper and lower cover plates 22, 23 is uniform. Thus, incorporation of spacer posts in the polymeric layer at intervals across the polarisation separation element has the advantage of simplifying the fabrication of the polarisation separation element. A further advantage is that potential scattering from the spacer posts 43 may also be controlled more easily, since the uniformity of the arrangement of the spacer posts is controllable.

The polarisation separation elements of FIGS. 12 and 13 again deviate both polarisation components from the direction of the incident light.

Fabrication of a polarisation separation element incorporating a liquid crystal material may be achieved using conventional liquid crystal panel assembly methods. The surf aces confronting the liquid crystal layer—that is, the surface of the polymer layer 31 and the inner surface of the lower transparent cover plate 23—may be coated with an alignment layer, for example a layer of alignment material PI2555, for aligning the liquid crystal material. The alignment layer may be deposited by a spin coating methods The material used to form the alignment layer must be carefully chosen where a polymer layer is used to form the optically isotropic wedge-shaped prisms, since care must be taken to ensure that the alignment layer does not require baking at a temperature that could damage the polymer material.

The upper and lower transparent cover plates can be formed of an optically isotropic, transparent material. It is preferable to fabricate the upper and lower cover plates 22, 23 from a polymeric material, since this reduces the cost and the weight of the polarisation separation element.

As will be seen from the above description, no switching of the liquid crystal material is required in the polarisation separation elements shown in FIGS. 4, 12 and 13. Accordingly, there is no need to provide the polarisation separation elements with electrodes for applying voltages across the liquid crystal layer. This means that a wider selection of materials can be used in the fabrication of the polarisation separation element, since the high deposition temperatures required to form transparent electrodes usually place severe restrictions on materials that can be used. Furthermore it avoids the reflective light losses that would be experienced if transparent electrodes, such as indium tin oxide electrodes, were present.

The lack of any requirement to address the liquid crystal layer also provides more freedom in choosing the thickness of the cell gap. Where an electric field must be applied across the liquid crystal layer to switch the liquid crystal material, a small cell gap is usually preferred, so that a given electric field can be achieved at a low voltage. This restriction does not apply to the cell gap of a PSE of FIG. 4, 12 or 13 since, as noted above, it is not necessary to address the liquid crystal material 32. It is, however, preferred to avoid a very large cell gap, for example 1 mm, since it can be difficult to maintain the alignment of liquid crystal molecules across the thickness of the liquid crystal layer if the cell gap is too large. A cell gap of the order of 100 microns or less would generally maintain alignment throughout its depth.

FIG. 15(a) shows a further polarisation separation element of the invention. This again comprises two arrays of prisms disposed between a first transparent cover plate 22 and a second transparent cover plate 23. The first prism array is an array of isotropic prisms 24, 24a, and the second prism array is an array of birefringent prisms 21, 21a. The prisms of each array have a substantially wedge-shaped cross section. The wedge angle of the prisms of the first array is equal or substantially equal to the wedge angle of the prisms 21, 21a of the second prism array, and the cross-sectional dimensions of the prisms 24, 24a of the first array are equal or substantially equal to the cross-sectional dimensions of the prisms 21, 21a of the second array.

The arrays of prisms are disposed such that a prism 24, 24a of the first array has its oblique face (hypotenuse face) adjacent to the oblique face of a prism 21, 21a of the second array. Since the prisms of the first array have substantially the same wedge angle as the prisms of the second array, the base face of a prism 24, 24a of the first array is substantially parallel to the base face of the corresponding prism 21, 21a of the second array. In contrast to the polarisation splitting elements described above, the prisms in each array are not arranged in a "saw-tooth" arrangement in which the thick end of one prism is disposed adjacent to the thin end of a neighbouring prism. In the polarisation splitting element of FIG. 15(a), the inclination direction of the prisms in an array alternates. Thus, a first prism 24 of the first array is arranged such that its thickness decreases from left to right as seen in FIG. 15(a), but a neighbouring prism 24a of the first array increases in thickness from left to right in FIG. 15(a). Thus, a prism 24a of the first array is arranged such that its thin end is adjacent to the thin end of one neighbouring prism 24 of the first array, and such that its thick end is adjacent to the thick end of another neighbouring prism 24 of the first prism array. The prisms of the second prism array are arranged similarly. (The boundaries between adjacent prisms of an array are indicated in broken lines in FIG. 15(*a*) although it should be noted that, depending on the construction of the arrays, there may not be physical boundaries between adjacent prisms in an array.)

The prism structure shown in FIG. 15(*a*) will be referred to as a "herringbone" structure, for convenience.

The wedge angle θ1 of a prism of the first array that decreases in thickness from left to right in FIG. 15(*a*) is preferably equal or substantially equal to the wedge angle θ2 of a prism of the first array that increases in thickness from left to right in FIG. 15(*a*).

As indicated in FIG. 15(*a*) the polarisation separation element 16 of FIG. 15(*a*) deviates light of both polarisation components, so that each polarisation component leaves the polarisation separation element in a direction that is different from the direction of propagation of the light incident on the outer face 22*a* of the first cover plate 22. It will be noted, however, that an element 50 in which the thickness of the prism 24 of the first array decreases from left to right in FIG. 15(*a*) directs the first polarisation component in substantially the same direction as an element 51, in which the thickness of the prism of the first prism array increases from right to left in FIG. 15(*a*), directs the second polarisation component, and vice-versa.

The isotropic prisms 24, 24*a* in the polarisation separation element of FIG. 15(*a*) may be manufactured by any suitable method for manufacturing an isotropic prism array including any methods described herein with reference to other embodiments. For example, the array of isotropic prisms 24, 24*a* may be made of a polymer material. The herring-bone profile of the array of isotropic prisms may be obtained by, for example, moulding the polymer using a suitable mould, casting the polymer, by a lithographic process, or by embossing a polymer sheet.

The array of birefringent prisms 21, 21*a* may also be provided by any suitable method, for example by any method described above for manufacture of a birefringent prism array. For example, the birefringent prism array may be obtained by suitably shaping a birefringent material. Alternatively, the birefringent prisms 21, 21*a* may be formed using a liquid crystal material disposed between the second cover sheet 23 and the isotropic prism array, for example in the manner described above with reference to FIG. 4. If the birefringent prism array is embodied as a liquid crystal layer having a varying thickness, the polarisation separation element 16 is preferably provided with a first alignment layer (not shown) disposed on the oblique faces of the isotropic prisms 24, 24*a*, and with a second alignment layer (not shown) disposed on the upper surface 23*a* of the second cover sheet 23:

In FIG. 15(*a*) the polarisation separation element is shown with the isotropic prism array disposed closest to the light source. It would alternatively be possible for the polarisation separation element 16 of FIG. 15(*a*) to be oriented such that light was incident initially on the lower face 23*b* of the second cover sheet 23, so that the light passed through the birefringent prism array before passing into the isotropic prism array.

FIG. 15(*b*) illustrates a polarisation conversion system using the polarisation splitting element 16 of FIG. 15(*a*).

The PCOS 15 of FIG. 15(*b*) contains a polarisation splitting element 16 of the type illustrated in FIG. 15(*a*). The polarisation splitting element 16 is illuminated by unpolarised or partially polarised light from a light source (not shown) The polarisation splitting element 16 separates the two polarisation components in the incident light, and the two polarisation components leaving the polarisation separation element 16 are indicated in broken lines and full lines respectively. As explained above, the directions in which the first and second polarisation components are emitted from the polarisation splitting element depends on the direction of the interface between the first and second prism arrays.

The PCOS 15 of FIG. 15(*b*) further comprises a polarisation conversion element placed on the opposite side of the polarisation splitting element 16 to the light source. The polarisation conversion element 19 converts light from the polarisation splitting element into light having a substantially uniform polarisation. In the embodiment of FIG. 15(*b*) the desired output polarisation is one of the two polarisation components produced by the polarisation splitting element, but this need not be the case.

In the embodiment of FIG. 15(*b*) the polarisation conversion element 19 is arranged so that one polarisation component output from the polarisation splitting element 16 is incident on areas 19*a* of the polarisation conversion element that rotate the plane of polarisation of that polarisation component by substantially 90°. It is further arranged that the other polarisation component output by the polarisation splitting element is incident on areas 19*b* of the polarisation conversion element that do not rotate the plane of polarisation of that polarisation component, so that the plane of polarisation of the second polarisation component is substantially unchanged by the polarisation conversion element 19. In consequence, light emitted from the PCOS 15 of FIG. 15(*b*) contains substantially only light of one polarisation component.

In order to ensure that the two polarisation components output by the polarisation splitting element are incident on the correct areas of the polarisation conversion element 19, a first microlens array 17 is provided to converge light directed towards the polarisation conversion element 19. In the embodiment of FIG. 15(*b*) the first microlens array 17 is disposed between the polarisation splitting element 16 and the polarisation conversion element 19, but the first microlens array 17 could alternatively be disposed between the light source and the polarisation splitting element 16. If, in the case of a "herring-bone" polarisation splitting element, the first microlens array 17 is disposed between the light source and the polarisation splitting element then the second microlens array 18 must lie between the polarisation separation element and the polarisation conversion element. This is to ensure that the two orthogonal polarisation states emerging from the polarisation separation element are incident on the correct areas of the polarisation conversion element.

A second microlens array 18 is preferably provided in the PCOS 15 of FIG. 15(*b*), to ensure that the light output from the PCOS is substantially telecentric. The second microlens array, if provided, may conveniently be disposed on the same substrate as the first microlens array as described above with reference to in FIG. 23; this is shown schematically in FIG. 15(*b*).

The herringbone polarisation splitting element of the type shown in FIG. 15(*a*) provides an increased intrinsic light throughput compared to a "saw-tooth" polarisation splitting element. When used in a PCOS, however, in order to ensure that the two polarisation components are incident on the correct areas of the polarisation conversion element 19, it is necessary for the microlens array to be aligned precisely with the polarisation splitting element. In particular, the pitch $d_m$ of the microlens array is required to be half the pitch $d_s$ of the polarisation splitting element. Furthermore, each element of the microlens array should be aligned opposite an element 50, 51 of the polarisation splitting element 16 so that there is a one-to-one correspondence between the elements 50, 51 of the polarisation splitting element 16 and the lenses of the microlens array.

The pitch $d_a$ of the polarisation conversion element is required to be equal or substantially equal to twice the pitch $d_m$ of the microlens array. Furthermore, the polarisation conversion element 19 is required to be arranged such that each first area 19a is disposed opposite approximately half the area of one element 50 of the microlens array and half the area of an adjacent element 51 of the microlens array.

In contrast, in a PCOS that incorporates a saw-tooth polarisation splitting element, the pitch of the first microlens array 17 is not required to be identical to the pitch of the polarisation splitting element, and the first microlens array is not required to be aligned with the elements of the polarisation splitting element. This is illustrated schematically in FIG. 15(c) which shows a PCOS of the invention that incorporates a "saw-tooth" polarisation separation element. It will be noted, however, that the polarisation conversion element 19 of the PCOS of FIG. 15(c) is aligned with the second microlens array 18, and that the pitch $d_c$, of the polarisation conversion element is equal or substantially equal to the pitch $d_m$ of the second microlens array 18.

In the PCOS 15 of FIG. 15(b), the first microlens array 17 is preferably positioned as close to the polarisation separation element 16 as possible. This minimises the possibility that rays emerging from one element of the polarisation separation element will enter the 'wrong' microlens of the first microlens array. Alternatively, if the first microlens array 17 is disposed between the light source and the polarisation splitting element the second microlens array 18 (which, as noted above, must in this case be disposed between the polarisation splitting element and the polarisation conversion element 19) is preferably placed as close to the polarisation separation element 16 as possible The polarisation separation element 16 of FIG. 15(a) comprises one array of isotropic prisms 24,24a and one array of birefringent prisms 21, 21a. A polarisation separation element having the "herringbone" structure could alternatively be embodied using two arrays of birefringent prisms, in a similar manner to the polarisation separation element described above with reference to FIG. 2(a).

In the polarisation separation elements described above the prism arrays have a uniform or substantially uniform pitch. While a prism array having a uniform pitch is straightforward to manufacture, there is the disadvantage that a polarisation separation elements that incorporates prism arrays having a uniform pitch will have a periodic structure. As a result some of the incident light will be lost as a result of diffractive effects.

FIG. 16 illustrates a PCOS 15 according to a further embodiment of the invention. The PCOS of FIG. 16 contains a polarisation separation element 16 of the invention in which the pitch of the prism arrays of the polarisation separation element is not uniform. The prism-arrays of the polarisation separation element 16 do not have a periodic structure so that diffraction effects are reduced (and, in principle, are completely eliminated if the pitch of the prism arrays varies in a truly random fashion).

The PCOS 15 of FIG. 16 contains a polarisation splitting element 16 having the "saw-tooth" structure described above with reference to, for example, FIG. 2(b). The polarisation separation element 16 contains a first array of optically isotropic wedge-shaped prisms 24, and a second array of birefringent wedge-shaped prisms. The prisms do not have a constant pitch, so that the widths $1_1, 1_2, 1_3, 1_4$ of the prisms shown in FIG. 16 are not equal all equal to one another, and the diffractive effect of the polarisation separation element 16 is reduced. Preferably, the pitch of the prisms varies in a random or pseudo-random manner. The wedge angle of the prisms is preferably uniform, so that preferably $\theta_1=\theta_2=\theta_3=\theta_4$.

Figure 1B:
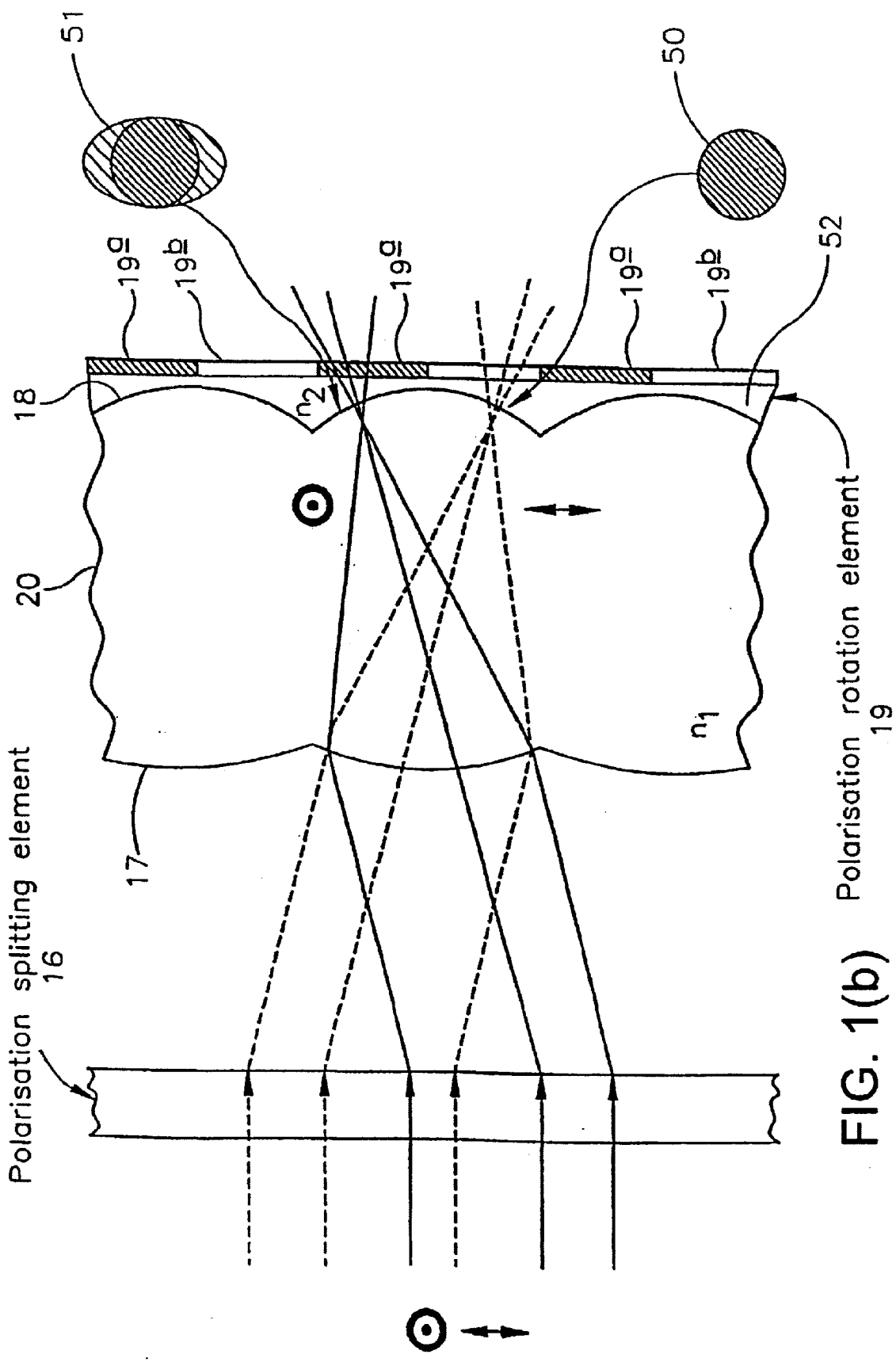
FIG. 1(b) is a schematic diagram of a second embodiment of a polarisation conversion system according to the present invention.

Apart from the random pitch of the prism arrays of the polarisation separation element 16, the PCOS 15 shown in FIG. 16 is generally similar to the PCOS described with reference to FIG. 1(b). The polarisation splitting element 16 is illuminated by unpolarised or partially polarised light from a light source (not shown). The polarisation splitting element 16 angularly separates the two polarisation components in the incident light, and deviates each polarisation component.

The PCOS 15 of FIG. 16 further comprises a polarisation conversion element 19 placed on the oppose side of the polarisation splitting element 16 to the light source. The polarisation conversion element 19 converts light from the polarisation splitting element into light having a substantially uniform polarisation.

In the embodiment of FIG. 16 the polarisation conversion element 19 is arranged so that one polarisation component output from the polarisation splitting element 16 is incident on areas 19a of the polarisation conversion element that rotate the plane of polarisation of that polarisation component by substantially 90°. It is further-arranged that the other polarisation component output by the polarisation splitting element is incident on areas 19b of the polarisation conversion element that do not rotate the plane of polarisation of that polarisation component, so that the plane of polarisation of the second polarisation component is substantially unchanged by the polarisation conversion element 19. In consequence, light emitted from the PCOS 15 of FIG. 16 contains substantially only light of one polarisation component (S-polarised light in this example). The polarisation conversion element may optionally comprise a uniform retarder 32', so that any desired output polarisation state may be obtained.

In order to ensure that the two polarisation components output by the polarisation splitting element are incident on the correct areas of the polarisation conversion element 19, a first microlens array 17 is provided to converge light directed towards the polarisation conversion element 19. In the embodiment of FIG. 16 the first microlens array 17 is disposed between the polarisation splitting element 16 and the polarisation conversion element 19, but the first microlens array 17 could alternatively be disposed between the light source and the polarisation splitting element 16.

A second microlens array 18 is preferably provided in the PCOS 15 of FIG. 16, to ensure that the light output from the PCOS is substantially telecentric. The second microlens array, if provided, may conveniently be disposed on the same substrate as the first microlens array as described above With reference to in FIG. 24.

In the embodiment of FIG. 16 the first and second microlens arrays 17,18 have a uniform pitch, for ease of manufacture. The microlenses of the first array 17 are therefore not aligned with individual prisms of the polarisation separation element 16. The pitch of the first microlens array, the pitch of the second microlens array and the pitch of the polarisation conversion element 19 are preferably equal or substantially equal to one another. The first microlens array, the second microlens array and the polarisation conversion element are preferably aligned with one another laterally.

The feature of providing the prism arrays of the polarisation separation element with a non-uniform pitch, such as a random or pseudo-random pitch, may be applied to any polarisation separation element or PCOS described herein. It should be noted, however, that if the feature of providing the prism arrays of the polarisation separation element with a non-uniform pitch, such as a random or pseudo-random pitch, is applied to a PCOS in which the polarisation separation element has the "herring-bone" structure shown in FIG. 15(a), then the pitch of the microlens arrays of the PCOS and the pitch of the polarisation conversion element of the PCOS should preferably vary in the same way as the pitch of the prism arrays, and this may be difficult to achieve in practice. However, for a given prism angle, a polarisation separation element having the "herring-bone" structure will have a pitch that is twice as great as the pitch of a polarisation separation element with the "saw-tooth" structure so that diffractive loss is less of a problem in a polarisation separation element having the "herring-bone" structure.

A polarisation splitting element in which the pitch of the prism arrays is not uniform may, in principle, be made by any manufacturing method that can be used to manufacture a polarisation splitting element with a constant prism pitch. For example, the isotropic prism array may be made by removing material from an optically isotropic substrate having uniform thickness using, for example, a diamond turning process or an etching process such as grey-scale lithography followed by ion etching suitably controlled to introduce variations into the pitch of the prism array. For example, the process may be controlled using a random number generator to provide random or pseudo-random variations into the pitch of the prism array. The isotropic prism array may then be disposed opposite an optically isotropic substrate, and a liquid crystal material can be disposed between the isotropic prism array and the optically isotropic substrate to form the birefringent prism array.

In a full-scale manufacturing process, it is convenient to use a process as outlined above to make a master. Once a suitable master has been made, it is possible to undertake large scale production of a prism array using, for example, a UV-setting polymer material or a thermosetting resin.

Where a PCOS is illuminated using a lamp having a reflector that incorporates a dichroic coating to improve reflectivity, Fresnel reflections will cause the light reflected by the reflector to have some degree of polarisation. FIG. 22(a) shows the geometry of polarisation that occurs owing to these Fresnel reflections.

FIG. 22(b) shows the polarisation directions as seen by an observer viewing the reflector 8 along its axis of symmetry. It will be seen that the polarisation direction has a radial symmetry when viewed from this direction. In FIG. 22(b) P and S denote the p-plane-polarised and s-plane-polarised states, and the + and − subscripts denote the degree of polarisation, so that, for example, $P_+$ denotes a state having a substantial degree of p polarisation, whereas $S_-$ denotes an s-polarised state having a low degree of polarisation.

Because the light incident on the polarisation separation element is already polarised to some extent, the p-polarised beam produced by the polarisation separation element will not have the same intensity as the s-polarised beam produced by the polarisation separation element so that the two images produced at the elements of the second microlens array will have different intensities. Because of the nature of the retarders used in the polarisation conversion element 19, it is more efficient to convert the polarisation state of the + component of the incident light using the half wave retarder elements, and to leave the plane of polarisation of the − component of the incoming light unchanged. It is therefore preferable for the polarisation conversion element to be patterned such that each region of the polarisation conversion element converts the plane of polarisation of the higher intensity polarisation component incident on that region while not changing the plane of polarisation of the lower intensity polarisation component.

FIG. 22(c) illustrates a retarder 42 suitable for use as the polarisation conversion element where the incident light is polarised as shown in FIG.22(b). The retarder 42 of FIG. 22(a) has four sections, 42A to 42D. The retarder is oriented such that sections 42A and 42C receive light that is predominantly p-plane polarised and contains a small component of s-polarised light; the regions 42A, 42C of the retarder therefore preferably convert the p-polarised component of the incoming light to s-polarised light, while having no effect on the component that is already s-polarised. Conversely, the regions 42B and 42D of the retarder 42 receive, in use, light that is predominantly s-plane polarised, with only a small component that is p-plane polarised. Accordingly, in the regions 42B, 42D the retarder preferably converts the s-polarised component to p-polarised light, without affecting the polarisation of the s-polarised component The retarder 42 of FIG. 22(c) is intended for use with a polarisation separation element that separates the p- and s-polarised components in a horizontal plane. The direction of the optic axis of the retarder 42 is therefore patterned in vertical strips, with the optic axis in one strip being vertical and the optic axis in an adjacent strip being at 45° to the vertical. These strips are arranged such that, in each region of the retarder, the highest intensity polarisation component of the incident light is directed onto a strip in which the optic axis is at 45°. Thus, in the regions 42A and 42C the p-component of the incident light is directed onto strips which have their optic axis at 45° to the vertical and so is converted to the s-polarisation, whereas in the regions 42B and 42D it is the s-component of the incoming light that is directed by the polarisation separation element onto strips that have their optic axis arranged at 45° to the vertical direction and is converted to the p-polarisation.

After light has passed through the wave plate 42 shown in FIG. 22(c), light that has passed through the regions 42A and 42C of the retarder will be s-plane 20 polarised light, whereas light that has passed through the regions 42B and 42D of the retarder 42 will be in the p-plane polarised state. In order to produce light having a uniform polarisation, it is necessary to pass the light through a second wave-plate to convert one of the polarisation components to the orthogonal polarisation state. One suitable wave-plate is shown in FIG. 22(d).

The wave-plate 43 of FIG. 22(d) again has four sections 43A to 43D, which correspond in size and shape to the regions 42A to 42D of the wave-plate 42 of FIG. 22(c).

If it is desired that the output light is s-polarised light, then the sections 43A and 43C of the wave-plate 43 do not need to change the plane of polarisation of light emitted by the wave plate 42 since, as noted above, the sections 42A and 42C of the wave-plate 42 produce s-polarised light. The optic axes in the regions 43A and 43C should be parallel to the polarisation of the incident light.

The sections 43B and 43D of the retarder 43 will receive p-polarised light from the retarder 42. Since it is desired that the output from the retarder 43 is s-polarised light, this requires that the sections 43B and 43D of the retarder 43 rotate the plane of polarisation of p-polarised light emitted by the section is 42B and 42D of the retarder 42 to produce s-polarised light. The optic axis of the sections 43B and 43D of the retarder 43 is therefore preferably inclined at 45° to the vertical.

The direction of the optic axis of the wave plate 43, and the polarisation of light received from the wave plate 42, are indicated in FIG. 22(d).

A further polarisation splitting element 44 suitable for use where the incident light is polarised as shown in FIG. 22(b) will be described with reference to FIG. 22(e). The polarisation splitting element 44 comprises a layer of uniaxial material disposed between first and second transparent cover plates. FIG. 22(e) shows the orientation of the optical axis of the uniaxial material across the thickness of the layer of uniaxial material, and it can be seen that the twist of the optical axis of the uniaxial material is spatially varying. In sections 44A and 44C of element 44, the optical axis of the uniaxial material adjacent to one cover plate is in substantially the same direction as the optic axis of the uniaxial material adjacent the other cover plate, whereas in sections 44B and 44D the optical axis twists by substantially 90° throughout the thickness of the layer of uniaxial material.

Sections 44B and 44D act in such a way as to rotate the polarisation of the two split beans by 90°, For instance, if incident light comprising components P– and S+ is incident on the polarisation separation element 44 the two polarisation components will be angularly split and in sections 44B and 44D these components will have their polarisation rotated by 90° to become S– and P+.

Such a polarisation separation element, with prism array configured to split light in the horizontal direction, may be used in a PCOS system 15a as shown in FIG. 1(a). In this case, light leaving the second face 18 of the micro lens array will comprise alternate, vertical stripes of P and S polarisations. The alternation will depend on which section the light leaves the polarisation splitting element 44, with the stripes produced by sections 44A and 44C being shifted by one stripe compared to the stripes produced by sections 44B and 44D. That is, if sections 44A and 44C produce stripes having alternate P and S polarisations, then sections 44B and 44D will produce stripes having alternate S and P polarisations.

Light exiting from the polarisation splitting element will now comprise components P+ and S– from sections 44A and 44C and components S– and P+ from sections 44B and 44D.

The patterned polarisation conversion element of FIG. 22(c) may then be used to convert light exiting the polarisation splitting element of FIG. 22(e) into light having a substantially uniform polarisation Where a polarisation separation element contains a single array of birefringent wedge-shaped prism, light having one linear polarisation experiences substantially all the material dispersion. This is usually the component that is refracted by the extraordinary index, since this index has the highest dispersion. If it is desired that both of the orthogonal linear polarisation components should experience substantially equal dispersion, this can be achieved by using a birefringent wedge-shaped prism that comprises a uniaxial material that has at least one area in which the optic axis has a twist of 90° across the thickness of the uniaxial material and has at least one area in which the optic axis of the uniaxial material has zero twist across the thickness of the uniaxial material. Provided that the area of the uniaxial material that has 90° twist of its optic axis and the area of the uniaxial material that has 0° twist of its optic axis are substantially equal, then both of the orthogonal polarisation components will experience substantially equal dispersion. FIG.23(a) illustrates schematically one embodiment of the alignment of a counter substrate that will achieve this effect. The counter substrate has two regions 46A, 46B, with the alignment direction of the alignment film varying between the two regions. In region 46A the alignment direction is at 90° to the vertical (as seen in FIG. 23(a)), whereas in regions 46B the alignment direction is at 0° to the vertical. When used in conjunction with another alignment film that has a uniform alignment direction at 0° to the vertical, the region 46A will induce a twist in the optic axis of the uniaxial material by 90° over the thickness of the uniaxial material, as shown in the upper left insert in FIG. 23(a). The region 46B, on the other hand, will induce no twist in the optic axis of the uniaxial material across the thickness of the uniaxial material, as shown in the lower right insert in FIG. 23(a).

FIG. 23(b) illustrates a variation of the embodiment of FIG. 23(a) This Figure shows a counter substrate 47 that has a large number of regions of different alignment direction. Regions 47A have an alignment direction of 90° to the vertical, and regions 47B have an alignment direction at 0° to the vertical. When used in conjunction with another alignment film that has a uniform alignment direction at 0° to the vertical, the regions 47A will induce a twist in the optic axis of the uniaxial material by 90° over the thickness of the uniaxial material, whereas the regions 47B will induce no twist in the optic axis of the uniaxial material across the thickness of the uniaxial material.

In the embodiments of a PCOS shown in FIGS. 1(a), 1(b), 2(a), 2(b), 6(a), 6(b) 7(a), 7(b), 14(c) and 15(b) the polarisation conversion element 19 consists of a plurality of first areas that have no effect on the polarisation of the component that is incident on those areas, and other areas that rotate by 90° the plane of polarisation of the component incident on those areas. Thus, these polarisation conversion elements output light that has a common plane of polarisation. The invention is not, however, limited to a PCOS having such a polarisation conversion element. For example, the polarisation conversion element of a PCOS of the invention could alternatively comprise the combination of a polarisation rotation element such as those described in the application and a uniform waveplate or retarder disposed on the opposite side of the polarisation rotation element to the light source. The uniform waveplate or retarder would convert the linearly polarised light output by the polarisation rotation element 19 into elliptically- or circularly-polarised light.

Although the polarisation separation elements of the invention have been described in the context of a polarisation conversion system, the polarisation separation elements of the invention are not limited to use in a polarisation conversion system.

What is claimed is:

1. A polarization separation element comprising a first array of prisms, each prism having a wedge-shaped cross-section; and a second array of prisms, each prism having a wedge-shaped cross section; wherein each prism of the first array is disposed with an inclined face disposed adjacent an inclined face of a corresponding prism of the second array; wherein each prism of at least one of the arrays of prisms is a birefringent prism; and wherein the polarization separation element is arranged to deviate light having a first polarization relative to the incident direction of the light of the first polarization and to deviate light having a second polarization which is different from the first polarization, relative to the incident direction of the light of the second polarization.

2. A polarization separation element as claimed in claim 1 wherein each prism of the first array of prisms is a birefringent prism and each prism of the second array of prisms is a birefringent prism.

3. A polarization separation element as claimed in claim 2 wherein each prism of the first array is arranged with its optic axis perpendicular to the optic axis of the corresponding prism of the second array.

4. A polarization separation element as claimed in claim 1 wherein each prism of the first array of prisms is an optically isotropic prism and each prism of the second array of prisms is a birefringent prism.

5. A polarization separation element as claimed in claim 4 wherein the ordinary refractive index $n_o$ of a prism of the second array, the extraordinary refractive index $n_e$ of a prism of the second array and the refractive index n of a prism of the first array are chosen such that $$n_o > n > n_e$$

6. A polarization separation element as claimed in claim 1 wherein the array of birefringent prisms, or one of the arrays of birefringent prisms, comprises a liquid crystal material.

7. A polarization separation element as claimed in claim 6 and containing spacers for determining the thickness of the liquid crystal layer.

8. A polarization separation element as claimed in claim 7 wherein each spacer element is integral with a respective one of the prisms of the first array.

9. A polarization separation element as claimed in claim 1 wherein the array of birefringent prisms, or one of the arrays of birefringent prisms, comprises a reactive mesogen.

10. A polarization separation element as claimed in claim 1 wherein the array of birefringent prisms, or one of the arrays of birefringent prisms, comprises a polymer stabilized liquid crystal material.

11. A polarization separation element as claimed in claim 1 and further comprising a third array of prisms, each having a wedge-shaped cross-section; and a fourth array of prisms, each having a wedge-shaped cross-section; wherein each prism of the third array is disposed with an inclined face adjacent an inclined face of a corresponding prism of the fourth array; and wherein each prism of the third array is a birefringent prism.

12. A polarization separation element as claimed in claim 11 wherein the direction of the optic axis of a prism of the second array varies over the thickness of the prism.

13. A polarization separation element as claimed in claim 12 wherein the direction of the optic axis of a prism of the second array varies by substantially 90° over the thickness of the prism, the optic axis being substantially perpendicular to the direction of incident light over the thickness of the prism.

14. A polarization separation element as claimed in claim 13 wherein the direction of the optic axis of a prism of the second array at the face of the prism disposed closer to the third array of prisms is perpendicular to the optic axis of the prisms of the third array.

15. A polarization separation element as claimed in claim 11 wherein the second array of prisms comprises a liquid crystal layer.

16. A polarization conversion system comprising: a first lens array for converging incident collimated light; a polarization separation element for directing light having a first polarization in a first direction and for directing light having a second polarization different from the first polarization in a second direction different from the first direction; and one or more polarization conversion elements for converting light having the first and second polarizations to light having a substantially common output polarization;

wherein the polarization separation element is a polarization separation element as defined in claim 1.

17. A polarization conversion system as claimed in claim 16 wherein the output polarization is the second polarization.

18. A polarization conversion system as claimed in claim 16, wherein the array of polarization conversion elements is disposed substantially in the focal plane of the first lens array.

19. A polarization conversion system as claimed in claim 16 wherein the first lens array is disposed between the polarization separation element and the polarization conversion element.

20. A polarization conversion system as claimed in claim 16 wherein the first lens array is disposed between a source of the incident collimated light and the polarization separation element.

21. A polarization conversion system as claimed in claim 16 and further comprising a second lens array for collimating the output of the polarization conversion element.

22. A polarization conversion system as claimed in claim 21, wherein the first lens array and the second lens array have a common substrate.

23. A polarization conversion system as claimed in claim 21 wherein the second lens array is adjacent the polarization conversion element and the polarization conversion element is located between a source of the incident collimated light and the second lens array.

24. A polarization conversion system as claimed in claim 21 wherein the polarization conversion element is disposed directly on the second lens array.

25. A polarization conversion system as claimed in claim 21 wherein the polarization conversion element is disposed after and is optically coupled to the second lens array.

26. A polarization conversion system as claimed in claim 16 wherein the output from the polarization separation element is a first beam of linearly polarized light having a first plane of polarization and a second beam of linearly polarized light having a second plane of polarization different from the first plane of the polarization, and each polarization conversion element is a polarization rotation element.

27. A polarization conversion system as claimed in claim 26 wherein the plane of polarization of the first beam is at substantially 90° to the plane of polarization of the second beam.

28. A polarization conversion system as claimed in claim 16 wherein the one or more polarization conversion elements comprise a retarder array having a plurality of first regions alternating with a plurality of second regions, the first and second regions being arranged to receive light of the first and second polarizations, respectively.

29. A polarization conversion system as claimed in claim 27 wherein the first and second regions have first and second sizes which are matched to the cross-sectional sizes of light beams of the first and second polarizations, respectively, and which are different from each other.

30. A projection display system comprising a source of unpolarized or partially polarized light, a polarization conversion system as defined in claim 16 and a projection lens.

31. An optical element comprising: a substrate; a first lens array of a plurality of lenses disposed on one surface of the substrate; and a second lens array of a plurality of lenses disposed on an opposing surface of the substrate, each lens of the second lens array being optically associated with a lens of the first lens array.

32. An optical element as claimed in claim 31 wherein the first lens array and the second lens array are integral with the substrate.

33. An optical element as claimed in claim 31 wherein the pitch of the first lens array is substantially equal to the pitch of the second lens array.

34. An optical element as claimed in claim 33, wherein the pitch of the first lens array and the pitch of the second lens array are each less than 2 mm.

35. An optical element as claimed in claim 31 wherein the width W of the optical element and the thickness T of the optical element satisfy the relationship W/T>3.

* * * * *